United States Patent [19]
Drori

[11] Patent Number: 4,978,450
[45] Date of Patent: * Dec. 18, 1990

[54] FILTERING ELEMENT

[76] Inventor: Mordeki Drori, P.O. Box 21538, Tel Aviv, Israel

[*] Notice: The portion of the term of this patent subsequent to Jul. 28, 2004 has been disclaimed.

[21] Appl. No.: 229,819

[22] Filed: Aug. 8, 1988

Related U.S. Application Data

[62] Division of Ser. No. 13,248, Feb. 10, 1987, Pat. No. 4,935,126.

[30] Foreign Application Priority Data

| Feb. 11, 1986 | [IL] | Israel | 77866 |
| Jun. 3, 1986 | [IL] | Israel | 79012 |
| Sep. 21, 1986 | [IL] | Israel | 80104 |
| Sep. 21, 1986 | [IL] | Israel | 80098 |
| Nov. 7, 1986 | [IL] | Israel | 80552 |
| Nov. 7, 1986 | [IL] | Israel | 80551 |

[51] Int. Cl.$^5$ .......................................... B01D 29/46
[52] U.S. Cl. ..................................... 210/488; 210/492
[58] Field of Search ................ 210/193, 488, 492, 498

[56] References Cited

U.S. PATENT DOCUMENTS

| Re. 21,107 | 5/1939 | Seitz | 210/188 |
| Re. 26,709 | 11/1969 | Linden et al. | 210/500 |
| Re. 32,537 | 11/1987 | Drori | 210/107 |
| 226,271 | 4/1880 | Blaisdell | 210/488 |
| 327,646 | 10/1885 | Bingham, Jr. | |
| 428,307 | 5/1890 | Leland | 210/488 |
| 623,324 | 4/1899 | Levi | 210/329 |
| 730,485 | 6/1903 | Simoneton | 210/488 |
| 836,306 | 11/1906 | Cunning | |
| 913,636 | 2/1909 | Gardiner | |
| 1,098,616 | 6/1914 | Creveling | |
| 1,496,771 | 6/1924 | Cash | |
| 1,581,998 | 4/1926 | Fulcher | |
| 1,602,647 | 10/1926 | Carr | 137/872 |
| 1,642,864 | 9/1927 | Williams | 210/488 |
| 1,643,299 | 9/1927 | Furness | 210/488 |
| 1,673,743 | 6/1928 | Fulcher | |
| 1,719,346 | 7/1929 | Thompson | |
| 1,797,399 | 3/1931 | Boulade | |
| 1,804,512 | 5/1931 | Pickard | 210/492 |
| 1,849,042 | 3/1932 | Pickard | |
| 1,852,873 | 4/1932 | Berger | |
| 1,906,391 | 5/1933 | McKinley | 210/413 |
| 1,926,557 | 9/1933 | Perkins | 210/107 |
| 1,929,246 | 10/1933 | Hechenberkner | 183/50 |

(List continued on next page.)

FOREIGN PATENT DOCUMENTS

| 16248 | 10/1929 | Australia |
| 113021 | 5/1941 | Australia |
| 126722 | 2/1948 | Australia |
| 156599 | 5/1954 | Australia |
| 156721 | 5/1954 | Australia |
| 549633 | 12/1957 | Canada |
| 586111 | 11/1959 | Canada |
| 0057670 | 8/1982 | European Pat. Off. |
| 0177434 | 4/1986 | European Pat. Off. |

(List continued on next page.)

OTHER PUBLICATIONS

Spielman, Lloyd A. "Particle Capture From Low-Speed Laminar Flows" Am. Rev. Fluid Mech 1977, 9:297–319.

*Primary Examiner*—Ivars Cintins
*Attorney, Agent, or Firm*—Pearne, Gordon, McCoy & Granger

[57] ABSTRACT

A fluid filter including a housing defining a fluid inlet and a fluid outlet is disclosed. A filter element defining an upstream surface communicates with the fluid inlet and a downstream cylindrical surface communicates with the fluid outlet. The filter element includes a stack of filter disks defining a hollow volume interiorly thereof and a longitudinal axis. The filter includes a backflushing device having an axially displaceable backflushing nozzle assembly disposed within the hollow volume, and includes a rotating head coupled to the fluid inlet and a fluid outlet arranged to provide a generally radially directed pressurized jet and rotational motion of the rotating head for removing sediment from the filter element.

2 Claims, 45 Drawing Sheets

U.S. PATENT DOCUMENTS

| | | | |
|---|---|---|---|
| 1,955,903 | 4/1934 | Cammen | 210/130 |
| 1,976,547 | 10/1934 | Dumas | 210/109 |
| 1,992,101 | 2/1935 | Stuart | 210/165 |
| 1,994,656 | 3/1935 | Liddell | 210/167 |
| 2,031,165 | 2/1936 | Johnson | 210/181 |
| 2,137,556 | 11/1938 | Young | 210/488 |
| 2,178,463 | 10/1939 | Bahnson | 183/53 |
| 2,305,351 | 12/1942 | Hellan | 210/167 |
| 2,330,945 | 10/1943 | Becker | 210/169 |
| 2,338,417 | 2/1940 | Forest et al. | 210/167 |
| 2,338,418 | 1/1944 | Forest et al. | 210/167 |
| 2,338,419 | 1/1944 | Forrest et al. | 210/167 |
| 2,365,525 | 12/1944 | Cox | 210/167 |
| 2,374,756 | 5/1945 | Kisch et al. | 210/170 |
| 2,387,364 | 10/1945 | Terry | 137/153 |
| 2,422,735 | 6/1947 | La Guardia | 210/117 |
| 2,455,486 | 12/1948 | Hicks | 210/169 |
| 2,495,095 | 1/1950 | Ewbank | 210/169 |
| 2,507,827 | 6/1950 | Stafford et al. | 183/44 |
| 2,508,602 | 5/1950 | Goetz | 210/203 |
| 2,519,506 | 8/1950 | Russell | 210/183 |
| 2,554,016 | 5/1951 | Czarnecki | 210/492 |
| 2,557,375 | 6/1951 | Dickenson | 210/167 |
| 2,575,995 | 11/1951 | Briggs | 210/183 |
| 2,583,423 | 7/1951 | Halinan | 210/185 |
| 2,608,952 | 9/1952 | Herbert | 119/159 |
| 2,609,832 | 9/1952 | Smith | 137/489 |
| 2,631,732 | 3/1953 | Vocelka | 210/492 |
| 2,654,440 | 10/1953 | Robinson | 210/492 |
| 2,665,813 | 1/1954 | Bollaert | 210/203 |
| 2,670,760 | 3/1954 | Erikson | 137/675 |
| 2,670,851 | 3/1954 | Curtis | 210/120 |
| 2,670,851 | 3/1954 | Curtis | 210/120 |
| 2,692,686 | 10/1954 | Fleck | 210/488 |
| 2,696,306 | 12/1954 | Gomery | 210/42.5 |
| 2,702,637 | 2/1955 | Shepard | 210/492 |
| 2,742,158 | 4/1956 | Schuller | 210/152 |
| 2,757,802 | 8/1956 | Schmid | 210/169 |
| 2,758,877 | 8/1956 | Gleason | 137/872 |
| 2,768,751 | 10/1956 | Booth | 210/169 |
| 2,793,753 | 5/1957 | Webster | 210/153 |
| 2,843,267 | 7/1958 | Anderson | 210/236 |
| 2,847,126 | 8/1958 | Goodman | 210/411 |
| 2,855,106 | 10/1058 | English | 210/492 |
| 2,873,030 | 2/1959 | Ashton | 210/488 |
| 2,889,048 | 6/1959 | Nordin | 210/409 |
| 2,892,240 | 6/1959 | Frankenhoff | 25/157 |
| 2,907,466 | 10/1959 | Beddow | 210/457 |
| 2,920,690 | 1/1960 | Wright | 158/36.3 |
| 2,926,137 | 2/1960 | Calvert | 210/500 |
| 2,946,447 | 7/1960 | Weltz | 210/333 |
| 2,956,016 | 10/1960 | Leppla | 210/503 |
| 2,978,108 | 4/1961 | Strassheim | 210/488 |
| 3,005,556 | 10/1961 | Jensen | 210/488 |
| 3,018,791 | 1/1962 | Knox | 137/458 |
| 3,037,637 | 6/1962 | Bub | 210/487 |
| 3,048,276 | 8/1962 | Darnell | 210/304 |
| 3,061,102 | 10/1962 | Mayer, Jr. | 210/142 |
| 3,105,042 | 9/1963 | Roosa | 210/94 |
| 3,111,963 | 11/1963 | Brockwell | 210/492 |
| 3,149,070 | 9/1964 | Nash | 210/169 |
| 3,151,071 | 9/1964 | Kasten | 210/488 |
| 3,195,730 | 7/1965 | Muller | 210/488 |
| 3,221,888 | 12/1965 | Muller | 210/333 |
| 3,233,741 | 2/1966 | Bell | 210/500 |
| 3,272,342 | 9/1966 | McLaren et al. | 210/440 |
| 3,273,374 | 9/1966 | Annett | 72/340 |
| 3,278,040 | 10/1966 | Goldberg | 210/500 |
| 3,282,435 | 11/1966 | Goldberg | 210/500 |
| 3,322,281 | 5/1967 | Gulick | 210/134 |
| 3,323,963 | 6/1967 | Summers | 156/192 |
| 3,330,414 | 7/1967 | Mecky | 210/227 |
| 3,335,869 | 8/1967 | Hedges | 210/500 |
| 3,336,416 | 8/1967 | Barry | 210/297 |
| 3,355,021 | 11/1967 | Jones | 210/130 |
| 3,369,665 | 2/1968 | Paulson | 210/94 |
| 3,370,712 | 2/1968 | Smith | 210/492 |
| 3,382,982 | 5/1968 | Stevens | 210/184 |
| 3,397,794 | 8/1968 | Toth et al. | 210/488 |
| 3,400,734 | 9/1968 | Rosenberg | 137/495 |
| 3,445,002 | 9/1968 | Muller | 210/108 |
| 3,448,862 | 6/1969 | Kudlaty | 210/488 |
| 3,460,557 | 8/1969 | Gallant | 137/82 |
| 3,473,668 | 10/1969 | Bunyard | 210/492 |
| 3,493,113 | 2/1970 | Rosaen | 210/108 |
| 3,494,376 | 2/1970 | Doeringsfeld et al. | 137/624.14 |
| 3,503,511 | 3/1970 | Spitzberg | 210/232 |
| 3,511,374 | 5/1970 | Beal | 209/258 |
| 3,521,850 | 7/1970 | German | 251/28 |
| 3,529,726 | 9/1970 | Keenan | 210/232 |
| 3,561,602 | 2/1971 | Molitor | 210/266 |
| 3,574,509 | 4/1971 | Zentis | 210/108 |
| 3,622,003 | 11/1971 | Czech | 210/108 |
| 3,631,887 | 1/1972 | Schlechtriem et al. | 137/522 |
| 3,638,905 | 1/1972 | Ferris | 251/94 |
| 3,647,084 | 3/1972 | Martin | 210/488 |
| 3,648,843 | 3/1972 | Pearson | 210/443 |
| 3,666,107 | 5/1972 | Boggs | 210/483 |

(List continued on next page.)

U.S. PATENT DOCUMENTS

| | | | |
|---|---|---|---|
| 3,679,052 | 7/1972 | Asper | 210/75 |
| 3,703,465 | 11/1972 | Reese et al. | 210/333 |
| 3,717,252 | 2/1973 | Picard | 210/108 |
| 3,722,681 | 3/1973 | Boorujy | 210/108 |
| 3,722,851 | 3/1973 | Love | 251/54 |
| 3,788,593 | 1/1974 | Cohen | 251/28 |
| 3,789,990 | 2/1974 | Drori | 210/310 |
| 3,859,216 | 1/1975 | Sisson et al. | 210/440 |
| 3,882,025 | 5/1975 | Talley, Jr. | 210/354 |
| 3,890,232 | 6/1975 | Combest et al. | 210/223 |
| 3,957,636 | 5/1976 | Arvanitakis | 210/67 |
| 3,959,140 | 5/1976 | Legras | 210/107 |
| 3,994,810 | 11/1976 | Schaeffer | 210/103 |
| 4,026,806 | 5/1977 | Drori | 210/405 |
| 4,039,457 | 8/1977 | Schact et al. | 210/493 |
| 4,045,345 | 8/1977 | Drori | 210/107 |
| 4,048,067 | 9/1977 | Cheng | 210/84 |
| 4,060,483 | 11/1977 | Barzuza | 210/79 |
| 4,062,774 | 12/1977 | Hinojosa | 210/94 |
| 4,082,057 | 4/1978 | Hayes | 118/9 |
| 4,115,274 | 9/1978 | Boddeker | 210/346 |
| 4,119,540 | 10/1978 | Muller | 210/142 |
| 4,156,651 | 5/1979 | Mehoudar | 210/108 |
| 4,204,961 | 5/1980 | Cusato, Jr. | 210/232 |
| 4,207,181 | 6/1980 | Drori | 210/111 |
| 4,210,538 | 7/1980 | Tantillo et al. | 210/333 |
| 4,213,861 | 7/1980 | Muller et al. | 210/82 |
| 4,235,723 | 11/1980 | Bartlett, Jr. | 210/497.1 |
| 4,251,374 | 2/1981 | Cunningham | 210/232 |
| 4,267,042 | 5/1981 | Hofmann | 210/169 |
| 4,267,045 | 5/1981 | Hoof | 210/322 |
| 4,271,018 | 6/1981 | Drori | 210/107 |
| 4,278,540 | 7/1981 | Drori | 210/107 |
| 4,284,500 | 8/1981 | Keck | 209/250 |
| 4,288,330 | 9/1981 | Strub | 210/777 |
| 4,295,963 | 10/1981 | Drori | 210/108 |
| 4,297,209 | 10/1981 | De Visser et al. | 210/107 |
| 4,299,699 | 11/1981 | Boogay | 210/143 |
| 4,308,142 | 12/1981 | Braukmann | 210/355 |
| 4,312,374 | 1/1982 | Drori | 137/469 |
| 4,402,504 | 8/1983 | Drori | 210/107 |
| 4,402,829 | 9/1983 | Cordua | 210/333.01 |
| 4,410,430 | 10/1983 | Hagler | 210/446 |
| 4,430,232 | 2/1984 | Doucet | 210/798 |
| 4,435,287 | 3/1984 | Sumimoto | 210/131 |
| 4,462,916 | 7/1984 | Ecabert | 210/798 |
| 4,468,319 | 8/1984 | Laakso | 210/97 |
| 4,481,111 | 11/1984 | Christophe | 210/333.01 |
| 4,495,068 | 1/1985 | Rosaen | 210/91 |
| 4,517,089 | 5/1985 | Armand | 210/488 |
| 4,552,655 | 11/1985 | Granot | 210/108 |
| 4,552,662 | 11/1985 | Webster | 210/232 |
| 4,572,784 | 2/1986 | Drori | 210/133 |
| 4,582,603 | 4/1986 | Nasse | 210/323.2 |
| 4,592,838 | 6/1986 | Christophe et al. | 210/323.1 |
| 4,592,839 | 6/1986 | Rosenberg | 210/352 |
| 4,614,581 | 9/1986 | Drori | 210/108 |
| 4,624,785 | 11/1986 | Drori | 210/414 |
| 4,632,757 | 12/1986 | Rosenberg | 210/411 |
| 4,642,182 | 2/1987 | Drori | 210/232 |
| 4,642,188 | 2/1987 | DeVisser et al. | 210/333.1 |
| 4,654,143 | 3/1987 | Drori | 210/232 |
| 4,655,910 | 4/1987 | Tabor | 210/107 |
| 4,655,911 | 4/1987 | Tabor | 210/107 |
| 4,683,060 | 7/1987 | Drori | 210/448 |
| 4,689,148 | 8/1987 | Timm et al. | 210/321.1 |
| 4,707,258 | 11/1987 | Drori | 210/333.1 |
| 4,726,900 | 2/1988 | Keskinen et al. | 210/488 |
| 4,732,673 | 3/1988 | Degard et al. | 210/247 |
| 4,735,730 | 4/1988 | Bratten | 210/741 |
| 4,740,302 | 4/1988 | Rosenberg | 210/392 |
| 4,744,901 | 5/1988 | Drori | 210/323.1 |
| 4,751,000 | 6/1988 | Drori | 210/448 |
| 4,753,731 | 6/1988 | Drori | 210/492 |
| 4,762,615 | 8/1988 | Drori | 210/333.01 |
| 4,781,825 | 11/1988 | Grimes et al. | 210/107 |
| 4,824,564 | 4/1989 | Edwards et al. | 210/232 |
| 4,844,806 | 7/1989 | Drori | 210/448 |

FOREIGN PATENT DOCUMENTS

| | | |
|---|---|---|
| 0267866 | 5/1988 | European Pat. Off. |
| 0284729 | 10/1988 | European Pat. Off. |
| 846245 | 8/1952 | Fed. Rep. of Germany |
| 1007743 | 5/1957 | Fed. Rep. of Germany |
| 1213823 | 4/1966 | Fed. Rep. of Germany |
| 1289827 | 2/1969 | Fed. Rep. of Germany |
| 1461491 | of 1969 | Fed. Rep. of Germany |
| 1909129 | 9/1970 | Fed. Rep. of Germany |
| 1536766 | 1/1970 | Fed. Rep. of Germany |
| 2054291 | 5/1971 | Fed. Rep. of Germany |
| 1436277 | 1/1972 | Fed. Rep. of Germany |
| 1536796 | 11/1972 | Fed. Rep. of Germany |
| 2453445 | 5/1976 | Fed. Rep. of Germany |
| 2517635 | 11/1976 | Fed. Rep. of Germany |
| 2629848 | 1/1977 | Fed. Rep. of Germany |
| 2616915 | 11/1977 | Fed. Rep. of Germany |
| 3044843 | 12/1979 | Fed. Rep. of Germany |
| 2629151 | 10/1982 | Fed. Rep. of Germany |

(List continued on next page.)

FOREIGN PATENT DOCUMENTS

| | | |
|---|---|---|
| 3247440 | 7/1984 | Fed. Rep. of Germany . |
| 899337 | 5/1945 | France . |
| 1157258 | 5/1958 | France . |
| 1543176 | 10/1968 | France . |
| 38236 | 11/1971 | Israel . |
| 40046 | 8/1972 | Israel . |
| 49875 | 6/1976 | Israel . |
| 68288 | 3/1983 | Israel . |
| 68935 | 6/1983 | Israel . |
| 69638 | 9/1983 | Israel . |
| 69679 | 9/1983 | Israel . |
| 73164 | 10/1984 | Israel . |
| 73165 | 10/1984 | Israel . |
| 75110 | 5/1985 | Israel . |
| 75822 | 7/1985 | Israel . |
| 77317 | 12/1985 | Israel . |
| 77132 | 6/1986 | Israel . |
| 473331 | 7/1952 | Italy . |
| 442936 | 2/1969 | Japan . |
| 63142 | 1/1941 | Norway . |
| 10814 | of 1884 | United Kingdom ................ 210/488 |
| 300600 | 11/1928 | United Kingdom . |
| 563832 | 8/1944 | United Kingdom . |
| 570960 | 7/1945 | United Kingdom . |
| 687967 | 2/1953 | United Kingdom . |
| 841207 | 7/1960 | United Kingdom . |
| 926600 | 5/1963 | United Kingdom . |
| 1064746 | 4/1967 | United Kingdom . |
| 1096739 | 12/1967 | United Kingdom . |

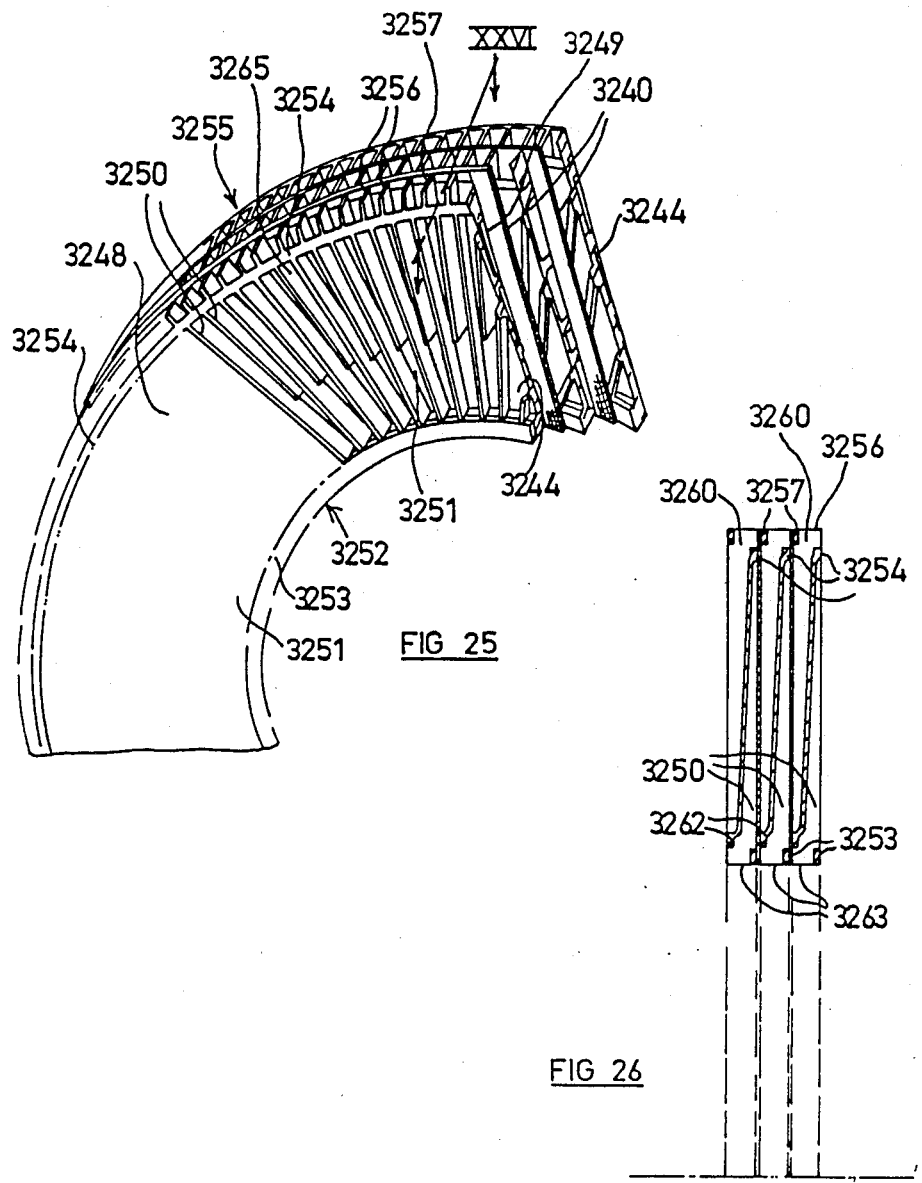

FILTERING ELEMENT

This is a division of application Ser. No. 07/013,248, filed Feb. 10, 1987, now U.S. Pat. No. 4,935,126.

FIELD OF THE INVENTION

The present invention relates to filters and particularly to multiple-disk type filters useful in filtering particles from water and in many other applications.

BACKGROUND OF THE INVENTION

Multiple-disk type filters generally include a housing in which the filter body within the housing is in the form of a stack of like, centrally-apertured, filter disks of substantially uniform thickness along their widths and having grooved side faces defining filtering channels between the adjacent disks in the stack. In some applications of such filters, the outer face of the stack of filter disks constitutes the upstream side of the filter, in which case the fluid being filtered passes from the outer face to the inner face of the stack. In other applications of such filters, the inner face of the stack constitutes the upstream side of the filter, in which case the fluid being filtered passes from the inner to the outer face through the filter stack.

Multiple-disk type filters have a number of advantages over other known types of filters, for example, the cylindrical-screen type filter. The multiple-disk filter has a larger capacity for removing and retaining dirt particles, since these may be retained also between the side faces of the disks, in addition to being retained on the upstream surface as in the cylindrical-screen type filter. Another advantage in the multiple-disk filter is that it is not as easily ruptured as the screen type and therefore there is less danger that because of a malfunction, unfiltered water may pass through and clog sprinklers or other devices downstream of the filter. The latter advantage is particularly important in self-cleaning filters wherein the upstream face of the filter is cleaned by a cleaning nozzle which, in the case of a screen-type filter, may rupture the screen by particles becoming wedged between the cleaning nozzle and the filter screen.

Back-flushable filters of various types are well known in the art for a great variety of applications. A particularly successful type of backflushable filter employing filter disks is described and claimed in the following patents of applicant: U.S. Pat. Nos. 4,026,806; 4,042,504; 4,045,345; 4,271,018; 4,295,963.

SUMMARY OF THE INVENTION

There is provided in accordance with a preferred embodiment of the invention a fluid filter comprising a housing defining a fluid inlet and a fluid outlet; a filter element defining an upstream surface communicating with the fluid inlet and a downstream surface communicating with the fluid outlet, the filter element defining a hollow volume interior thereof; and backflushing apparatus associated with the filter element, the fluid inlet and the fluid outlet.

The present invention also provides an improved disk-type filter including a housing having an inlet connectable to an upstream pipe, and an outlet connectable to a downstream pipe; and a stack of disks disposed within the housing for separating solid particles from a fluid flowing between the disks from the upstream side of the stack to the downstream side thereof; characterized in that a filter aid is associated with the stack.

A filter aid is a finely divided solid, which may be precoated on the filter support, and is usually also mixed with a liquid to be filtered. It may also be a liquid, which is mixed with the liquid to be filtered. In the process of filtration, both the filter aid and foreign solids are removed from the liquid, and the filter aid, added to the liquid gradient, forms a rigid, permeable, incompressible "cake" on the filter. Whatever fine solids were originally suspended in the liquid are entrained in the cake as it is built up. The porous nature of the cake prevents such solids from agglomerating and forming an impervious layer on the filter. This porous, bulky cake makes filtration more rapid and efficient than it would have been in the absence of a filter aid and greatly increases the time which elapses before the filter becomes clogged.

Various types of filter aid are known, including diatomaceous earth, plastic-coated diatomaceous earth, diatomaceous silica, bentonites, carbon, asbestos, cellulose, pumice, pumicite, obsidian, pitchstone, volcanic ash, volcanic glass, attapulgite clay, wood pulp, fly ash, kieselguhr, or calcium hypochlorite.

Filter aids are disclosed in the following U.S. patents, the techniques of which are incorporated herein by reference: U.S. Pat. No. 2,508,602 to Goets, U.S. reissue No. 26,709 to Vander Linden; U.S. Pat. No. 3,282,435 to Goldberg et al.; U.S. Pat. No. 3,278,040 to Goldberg et al.; U.S. Pat. No. 3,233,741 to Bell et al.; U.S. Pat. No. 2,956,016 to Leppla et al.; U.S. Pat. No. 2,926,137 to Calvert; U.S. Pat. No. 2,892,240 to Frankenhoff; and U.S. Pat. No. 2,696,306 to Gomory.

The backflushing apparatus includes inlet pressure responsive valve apparatus operative to open in response to a selected inlet pressure so as to permit fluid flow into engagement with the upstream surface and to close in the absence the selected inlet pressure, preventing backflow of fluid from the interior of the housing to the inlet.

In accordance with a preferred embodiment of the invention, the pressure responsive valve apparatus includes means for deflecting fluid entering the housing via the inlet from direct impingement with the facing upstream surface of the filter element.

Additionally in accordance with a preferred embodiment of the present invention the inlet pressure responsive valve apparatus includes apparatus for providing fluid coupling between the interior of the housing adjacent the upstream surface and a backflushing outlet when the valve apparatus closes off the fluid inlet from the interior of the housing.

Further in accordance with a preferred embodiment of the invention, the filter element is of generally cylindrical configuration defining an upstream cylindrical surface and a downstream cylindrical surface.

Additionally in accordance with a preferred embodiment of the present invention, the backflushing apparatus comprises a backflushing nozzle normally disposed within the hollow cylindrical volume and comprising a rotating head having fluid outlet meanns arranged to provide a generally radially directed pressurized jet and rotational motion of the rotating head.

The present invention also seeks to provide a backflushable filter, preferably of the disk type, which is suitable for any water filtration system, and which is characterized by a filter aid being associated with the filter.

The present invention also provides a backflushable filter, preferably of the disk type, which is suitable for any water filtration system such as that used for a health tub or pool, and is particularly suitable for household use, in that it can readily be cleaned to a pristine state, without substantial disassembly.

There is also provided in accordance with an embodiment of the invention a filter element comprising a multiplicity of disk-like elements of a porous material separated by a multiplicity of grooved spacer elements, each spacer element defining axially tapered generally radially extending grooves.

Additionally in accordance with a preferred embodiment of the invention, each spacer element defines on a first side thereof axially tapered generally radially extending grooves opening to a downstream side and on a second side thereof axially tapered generally radially extending grooves opening to an upstream side.

Further in accordance with an embodiment of the invention, the grooves on the first and second sides are skewed with respect to each other so as to provide structural strength to the spacer elements.

In accordance with a preferred embodiment of the present invention the grooves disposed on opposite sides of the disk of porous material are arranged in mutually skewed orientation such that each groove on a given side of the porous material overlaps at least two and preferably three grooves on the opposite side of the porous material.

The above arrangement enables fluid passing through the filter element during normal filtering operation to enter through any given groove and, after passing through the porous material to drain from the filter element through a plurality of channels, thus enabling clogged or blocked channels to be bypassed and greatly extending the filtration capacity of the filter element.

The above arrangement also enables backflushing fluid passing through the filter element during backflushing operation to enter from the downstream side at any given groove and after passing through the porous material to drain from the filter element through a plurality of channels, thus increasing the efficiency of backflushing operation.

Additionally in accordance with an embodiment of the invention, the grooves taper downwardly from a maximum adjacent their opening. Further in accordance with an embodiment of the invention the grooves are terminated at the end opposite their opening, thus requiring all fluid to pass through the porous material.

Further in accordance with a preferred embodiment of the present invention there are defined first and second peripheral sealing bands on the first side of the spacer element and third and fourth peripheral sealing bands on the second side of the spacer element. The sealing bands provide sealing engagement with porous material interposed between adjacent stacked disks, whereby fluid entering a groove at an upstream side of the filter element during normal filtering may only exit the groove via the porous material to the downstream side of the filter element and whereby fluid entering a groove at a downstream side of the filter element during backflushing can only exit the groove via the porous material to the upstream side of the filter element.

The first and second rings are located at respective upstream and downstream radial locations on the first side of the disk. The third and fourth rings are located at respective upstream and downstream radial locations on the second side of the disk. The third and fourth rings are each typically radially offset outwardly with respect to the respective corresponding first and second rings, such that the first and third rings lie in adjacent relationship on opposite sides of the disk and the second and fourth rings lie in adjacent relationship on opposite sides of the disk.

The sealing rings are generally coplanar with the upstanding portions adjacent thereto.

There is also provided in accordance with a preferred embodiment of the present invention, a backflushable filter defining an inlet and an outlet and comprising a filter element defining an upstream side arranged to receive a flow of fluid to be filtered from the inlet, and a downstream side arranged to be coupled to the outlet, the filter element being arranged about a longitudinal axis; apparatus for providing a concentrated, relatively high pressure flow of backflushing liquid to the filter element directed from the downstream side to the upstream side and arranged to be axially movable, parallel to the longitudinal axis such that the relatively high pressure flow sequentially engages different regions of the filter element for sequential backflushing thereof.

Additionally in accordance with an embodiment of the invention, the filter apparatus also comprises a one way valve apparatus permitting high pressure flow to bypass the filter element from the inlet to the outlet.

According to a preferred embodiment of the present invention, the one way valve comprises a first one way valve such as a pressure valve arranged between the inlet and the downstream side and a second one way valve such as a check valve arranged between the outstream side and the outlet.

There is also provided in accordance with a preferred embodiment of the present invention, a disk-type filter including a housing having an inlet connectable to an upstream pipe, and an outlet connectable to a downstream pipe; and a stack of disks disposed within the housing for separating solid particles from a fluid flowing between the disks from an upstream side of the stack to a downstream side thereof; characterized in that the stack includes a plurality of co-operating filter elements defining a plurality of paired co-operating filter surfaces, including a first surface defining a plurality of spaced, generally circumferentially extending raised line portions separated by generally circumferentially extending grooves and a second surface defining a plurality of generally radially extending fingers each outlined by a raised line portion having a notched configuration, the exterior of the fingers communicating with either one of the upstream side or the downstream side and the interiors of the fingers communicating with the other one of the upstream side or the downstream side.

In accordance with a preferred embodiment of the present invention, the raised line portion on the second surface defines a filtering barrier between the upstream side and the downstream side. Further in accordance with an embodiment of the invention, the notched configuration of the raised line portion on the second surface defines an enhanced length filtering barrier.

Additionally in accordance with a preferred embodiment of the present invention, the thickness of the raised line portion on the second surface is less than the separation between adjacent line portions. Preferably, the thickness of the raised line portion on the second surface is approximately one half or less than the separation between adjacent line portions, thus enabling a relatively high density of filtering barrier to be defined on a given area of filter disk.

Further in accordance with an embodiment of the invention, the raised line portion is of generally uniform thickness, thus providing a filtering barrier of generally uniform characteristics.

In accordance with a preferred embodiment of the invention, the raised line portion on the second surface is continuous along the entire second surface and defines a closed loop.

In accordance with a preferred embodiment of the present invention the stack of disks comprises first and second disk types, the first disk type being formed with first filter surfaces on both of its planar surfaces and the second disk type being formed with second filter surfaces on both of its planar surfaces.

In accordance with this preferred embodiment, the radially extending raised line portions on the two second surfaces of the second disk type defining the fingers are preferably displaced in respective out of phase relationship. This arrangement provides enhanced structural strength of the second disk type and obviates the requirement for a predetermined relative azimuthal arrangement of disks in a stack.

There is also provided in accordance with a preferred embodiment of the invention a fluid filter comprising a housing defining a fluid inlet and a fluid outlet, a filter element of generally cylindrical configuration defining an upstream cylindrical surface communicating with the fluid inlet and a downstream cylindrical surface communicating with the fluid outlet, the filter element defining a hollow cylindrical volume interior thereof, a backflushing nozzle normally disposed within the hollow cylindrical volume and comprising a rotating head having fluid outlet means arranged to provide a generally radially extending stream and rotational motion of the rotating head.

Additionally in accordance with a preferred embodiment of the invention, the backflushing nozzle also includes a centering base member which is apertured to permit passage of fluid therepast.

Further in accordance with a preferred embodiment of the present invention, the housing is formed of a main portion and a top portion and rod means are provided for securing the filter element to the housing and the top portion onto the main portion.

According to a preferred embodiment of the present invention, the filter element comprises a disk-type filter element and includes a stack of disks.

In this embodiment, the rod means are also operative for securing the disks in the stack together.

According to a further preferred embodiment of the present invention, the rotating head comprises first and second liquid outlets, the first outlet being arranged to provide a radially extending stream and the second outlet arranged to provide a tangentially directed stream for driving the rotating head in rotational motion.

There is also provided in accordance with a preferred embodiment of the invention a fluid filter comprising a housing defining a fluid inlet and a fluid outlet, a filter element of generally cylindrical configuration defining an upstream cylindrical surface communicating with the fluid inlet and a downstream cylindrical surface communicating with the fluid outlet, the filter element defining a hollow cylindrical volume interior thereof, a backflushing nozzle normally disposed within the hollow cylindrical volume and comprising a rotating head having fluid outlet means arranged to provide at least one generally outwardly radially extending stream.

In accordance with this preferred embodiment of the invention, the filter element defines a multiplicity of generally outwardly radially extending filtering chambers which are arranged such that the at least one stream, when impinging thereon, is directed therethrough for enhanced backflushing operation.

Further in accordance with this preferred embodiment of the invention, the fluid outlet means are preferably configured to have a configuration such that along the dimension of the longitudinal axis of the cylinder of the filter element, the extent of the stream is such that it may be directed onto a single filtering chamber for enhanced backflushing operation.

Additionally in accordance with this preferred embodiment of the invention, the fluid outlet means comprise first and second fluid outlets, producing respective first and second radially extending streams which are directed in generally parallel planes spaced from each other along the longitudinal axis of the cylinder.

Further in accordance with a preferred embodiment of the invention there is provided a fluid filter comprising a housing defining a fluid inlet and a fluid outlet, a filter element of generally cylindrical configuration defining an upstream cylindrical surface communicating with the fluid inlet and a downstream cylindrical surface communicating with the fluid outlet, the filter element defining a hollow cylindrical volume interior thereof, a backflushing nozzle normally disposed within the hollow cylindrical volume and comprising a rotatable head having fluid outlet means arranged to provide at least one eccentrically directed generally outwardly radially extending stream and means for restricting the stream to predefined azimuthal limits.

In accordance with a preferred embodiment of the embodiment, the fluid outlet means comprises at least one nozzle and curved engagement means surrounding the at least one nozzle for engagement with the downstream cylindrical surface.

Additionally in accordance with a preferred embodiment of the invention, there is provided a backflushing nozzle for use in backflushing a filter and comprising a rotating head having first and second liquid outlets, the first outlet arranged to provide a radially extending stream and the seccond outlet arranged to provide a tangentially directed stream for providing rotational motion of the rotating head.

Additionally in accordance with an embodiment of the invention, there is provided a backflushing nozzle for use in backflushing a filter and comprising a head defining a tapered protrusion and a liquid outlet disposed at the protrusion, whereby the head is arranged such that the protrusion sequentially engages an spreads folds of filter material while the liquid outlet provides a pressurized spray at the spread folds.

An object of the present invention is to provide a multiple-disk-filter having a capacity for removing and retaining large quantities of solid particles from the fluid before cleaning of the filter is required.

According to a broad aspect of the present invention, there is provided a filter including a housing having an inlet connectable to an upstream pipe, and an outlet connectable to a downstream pipe; and a stack of disks disposed within said housing for separating solid particles from a fluid flowing between said disks from the upstream side of stack to the downstream side thereof; characterized in that the stack includes: a plurality of filter disks having a large surface area of their side faces formed with grooves; and a spacer member interposed between each pair of adjacent filter disks; the spacer members having surfaces contacting only a portion of the grooved faces of the filter disks leaving a portion of the grooved faces of the filter disks on the upstream side of the stack not contacted by the spacer members, to thereby form; (a) compartments on the upstream side of the stack for accumulation of solid particles which settle in the grooves; (b) edge filtering passageways along the upstream edges of the spacer members in contact with the grooved faces of the filter disks, which passageways define the size of particles separated by the filter; and (c) further filtering passageways of large surface area in the compartments, the latter passageways extending between the particles settling in the grooves in the compartments, and through the grooves to the downstream side of the stack.

A filter constructed in accordance with the foregoing features has been found to have a large capacity for removing and retaining solid particles before cleaning of the filter is required because of undue clogging by the removed particles.

There is provided in accordance with a preferred embodiment of the present invention, a disk-type filter including a housing having an inlet connectable to an upstream pipe, and an outlet connectable to a downstream pipe; and a stack of filter elements disposed within the housing for separating solid particles from a fluid flowing between the filter elements from an upstream side of the stack to a downstream side thereof; characterized in that the stack includes a plurality of cooperating filter elements defining a plurality of paired cooperating filter surfaces, including a first surface defining an array of grooves, extending in a first orientation and a second surface definning an undulating strip defining an array of grooves facing the array of grooves of the first surface and extending in a second orientation, skewed with respect to the first orientation, one side of the undulating strip communicating with the upstream side and the other side of the undulating strip communicating with the downstream side.

In accordance with a preferred embodiment of the present invention, the undulating strip is configured to define a plurality of generally radially extending fingers each having formed thereon a pair of spaced, generally raised line portions separated by an interior area, the raised line portions defining a plurality of spaced grooves facing the plurality of grooves of the first surface and extending in a second orientation, skewed with respect to the first orientation, the exterior of the fingers communicating with either one of the upstream side or the downstream side and the interiors of the fingers communicating with the other one of the upstream side or the downstream side.

In accordance with a preferred embodiment of the invention the first surface defines a continuous surface and the first orientation is a circumferentially extending orientation.

In accordance with another preferred embodiment of the invention the first surface defines a plurality of generally radially extending fingers arranged in registration with the fingers of the second surface, whereby the raised line portions and grooves of the first and second surfaces extend in overlapping mutually-skewed orientations.

Additionally in accordance with the invention, the raised line portions and grooves of the first and second surfaces define multiple branched paths for traversal of fluid from the upstream side to the downstream side.

Further in accordance with a preferred embodiment of the invention, a filter aid, such as diatomaceous earth or activated carbon is disposed upstream of the engaged first and second surfaces.

In accordance with a preferred embodiment of the present invention, the upstream facing edge of the second surface defines a filtering barrier between the upstream side and the downstream side. Further in accordance with an embodiment of the invention, the engaging mutually skewed groove arrays of the first and second surfaces define an enhanced length filtering pathway.

Additionally in accordance with a preferred embodiment of the present invention, the thickness of the raised line portion on the second surface is less than the separation between adjacent line portions. Preferably, the thickness of the raised line portion on the second surface is approximately one half or less than the separation between adjacent line portions, thus enabling a relatively high density of filtering barrier to be defined on a given area of filter element.

Further in accordance with an embodiment of the invention, the raised line portion is of generally uniform thickness, thus providing a filtering barrier of generally uniform characterisitics.

In accordance with a preferred embodiment of the invention, the raised line portion on the second surface is continuous along the entire second surface and defines a closed loop.

Further in accordance with a preferred embodiment of the present invention, the undulating strip is configured in the form of curved fingers, thus producing an overall strip of enhanced length to filter element surface area ratio.

In accordance with one preferred embodiment of the present invention the stack of filter elements comprises first and second filter element types, the first filter element type being formed with first filter surfaces on both of its planar surfaces and the second filter element type being formed with second filter surfaces on both of its planar surfaces.

In accordance with this preferred embodiment, the radially extending raised line portions on the two second surfaces of the second filter element type defining the fingers are preferably displaced in respective out of phase relationship. This arrangement provides enhanced structural strength of the second filter element type and obviates the requirement for a predetermined relative azimuthal arrangement of filter elements in a stack.

Further in accordance with a preferred embodiment of the present invention, the stack of filter elements comprises a generally cylindrical element having an axial central bore along its longitudinal axis which defines the downstream side.

Additionally in accordance with this embodiment of the invention, the apparatus for providing comprises a fluid discharge device arranged for axial movement along the bore in communication with the downstream side.

Further in accordance with an embodiment of the invention, the fluid discharge device comprises fluid driven means for providing rotation of the relatively high pressure flow about the longitudinal axis.

Additionally in accordance with an embodiment of the invention, the fluid discharge device is manually manipulable for providing the axial movement along the bore.

Further in accordance with an embodiment of the invention, the discharge device in normally seated within the bore.

Additionally in accordance with an embodiment of the invention, the discharge device is provided with valve means which seal the discharge device when it is fully seated within the bore.

Further in accordance with an embodiment of the invention, the filter apparatus comprises a manually operable multi-flow valve having a normal position wherein fluid to be filtered is coupled to the upstream side of the stack of filter elements and a backflush position wherein fluid to be filtered is prevented from reaching the upstream side of the stack of filter elements and is directed to the means for providing a pressurized flow and wherein a backflush drain communicating with the upstream side of the stack of filter elements is coupled for draining to the atmosphere.

BRIEF DESCRIPTION OF THE DRAWINGS

The present invention will be understood and appreciated more fully from the following detailed description taken in conjunction with the drawings in which:

FIG. 25 is an illustration of a portion of a stack of filter disks constructed and operative in accordance with another preferred embodiment of the invention;

FIG. 26 is a sectional illustration taken along the lines XXVI—XXVI in FIG. 25;

DETAILED DESCRIPTION OF THE DRAWINGS

Figure 1:
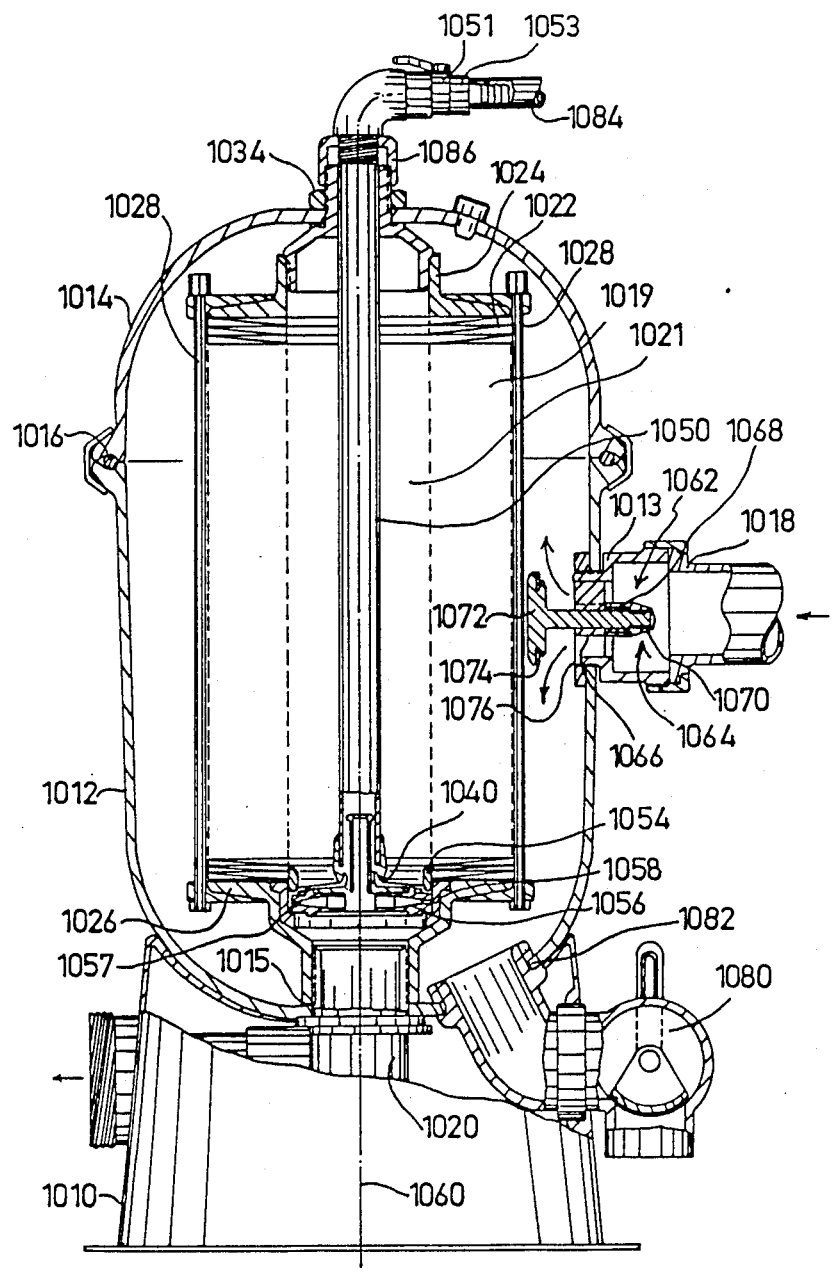
FIG. 1 is a partially cut-away side view sectional illustration of a filter constructed and operative in accordance with an embodiment of the present invention in a first operative orientation.

Reference is now made to FIG. 1 which illustrates a filter constructed and operative in accordance with a preferred embodiment of the present invention and comprising a base 1010 on which is fixedly supported a bottom housing portion 1012. Removably mounted onto the bottom housing portion 1012 is a top housing portion 1014, which is maintained in sealing engagement therewith by means of a sealing ring 1016. The bottom housing portion 1012 typically comprises an inlet opening 1013 and an outlet opening 1015.

A fluid inlet 1018 is provided at inlet opening 1013 and communicates with the outside cylindrical surface, hereinafter termed the "upstream surface" of a filter element 1019. A fluid outlet 1020 is defined at outlet opening 1015 and communicates with a hollow interior volume 1021 of filter element 1019 adjacent the inner cylindrical surface of the filter element, hereinafter termed the "downstream surface".

The filter element 1019 preferably comprises a stack of hollow center filter disks 1022 of any suitable type. Alternatively, the filter element may comprise any other suitable type of filter element such as a cartridge or cylindrical mesh filter. Suitable filter disks are described in the U.S. Patents listed hereinabove in the "Background of the Invention," and are operative to remove particulate matter from liquids passing therethrough from the upstream surface to the downstream surface. A preferred filter disk arrangement is described and claimed in co-pending Israel Patent Application No. 78160, filed Mar. 14, 1986, the disclosure of which is incorporated herein by reference.

The stack of filter disks 1022 is preferably removably mounted in coaxial relationship so as to define volume 1021 and is retained within the housing by means of top and bottom retaining collars 1024 and 1026. A plurality of threaded rods 1028, typically four in number, secure the stack of filter disks 1022 in place. A cover retaining nut 1034 serves to retain cover portion 1014 onto the bottom portion 1012.

It is noted that throughout the present specification and claims reference is made to fluid filtering. According to a preferred embodiment of the invention, the apparatus is adapted for filtering of liquids, however, it is also alternatively applicable for filtering of other fluids, such as gases.

A high pressure revolving spray nozzle assembly 1040 is disposed mainly within volume 1021 and comprises a water supply shaft 1050 having a water inlet 1051 and an associated inlet valve 1053. A fixed base portion 1054 is typically mounted onto shaft 1050 and serves to maintain the nozzle assembly 1040 centered with respect to volume 1021 and the downstream cylindrical surface of filter element 1019. Base portion 1054 is typically formed in an apertured manner to permit liquid flow therepast through volume 1021.

A rotating outlet head 1056 is arranged for relatively free rotation about a rotation axis 1060 defined in shaft 1050 and is preferably provided with first and second output apertures 1057 and 1058.

Outlet aperture 1057, which is the primary outlet aperture, is typically arranged to provide a radially directed concentrated high pressure backflushing jet, which serves to flush particulate matter from the filter element 1019. Outlet aperture 1058 is arranged to provide a tangentially directed stream, which produces rotation of head 1056 about axis 1060.

Inlet 1051 is typically coupled via a flexible hose 1084 to a backflush liquid supply which may be connected to a pressurized source of liquid to be filtered.

According to a preferred embodiment of the present invention, there is associated with inlet 1018 a one way pressure or flow responsive valve 1062 typically comprising a stem 1064, which is slidably mounted on an apertured stem support 1066 and is urged toward a closed orientation typically by means of a spring 1068. Spring 1068 is typically seated between a spring seat 1070 mounted onto one end of stem 1064 and the apertured stem support 1066.

The end of stem 1064, opposite from that associated with spring seat 1070, is formed as a deflector 1072 and has a peripheral sealing surface 1074 which sealingly engages a rim 1076 of valve 1062, when the valve is closed. FIG. 1 illustrates the valve 1062 in an open orientation, when fluid, such as water, is flowing under pressure from a fluid source (not shown) to the interior of the housing, as during normal filtering operation. It is a particular feature of the present invention that deflector 1072 serves to deflect the incoming fluid, when the valve 1062 is open, so that it does not impinge directly onto the facing portion of the upstream surface of filter element 1019, thus forcing dirt thereinto. It is also a particular feature of deflector 1072 that it provides a directionally uniform distribution of the deflected fluid thereabout.

Figure 2:
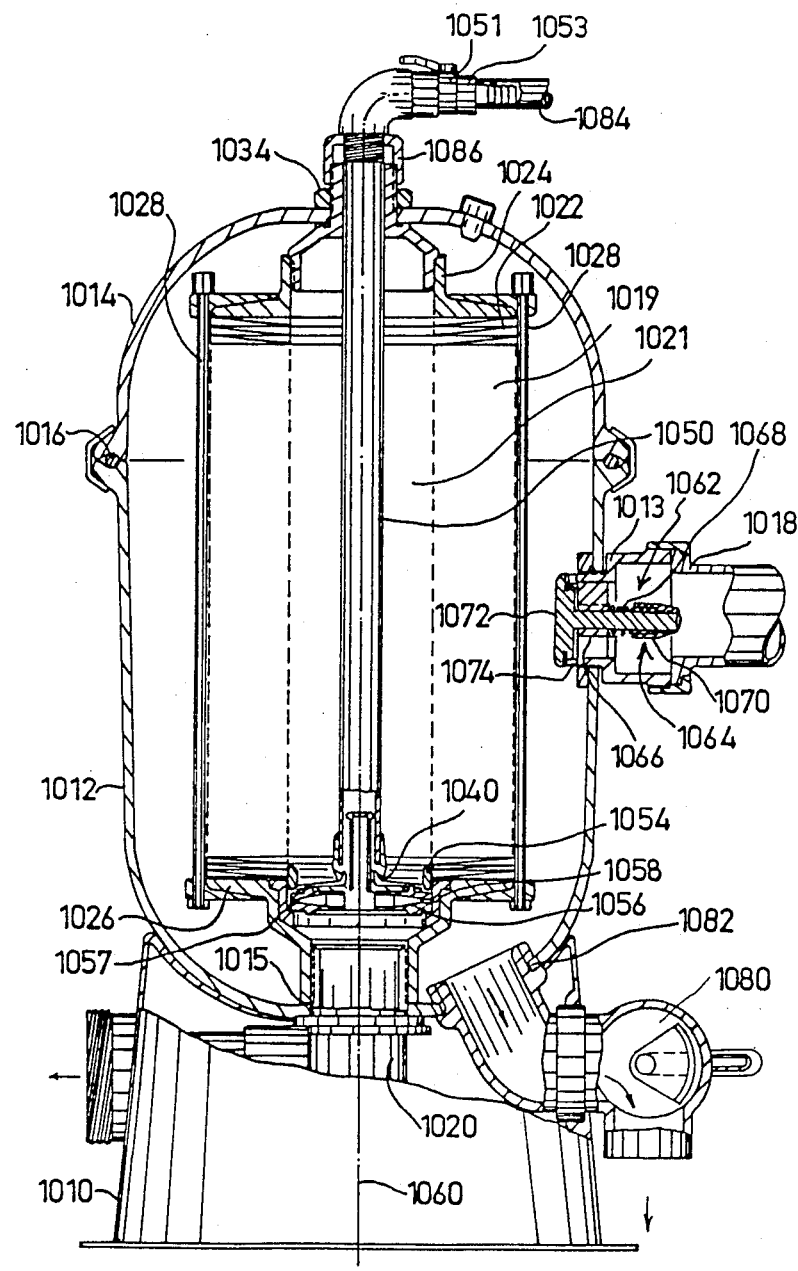
FIG. 2 is a partially cut-away side view sectional illustration of the filter of FIG. 1 in a second operative orientation.

FIG. 2 illustrates the valve 1062 in a closed orientation, as during backflushing, when the pressure gradient between the inlet and the interior of the housing is opposite to that which is obtained during normal filtering, or is zero.

It is appreciated that valve 1062 is operative to prevent backflow of fluid into the inlet during backflushing, by automatically closing whenever the pressurized flow of water into the housing for normal filtering is terminated.

A manually operable one way valve 1080 is operative to provide selectable drainage from the interior of the housing communicating with the upstream surface of the filter element, in communication with a backflush drain outlet 1082.

During normal operation of the filter of the present invention, assembly 1040 is located mainly within volume 1021 and shaft 1050 is sealingly coupled to the top portion 1014 of the housing by means of a sealing collar 1086 which sealingly engages threading on shaft 1050 and on the top portion 1014. Valve 1062 is operated by the pressure of the incoming liquid to assume an open orientation as shown in FIG. 1, permitting the incoming liquid to come into filtering engagement with the filter element 1019. Valve 1080 is oriented as shown in FIG. 1 such that liquid to be filtered is not drained therethrough. The incoming liquid passes through the filter element 1019 from the upstream surface to the downstream surface, being filtered in the process. The filtered liquid passes through volume 1021 and outlet 1020. Valve 1053 is closed.

During backflush operation, the pressurized liquid source is decoupled from inlet 1018 and valve 1080 is opened, as seen in FIG. 2. Valve 1053 is opened to provide a pressurized flow of water to assembly 1040, collar 1086 is disconnected.

High pressure spray outlet head 1056 is manually reciprocated axially along the interior of the filter element at the downstream surface, causing a high pressure concentrated jet of water to impinge on the downstream surface thereof for dislodging accumulated filtered material from the filter element. This arrangement enables substantially the entire downstream surface to be thus scanned, region by region, by the high pressure concentrated jet for efficient backflush cleaning of the filter element.

Reference is now made to FIGS. 3–6B, which illustrate an alternative preferred embodiment of the invention. The filter shown in FIG. 3–6B may be identical to that described hereinabove in connection with FIGS. 1 and 2 except as specifically explained hereinbelow. The common elements of the two embodiments are indicated by the same reference numerals.

In accordance with a preferred embodiment of the invention, illustrated in FIGS. 3–6B, a two-position fluid pressure controlled valve is provided for governing both inlet of fluid to be filtered to the upstream side of the filter element 1019 during normal filtering operation and drainage of backflushing drain fluid from the upstream side of the filter element 1019 during backflushing operation.

A conduit 1100 communicates with the interior of the filter housing at the upstream side of the filter element via a communication port 1102 and also defines an inlet opening 1104 for receiving fluid to be filtered and an outlet opening 1106 for drainage of backflushing liquid. Associated with respective openings 1104 and 1106 are respective inlet and outlet connection couplings 1108 and 1110, each of which defines a generally cylindrical inwardly directed inner surface 1112 which is formed to define an apertured stem mounting 1114. Couplings 1108 and 1110 also define respective inwardly directed rims 1115 and 1117.

A valve stem 1116 is slidingly mounted onto stem mountings 1114 and comprises a rod 1118 which is fixedly attached to or integrally formed with a sealing cap 1120, formed with a pair of peripheral sealing surfaces 1122, typically formed of rubber, on opposite sides thereof. A spring 1124, seated between a spring seat 1126 formed on one side of rod 1118 and the adjacent stem mounting 1114, urges the valve stem 1116 into a second operative orientation, wherein the cap 1120 lies in sealing engagement with rim 1115. This orientation is illustrated in FIG. 6B.

Figure 6A:
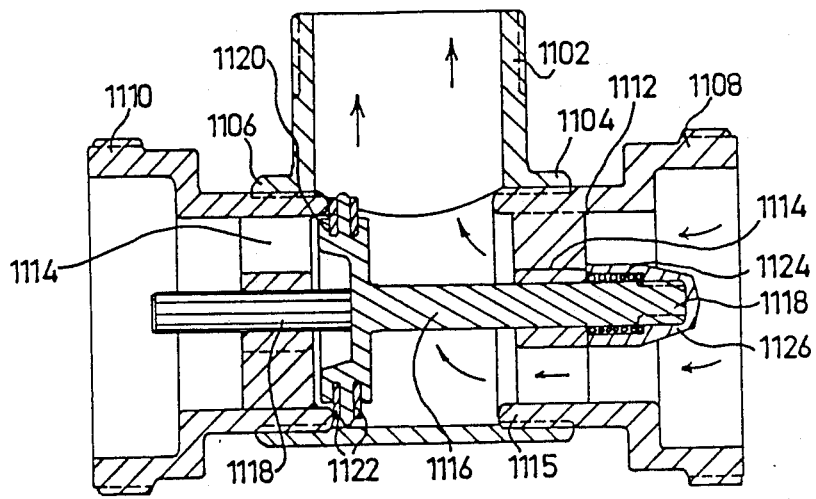
FIGS. 6A and 6B are respective side view sectional illustrations of the valve apparatus of the valve of FIGS. 3-5 in respective first and second operative orientations.
Figure 6B:
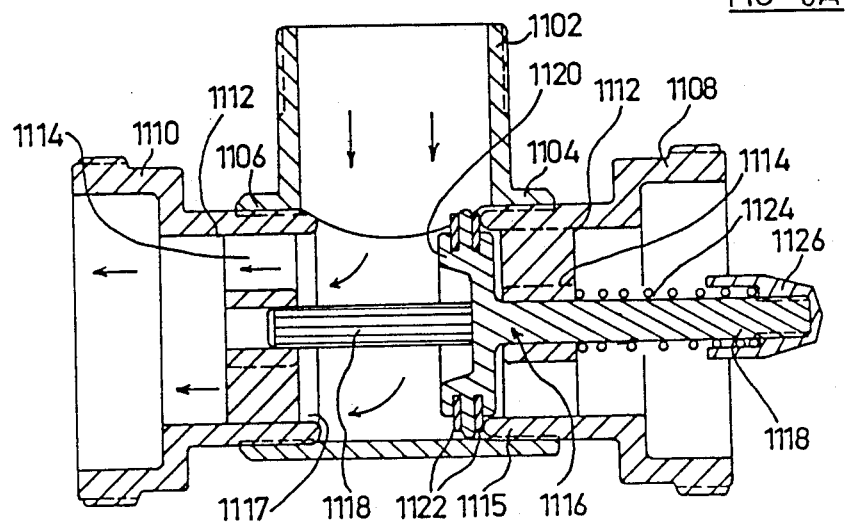

During normal filtering operation, fluid to be filtered is supplied under sufficient pressure as to overcome the urging of spring 1124 and to force cap 1120 into sealing engagement with rim 1117, as shown in FIG. 6A. In this operative engagement, the fluid to be filtered enters the upstream side of the filter housing, and the backflush drain is blocked.

Figure 3:
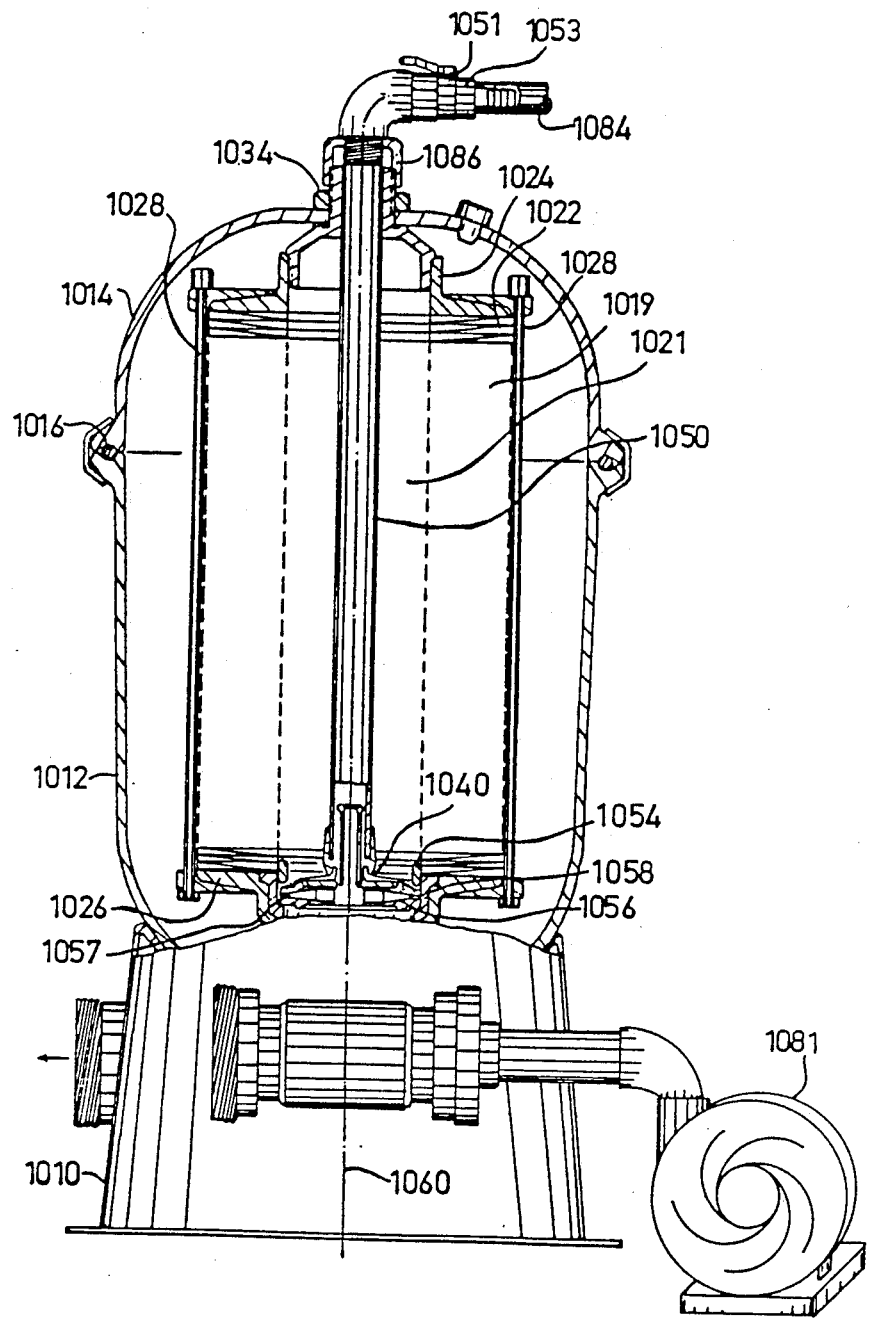
FIG. 3 is a partially cut-away side view sectional illustration of a filter constructed and operative in accordance with an alternative embodiment of the present invention.
Figure 4:
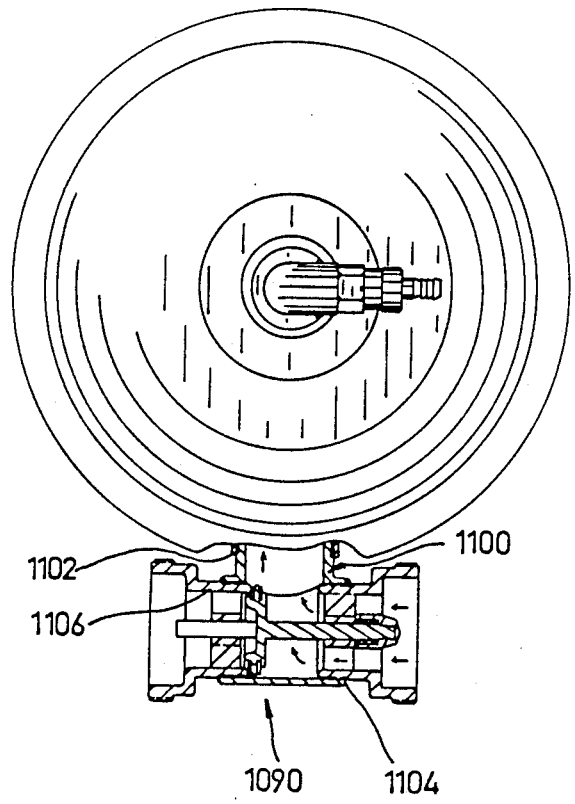
FIG. 4 is a partially cut-away top view sectional illustration of the filter of FIG. 3, showing the structure of valve apparatus forming part thereof in a first operative orientation.
Figure 5:
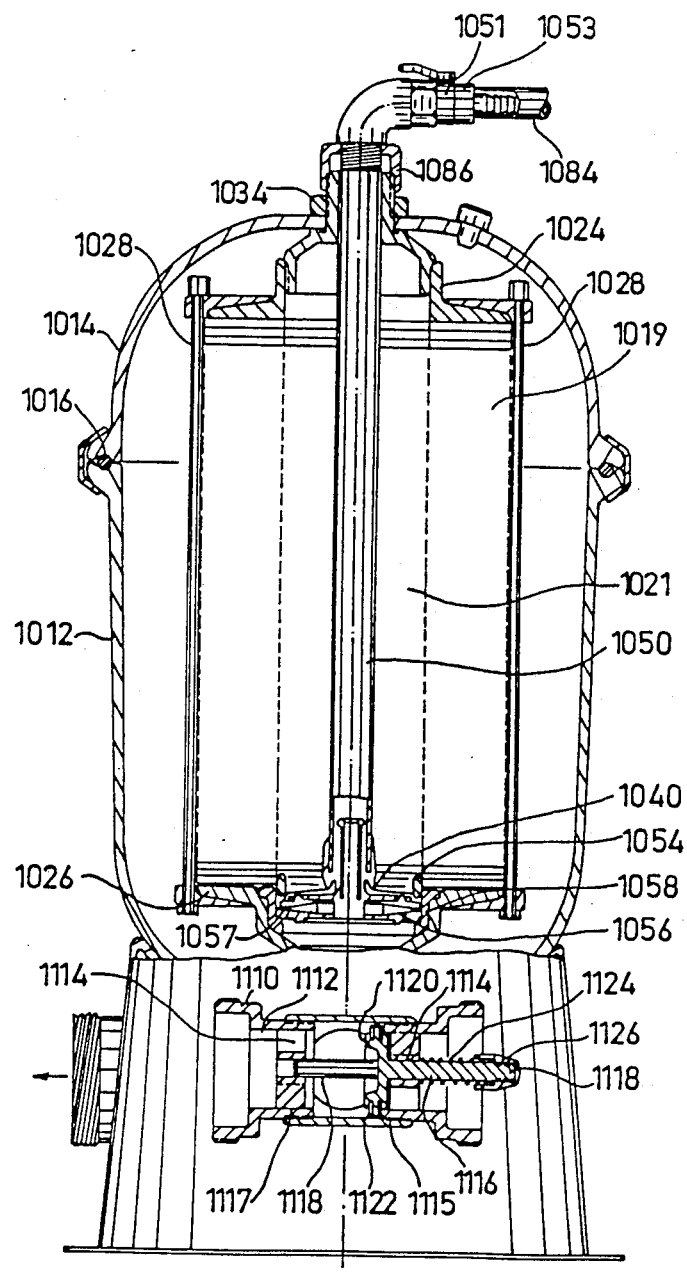
FIG. 5 is a partially cut-away side view sectional illustration of the filter of FIG. 3, showing the structure of valve apparatus forming part thereof in a second operative orientation.

During backflushing, when the incoming fluid is cut off by suitable means, such as a cut-off valve (not shown), or by termination of the operation of a pump 1081, the spring 1124 causes gap 1120 to return into sealing engagement with rim 1115, thus providing drainage of backflushed fluid from the upstream side of the filter element 1019 (FIG. 3).

Reference is now made to FIGS. 11–15, which illustrate a stack of filter disks constructed and operative in accordance with a preferred embodiment of the invention. The stack of filter disks is suitable for use in any suitable filter apparatus, examples of which are described in the patents and patent applications listed hereinabove.

Figure 7:
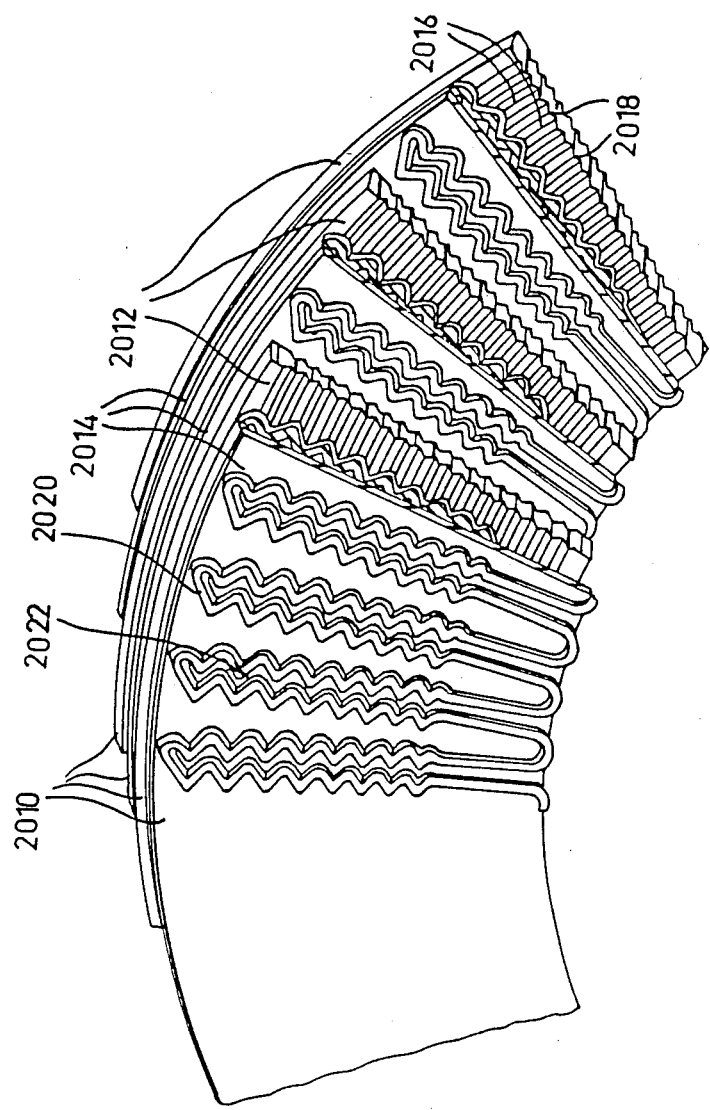
FIG. 7 is a pictorial illustration of a portion of a stack of filter disks constructed and operative in accordance with a preferred embodiment of the invention.
Figure 8:
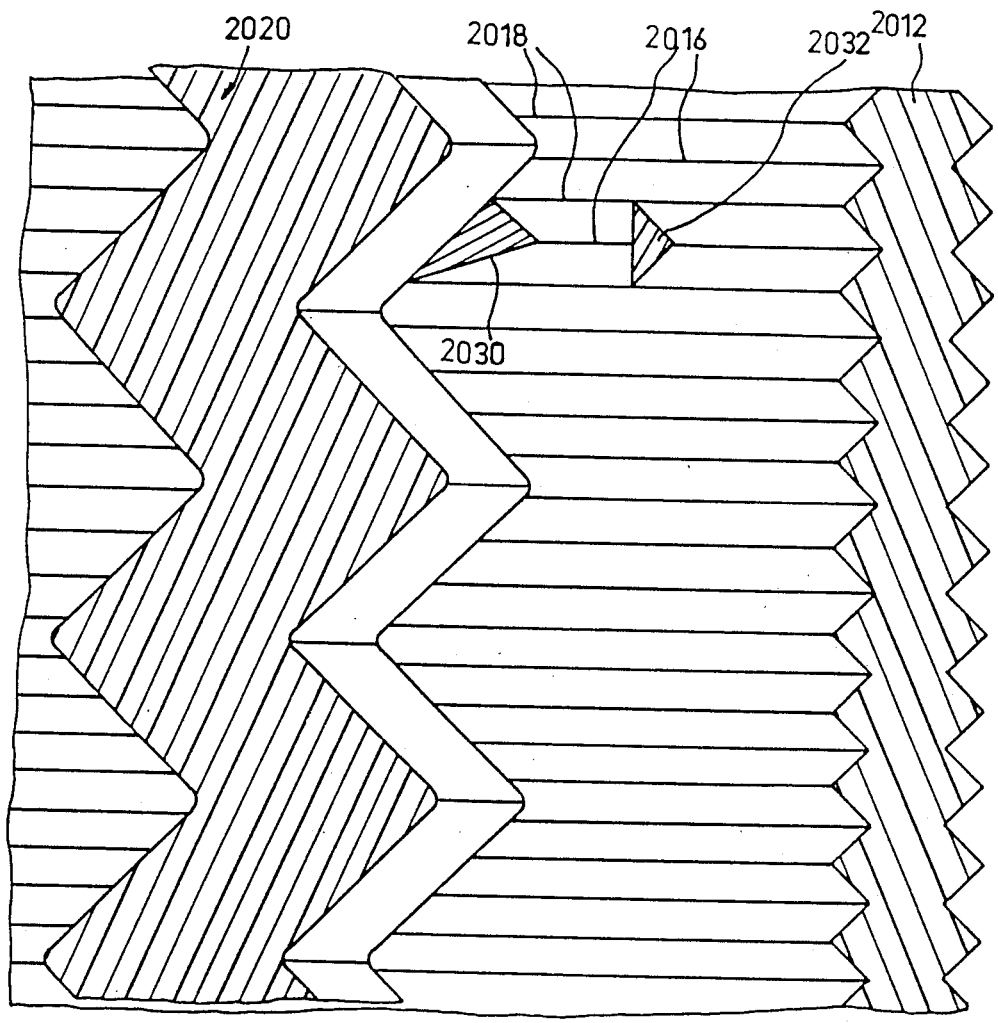
FIG. 8 is an enlarged illustration of a portion of the stack of filter disks illustrated in FIG. 7.
Figure 9:
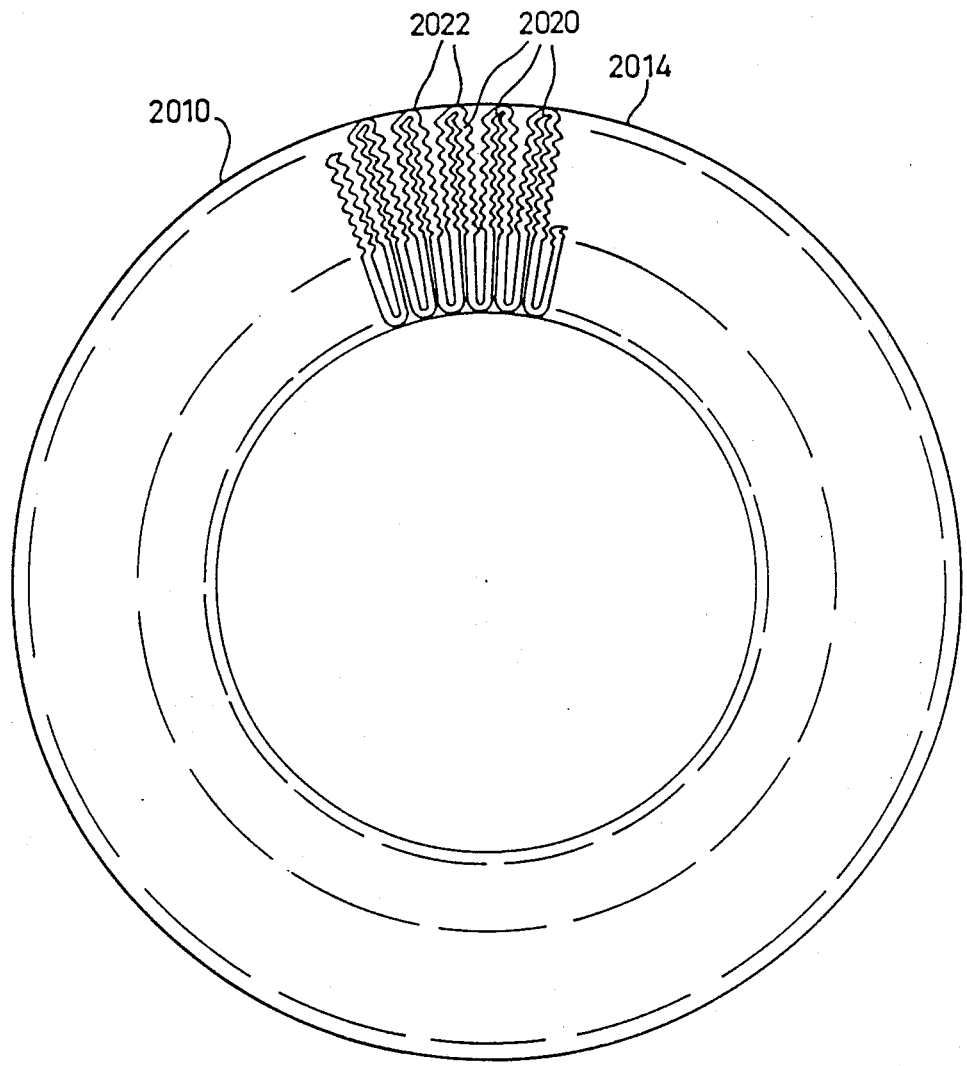
FIG. 9 is a plan view illustration of a surface of one of the filter disks constructed and operative in accordance with a preferred embodiment of the present invention.

The assembly shown in FIGS. 7–9 comprises alternating centrally apertured disks 2010 formed of a plastic material, such as polypropylene. The disks are of two types, filter disks 2012 and accumulator disks 2014. The filter disks 2012 are typically formed with identical first planar surfaces defining circumferential grooves 2016, typically having a generally Vshaped cross section. Intermediate the grooves are defined raised line portions 2018 which also extend circumferentially. Both the grooves and the line portions typically lie in a circular concentric pattern.

The accumulator disks 2014 typically comprise identically patterned opposite second planar surfaces, wherein the patterns are somewhat out of phase with each other, typically by one half the spacing therebetween. This out of phase arrangement provides enhanced structural strength to the accumulator disk 2014 and enables it to be made of relatively thin material.

Each planar surface of accumulator disk 2014 is formed with an accumulator barrier defined by a raised line pattern 2020, which is arranged to extended continuously in generally undulating configuration defining a plurality of radially extending finger elements 2022 on the face of the planar surface. The raised line pattern 2020 typically defines the outline of each finger element 2022 and is arranged to define a notched or serrated pattern along the radially extending portion of each finger.

When the first and second planar surfaces are arranged in juxtaposed engagement, the raised line pattern 2020 engages the raised line portions 2018 on the filter disks, defining a filter barrier between the upstream side of the filter and the downstream side. Liquid passes through the narrow openings defined between raised line pattern 2020 and the grooves 2016. Particles larger than these openings cannot pass the barrier.

It is a particular feature of the present invention that the notched or serrated pattern of the raised line pattern 2020 provides a relatively long filter barrier across which filtration occurs, when the second planar surface is located in juxtaposed engagement with the first planar surface. The relatively high ratio of filter barrier to planar surface area produced by this configuration provides a high filtering efficiency per unit size of the filter.

It is a further particular feature of the present invention that the raised line pattern is relatively thin so as to enable a high density of line patterns to be provided per unit area of the planar surface.

In the illustrated preferred embodiment, the spacer disk 2014 has an inner diameter of 9 cm and an outer diameter of 16 cm, and thus a total surface area of 137.445 cm². In this embodiment a filter barrier of overall length 662.35 cm is provided thus providing a ratio of filter barrier length to disk area of 4.82. The thickness of the raised line pattern 2020 is typically 0.75 mm and the minimum separation between adjacent filter barrier portions is typically 1.2 mm.

It is a particular feature of the present invention that the upstream facing edge of the filter barrier is disposed along nearly all of its length at an angle other than 90 degrees with respect to grooves 2016. As a result, the area subtended by the sides of the groove 2016 and the barrier, illustrated at reference numeral 2030, is larger than the area that would be subtended had the angle been 90 degrees. Such an area is indicated at the reference numeral 2032. It is seen that, not withstanding the fact that area 2030 is larger than area 2032, it does not follow that a larger particle will be allowed to pass through area 2030, since such a particle is still limited by the constant width of groove 2016.

Figure 10:
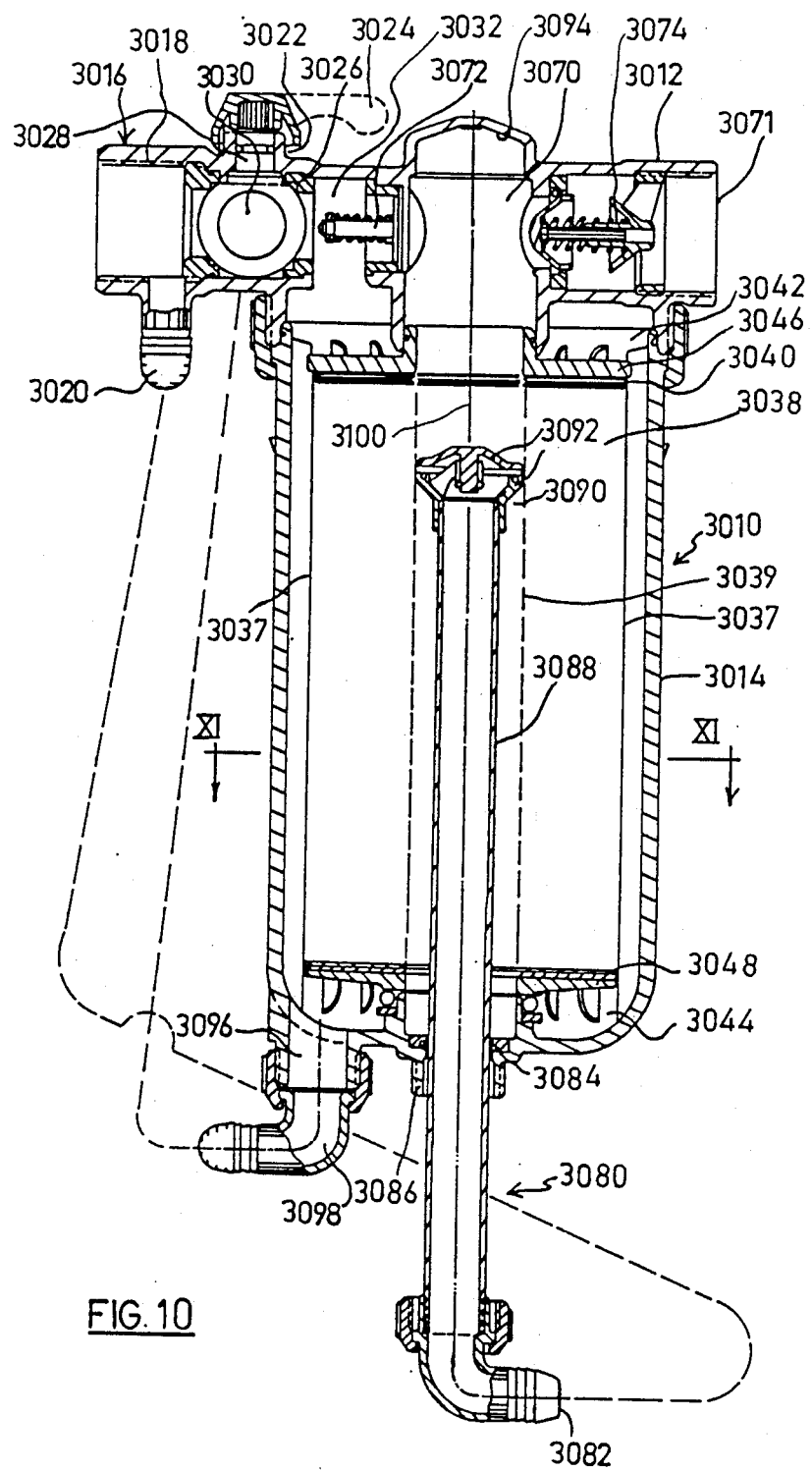
FIG. 10 is a side sectional view of filter apparatus constructed and operative in accordance with a preferred embodiment of the present invention.
Figure 19:
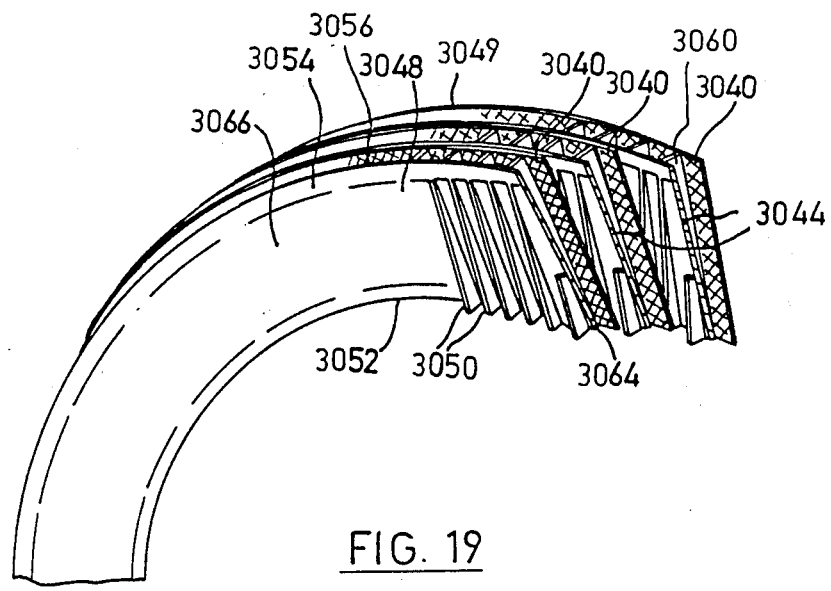
FIG. 19 is a pictorial illustration of a portion of a stack of filter disks constructed and operative in accordance with a preferred embodiment of the invention.
Figure 11:
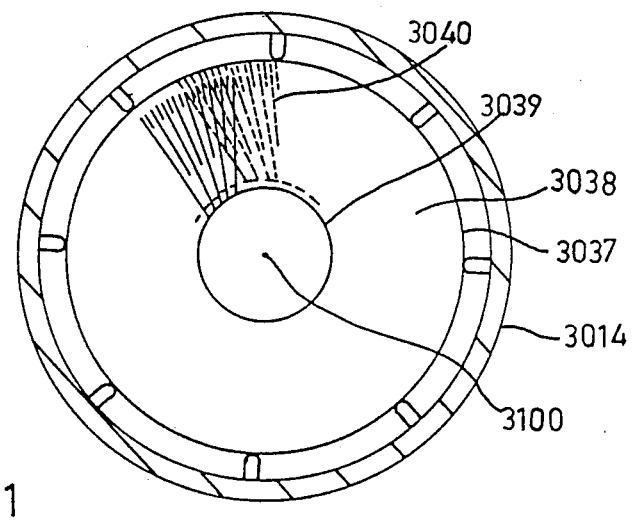
FIG. 11 is a sectional illustration taken along the lines XI—XI of FIG. 10.
Figure 12:
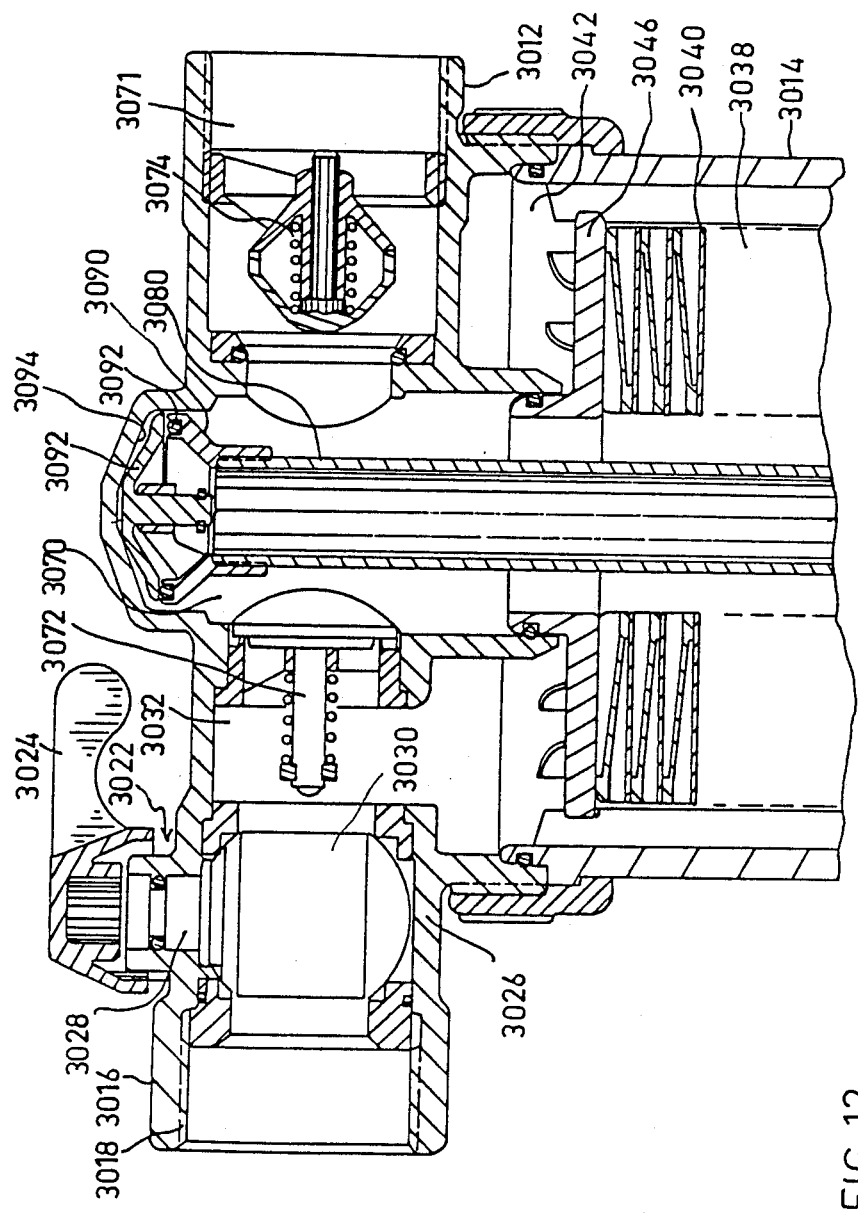
FIG. 12 is an enlarged illustration of part of the filter apparatus of FIG. 10 in a somewhat different operating orientation from that illustrated in FIG. 10.

Reference is now made to FIGS. 10–12, which illustrate filter apparatus constructed and operative in accordance with a preferred embodiment of the invention. The filter apparatus comprises a body, generally indicated by reference numeral 3010. The body is typically formed of two separate parts, a connection portion 3012, and a filter element housing 3014. The two parts are typically separable by a user, but need not be so.

The connection portion 3012 defines an inlet 3016, which is coupled to a supply of fluid to be filtered, and typically is formed with an inner threading 3018. Inlet 3016 is preferably also provided with an inlet bypass connector 3020, whose purpose and function will be desribed hereinafter. Downstream of inlet 3016 there is provided a manually actuable valve 3022.

Valve 3022 is provided with a handle 3024, a valve seat 3026, which is preferably integrally formed with the connection portion 3012, and a valve stem 3028, which is coupled for rotation together with handle 3024 with respect to valve seat 3026. According to a preferred embodiment of the invention illustrated here, valve 3022 comprises a ball or cylinder valve and is best seen from consideration of additional FIGS. 14 and 15.

Figure 14:
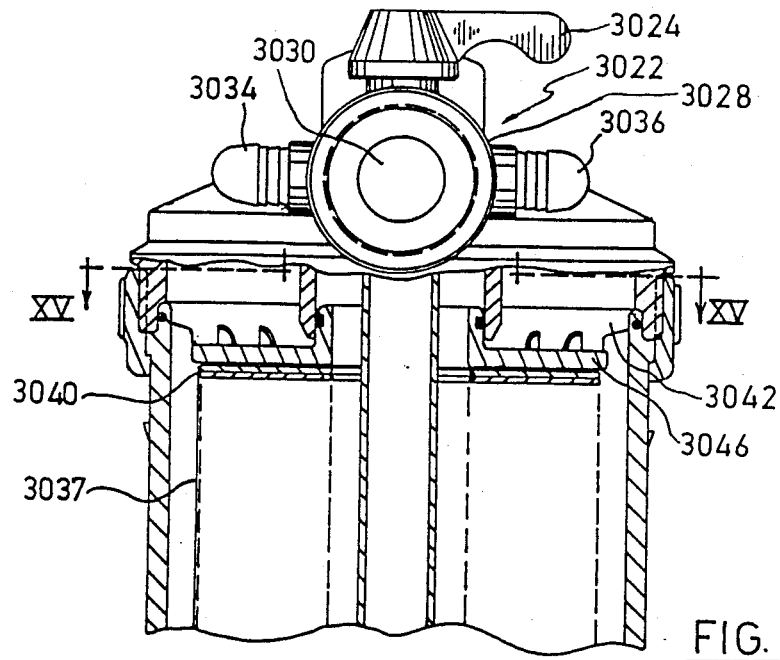
FIG. 14 is a side view sectional illustration of part of the filter apparatus of FIG. 10, taken at 90 degrees to the plane of FIG. 10.
Figure 15:
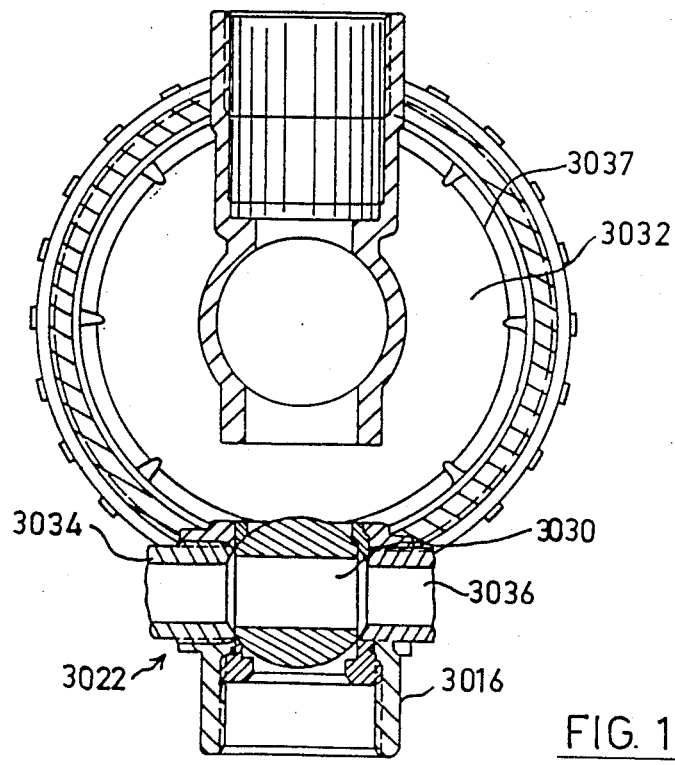
FIG. 15 is a sectional illustration of the filter apparatus of FIG. 14 taken along the lines XV—XV.

As seen particularly in FIGS. 14 and 15, stem 3028 is typically of spherical configuration and is formed with a throughgoing bore 3030. It will be appreciated that stem 3028 may be rotated by handle 3024 to assume a selected one of two operating positions. In a first operating position, illustrated in FIG. 12, the bore 3030 is positioned to permit direct fluid communication from the inlet 3016 to an interior portion 3032 of the connection portion 3012.

In an alternative operating position, illustrated in FIGS. 10, 14 and 15, the bore 3030 is at 90 degrees to its position shown in FIG. 12 and blocks fluid communication between inlet 3016 and the interior portion 3032. In this operating position, the bore 3030 provides fluid communication between two fluid connectors 3034 and 3036, whose purpose and function will be described hereinbelow.

Interior portion 3032 communicates with the interior of filter element housing 3014, and more specifically with the outer surface 3037 of a filter element 3038 which is located within housing 3014. The outer surface of filter element 3038 will henceforth be termed the upstream surface thereof. An inner surface 3039 of the filter element 3038 will henceforth be termed the downstream surface thereof. It is appreciated that these designations may be reversed for a different flow arrangement through the filter apparatus.

Filter element 3038 preferably but not necessarily comprises a stack of filter disks 3040 which are held together tightly by ring element 3046 which is fixed by a snap connection within housing 3014 between disks 3040 and end element 3042. End element 3014 is an integral part of housing element 3014 and presses around ring element 3046 so as to hold the filter disks tightly against each other for high performance filtering of relatively small particles.

Filter disks 3040 may be constructed to have any suitable configuration. Examples of suitable configurations are provided in applicant's pending U.S. patent application Ser. No. 709,372.

A preferred configuration of filter element is illustrated in FIGS. 19–24, to which reference is now made. The assembly shown in these figures comprises alternating centrally apertured disks 3040 of a porous material, such as polyester cartridge or polypropylene cartridge or any type of mesh. Disks 3040 may be of any preferred thickness or other characteristics so as to provide any desired fineness of filtration.

It is specifically noted that disks 3040 may be formed of porous material of any desired characteristics and pass through specifications and that the term "porous material" as used herein, also includes screen material of any suitable mesh size. It also includes single or multiple layer porous material with uniform or different pass through characteristics.

Intermediate disks 3040 there are provided spacer disks 3044 which define axially tapered generally radially extending grooves. It is a particular feature of the present invention that the generally radially extending grooves are normally not all precisely radial, for reasons which will now be described.

Specifically considering spacer disks 3044, it is seen that the disks 3044 define two opposite grooved surfaces, which will be termed, for convenience, surfaces 3048 and 3049. Surface 3048 is formed with tapered generally radially extending upstanding portions 3050 which are highest at the inner edge 3052 of the spacer disk and taper to a minimum adjacent a raised peripheral portion 3054 lying alongside the outer edge 3056 of the spacer disk.

Surface 3049 is formed with tapered generally radially extending upstanding portions 3060 which are highest at the outer edge 3056 of the spacer disk and taper to a minimum adjacent a raised peripheral portion 3064 lying alongside the inner edge 3052 of the spacer disk.

In order to provide maximum structural strength to spacer disk 3044, it is preferred but not essential that the upstanding portions 3050 and 3060 which overlie each other are somewhat skewed with respect to each other, such that upstanding portion 3050 diagonally overlies upstanding portion 3060. This arrangement enables the thickness of the planar portion 3066 of the spacer disk 3044 to be made very thin. In this arrangement, one or both of the upstanding portions 3050 and 3060 are non-radial. Nevertheless, in view of their generally radial orientation, such an arrangement is being defined throughout as providing generally radially extending grooves.

Figure 23:
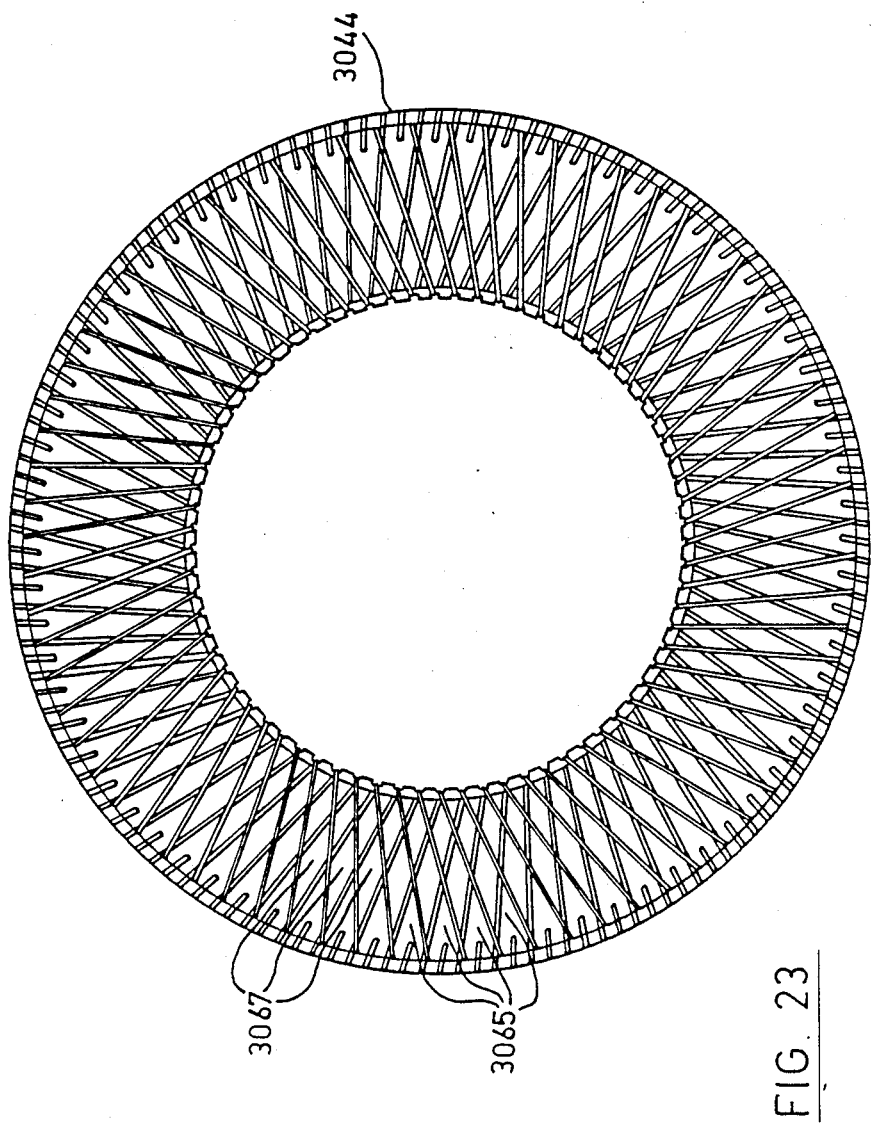
FIG. 23 is a plan view illustration of a transparent spacer disk showing the overlapped arrangement of the grooves formed on opposite sides thereof.
Figure 24:
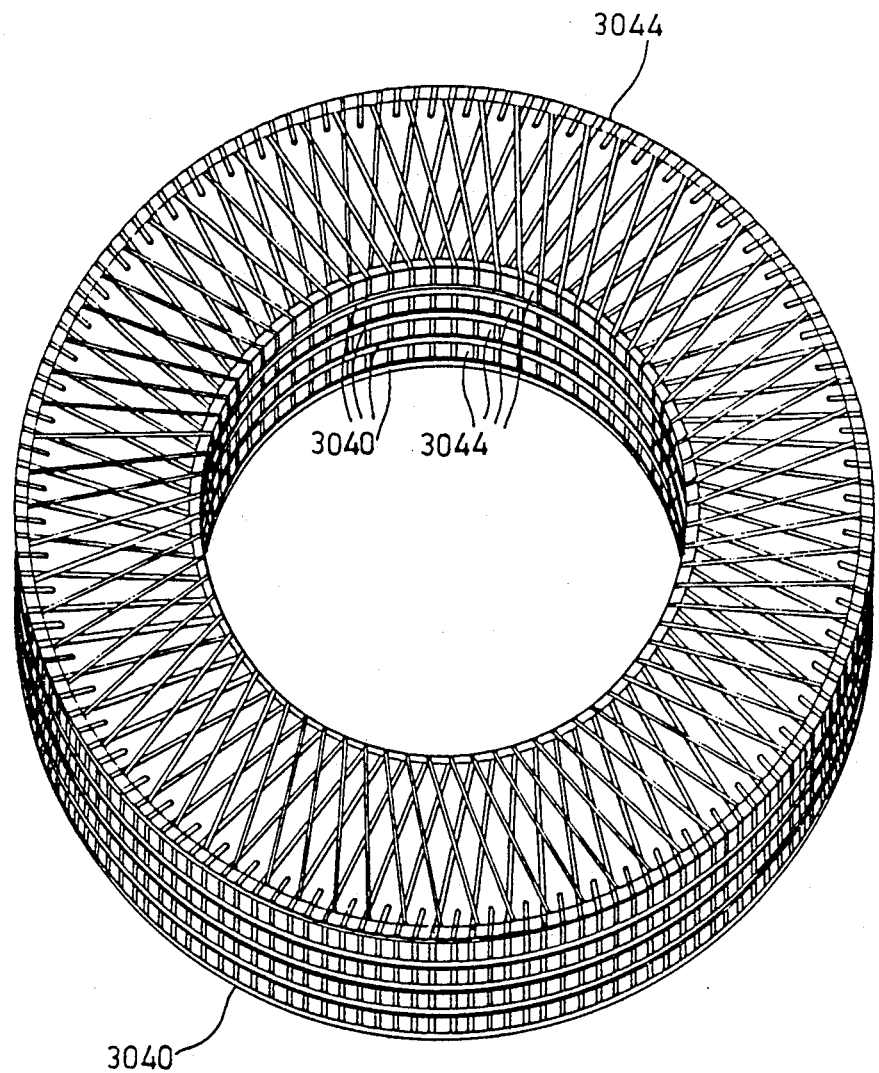
FIG. 24 is a pictorial illustration of a stack of filter disks of the type shown in FIGS. 19-23.

In the preferred embodiment of the invention in which the upstanding portions 3050 and 3060 are skewed, it is preferable that their relative angular orientation be such that the groove or channel 3065 defined between each pair of upstanding portions 3050 partially overlaps and crosses at least two and preferably three such grooves or channels 3067. This structure is shown in FIG. 23 which illustrates a transparent spacer disk, it being understood that the transparent spacer disk is illustrated herein only for purposes of clarity of illustration and explanation and that normally, non-transparent spacer disks are used.

The structure wherein each groove or channel 3065 partially overlaps and crosses at least two and preferably three such grooves or channels 3067 has a number of advantages. Liquid to be filtered typically enters a channel 3067 at the outer edge of the filter element. Channel 3067 tapers down to a closed end against raised peripheral portion 3064. Therefore all of the liquid must pass through the adjacent porous material of disk 3040.

The liquid can pass through the porous material of disk 3040 at any location along the channel 3067 and thus, when it exits the opposite side of adjacent disk 3040, it may then travel in any one of channels 3065 which lead to the interior of the filter element. Which of the channels 3065 carries the liquid is dependent upon the location at which the liquid leaves disk 3040. Thus if one or more of the channels 3065 becomes blocked or clogged for any reason, the liquid can pass along one or more alternative channels.

Similarly, during backflushing operation, a backflush fluid typically enters a channel 3065 at the inner edge of the filter element. Channel 3065 tapers down to a closed end against raised peripheral portion 3054. Therefore all of the liquid must pass through the adjacent porous material of disk 3040.

The liquid can pass through the porous material of disk 3040 at any location along the channel 3065 and thus, when it exits the opposite side of adjacent disk 3040, it may then travel in any one of channels 3067 which lead to the exterior of the filter element. Which of the channels 3067 carries the liquid is dependent on the location at which the liquid leaves disk 3040. Thus if one or more of the channels 3067 becomes blocked or clogged for any reason the liquid can pass along one or more alternative channels.

Figure 21:
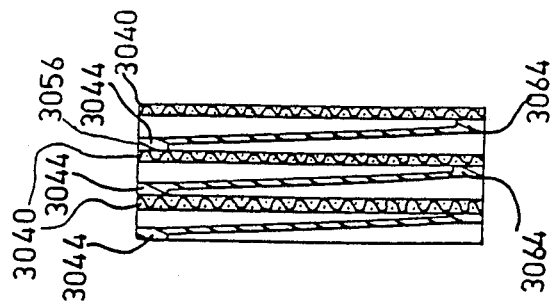
FIG. 21 is a sectional illustration taken along the lines XXI—XXI of FIG. 20.
Figure 20:
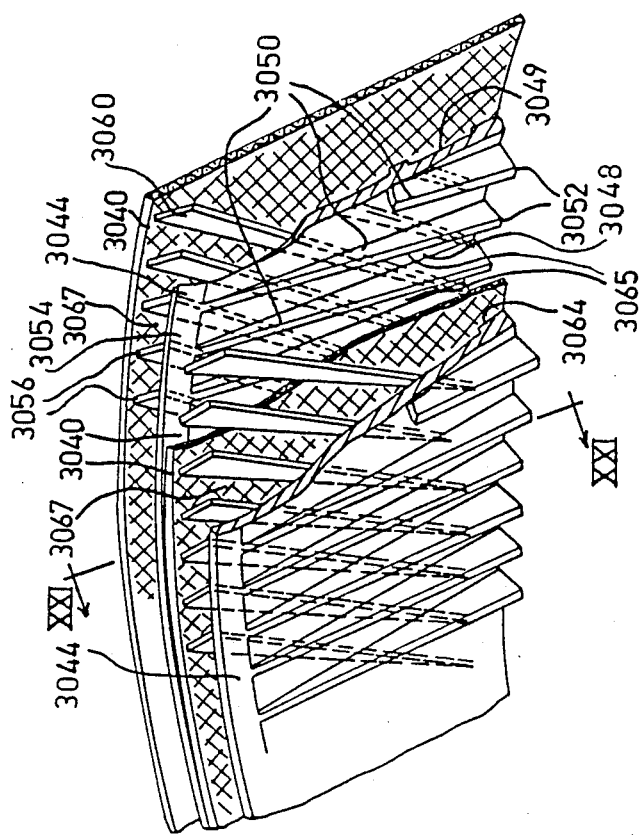
FIG. 20 is an enlarged illustration of a portion of the stack of filter disks illustrated in FIG. 19.
Figure 22:
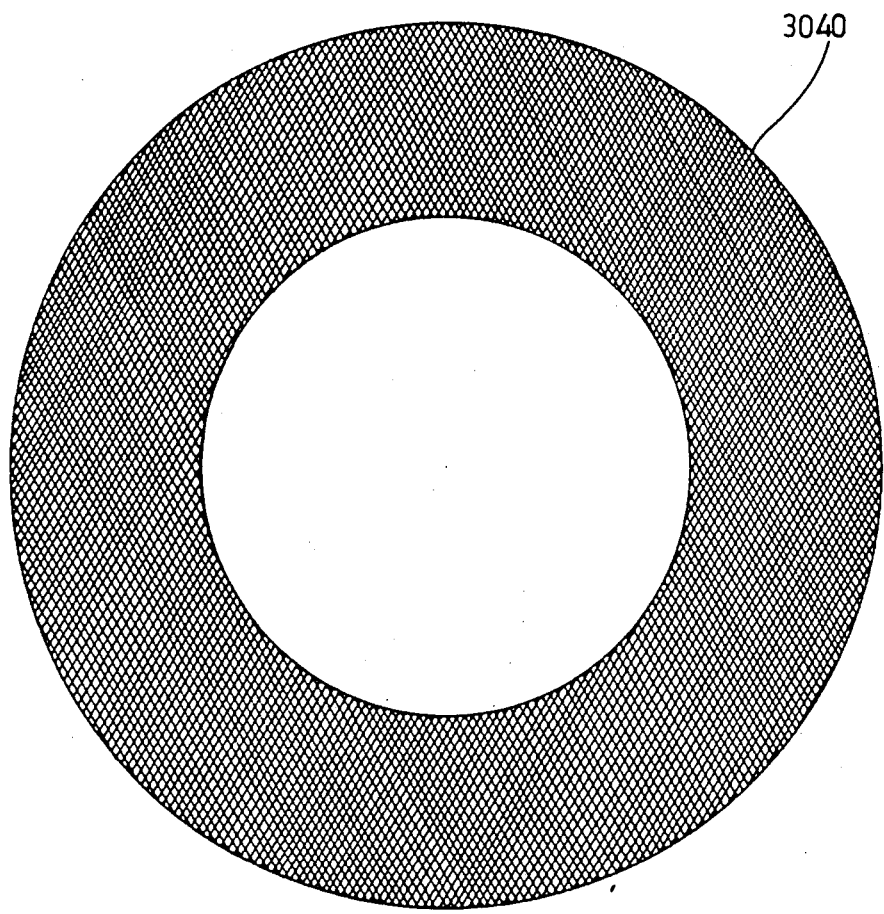
FIG. 22 is a plan view illustration of a disk of porous material forming part of the stack of FIG. 20.

FIG. 21 illustrates the arrangement of a portion of a stack of filter disks as described hereinabove. It is seen that the arrangement is symmetric with respect to upstream and downstream surfaces of a filter element constituted from a stack of such filter disks, in that both surfaces are defined by an array of tapered grooves which serve to collect dirt upstream of the porous disk 3040.

Another preferred configuration of a filter element is illustrated in FIGS. 25–28, to which reference is now made. The assembly shown in these figures comprises alternating centrally apertured disks 3240 of a porous material, such as polyester cartridge or polypropylene cartridge or any type of mesh. Disks 3240 may be of any preferred thickness or other characteristics so as to provide any desired fineness of filtration and may be similar in all relevent respects to disks 3040 described above.

Intermediate disks 3240 there are provided spacer disks 3244 which define axially tapered generally radially extending grooves.

Specifically considering spacer disks 3244, it is seen that the disks 3244 define two opposite grooved surfaces, which will be termed, for convenience, surfaces 3248 and 3249. Surface 3248 is formed with tapered generally radially extending upstanding portions 3250 which are highest with respect to the disk surface 3251 at the inner edge 3252 of the spacer disk and terminate in a peripheral rim 3253 along the inner edge of the spacer disk, at the same height as the adjacent portions of the upstanding portions 3250.

The upstanding portions 3250 taper to a minimum, adjacent a raised peripheral rim portion 3254, of height equal to the height of the adjacent upstanding portions. Rim portion 3254 lies adjacent but spaced from the outer edge 3255 of the spacer disk by a plurality of spacer rib portions 3256 which in fact define portions of upstanding portions associated with disk surface 3249.

Surface 3249 is formed with tapered generally radially extending upstanding portions 3260 which are highest at the outer edge 3255 of the spacer disk and terminate in an outer peripheral rim 3257, which lies at the same height as the upstanding portions 3260 adjacent thereto. Upstanding portions 3260 taper to a minimum adjacent a rim 3262 which lies adjacent to but spaced from the inner edge 3252 of the spacer disk.

It may be appreciated that rims 3253 and 3262 lie in adjacent, non-overlapping relationship on opposite sides of the spacer disk, rim 3626 being located radially inward with respect to rim 3253. Similarly rims 3254 and 3257 lie in adjacent, non-overlapping relationship on opposite sides of the spacer disk, rim 3254 being located radially inward with respect to rim 3257.

The above described structure of rims 3253, 3254, 2357, and 3262 provides extremely high quality sealing between the spacer disks 3244 and the porous material disks 3240, while defining clear openings for both filtration and backflushing.

As described hereinabove in connection with FIGS. 20–24, it is preferred but not essential that the upstanding portions 3250 and 3260 which overlie each other are somewhat skewed with respect to each other, such that upstanding portion 3250 diagonally overlies upstanding portion 3260. This portion 3251 of the spacer disk 3244 to be made very thin. In this arrangement, one or both of the upstanding portions 3250 and 3260 are non-radial. Nevertheless, in view of their generally radial orientation, such an arrangement is being defined throughout as providing generally radially extending grooves.

In the preferred embodiment of the invention in which the upstanding portions 3250 and 3260 are skewed, it is preferable that their relative angular orientation be such that the groove or channel 3265 defined between each pair of upstanding portions 3250 partially overlaps and crosses at least two and preferably three such grooves or channels on the opposite side of the spacer disk, as shown in FIG. 23 for disks without the rims described hereinabove.

Figure 27:
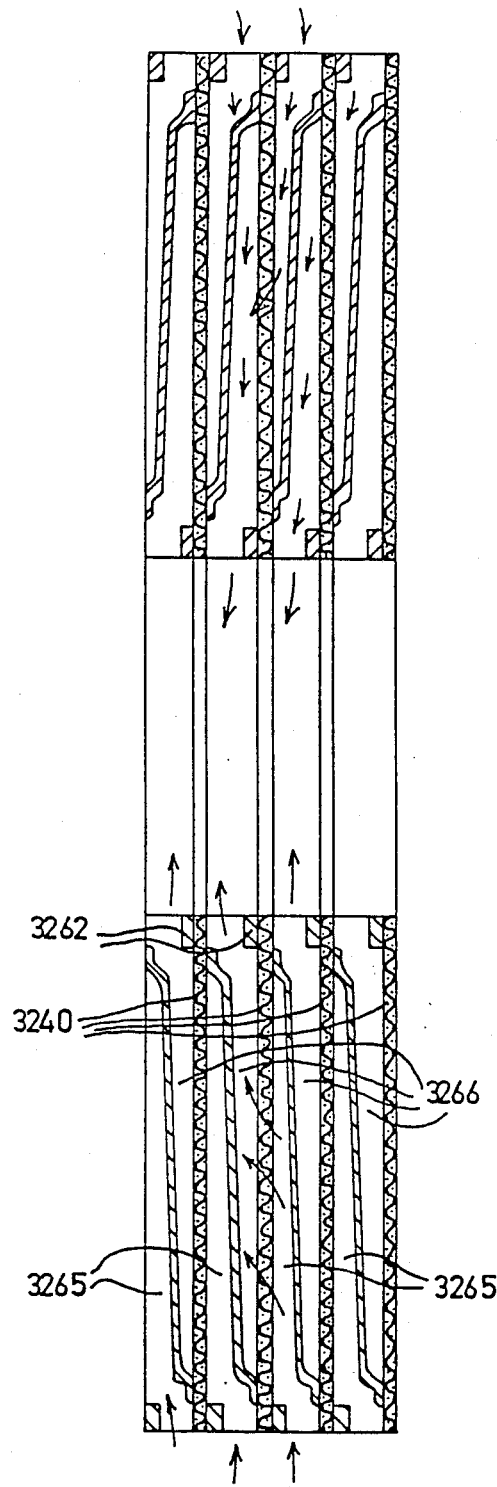
FIG. 27 is an enlarged sectional illustration of the stack of filter disks shown in FIGS. 25 and 26 showing the direction of fluid flow during normal filtering operation.
Figure 28:
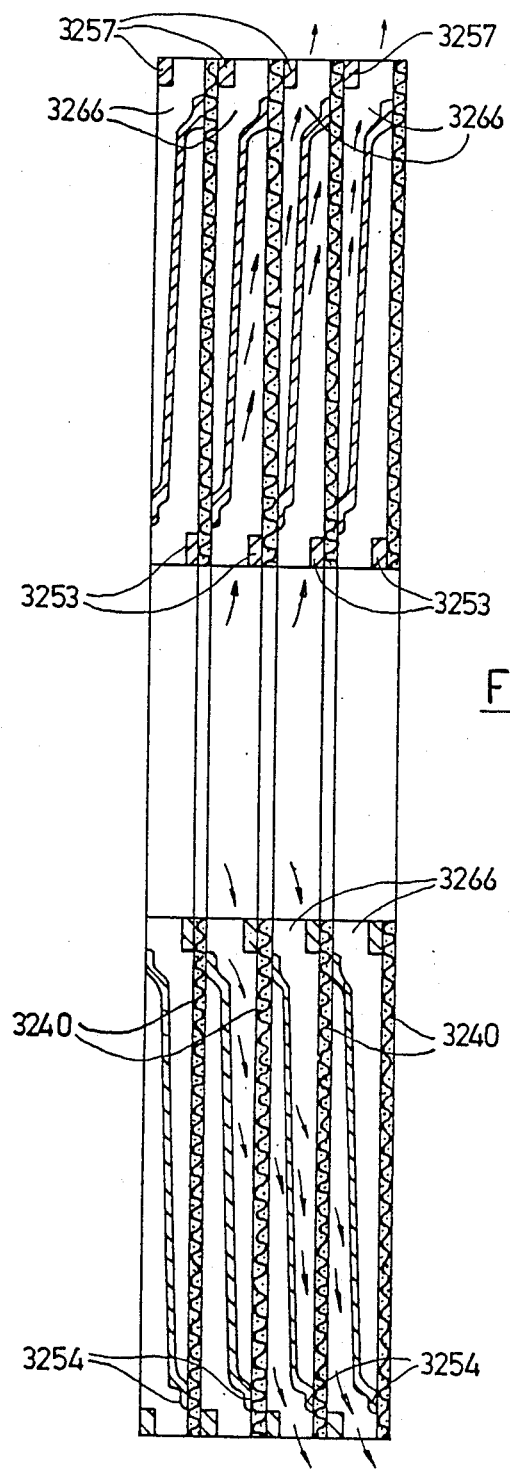
FIG. 28 is an enlarged sectional illustration of the stack of filter disks shown in FIGS. 25 and 26 showing the direction of fluid flow during backflushing operation.

Reference is now made to FIGS. 27 and 28 which illustrate the fluid flows for normal filtering and backflushing respectively. As seen in FIG. 27, a fluid such as a liquid to be filtered typically enters a channel 3265 at the outer edge of the filter element. Channel 3265 tapers down to a closed end against rim 3262. Therefore all of the liquid must pass through the adjacent porous material of disk 3240.

The liquid can pass through the porous material of disk 3240 at any location along the channel 3265 and thus, when it exits the opposite side of adjacent disk 3240, it may then travel in any one of channels 3266 which lead to the interior of the filter element. Which channel carries the liquid is dependent upon the location at which the liquid leaves channel 3265, which in turn is determined by the state of clogging of each given channel. Thus if one or more of the channels becomes blocked or clogged for any reason, the liquid can pass along one or more alternative channels.

Similarly, during backflushing operation, as illustrated in FIG. 28, a backflush fluid typically enters a channel 3266 at the inner edge of the filter element. Channel 3266 tapers down to a closed end against rim 3254. Therefore all of the liquid must pass through the adjacent porous material of disk 3240.

Returning now to the connection portion 3012, as shown in FIGS. 10 and 12, it is seen that there is defined a central volume 3070, which is separated from volume 3032 by a one way valve such as pressure valve 3072, which is operative to permit fluid flow from volume 3032 to volume 3070 only when the differential pressure between volume 3032 and volume 3070 is sufficient to overcome the biasing of pressure valve 3072. Pressure valve 3072 does not permit fluid flow from volume 3070 to volume 3032 therethrough under any circumstances.

Volume 3070 is separated from an outlet 3071 by means of a second one-way valve such as check valve 3074, which is operative to permit fluid flow from volume 3070 to outlet 3071 when the differential pressure between volume 3070 and outlet 3071 is sufficient to overcome the biasing of check valve 3074. Check valve 3074 does not permit fluid flow from volume 3070 to volume 3032 therethrough under any circumstances.

Slidably disposed within the body 3010 is a manually operable flushing arm 3080. Flushing arm 3080 defines a fluid inlet 3082 which is coupled by a flexible conduit (not shown but indicated by dashed lines) to the inlet by-pass connector 3020 for receiving a pressurized flow of fluid from the inlet 3016.

Arm 3080 comprises a sealing collar 3084 which is arranged to engage a corresponding fixed collar 3086 formed on the bottom surface of filter element housing 3014. Typically sealing collar 3084 is formed of any desired elastic material. Arm 3080 also comprises an elongate rigid tube 3088 at the end of which is defined a discharge portion 3090.

The discharge portion 3090 may define a desired fluid outlet. According to one embodiment, discharge portion 3090 may provide a 360 degree outlet backflushing flow at relatively high pressure, in engagement with the downstream surface 3039 of the filter element. According to an alternative embodiment of the invention, which will be described hereinbelow in connection with FIG. 17, a rotatable directional flow may be provided.

In the embodiment discussed here, as shown in FIGS. 10 and 12, the discharge portion 3090 is provided with a sealing valve arrangement 3092, which seals the discharge portion against fluid communication in either direction, when the arm 3080 is fully seated in the body 3010, i.e. when the valve 3092 is fully seated against surface 3094 of the connection portion 3012.

A backflush drain 3096 is defined by element housing 3014 in communication with the upstream surface of the filter element 3038 and is provided with a connector 3098, which is typically connected, by a suitable conduit, not shown, but indicated in dashed lines, to connector 3036 (FIG. 14). Connector 3034 may typically be connected to a backflush drain, which is vented to the atmosphere.

The operation of the apparatus of FIGS. 10–12, 14 and 15 will now be described briefly. During normal operation of the filter, fluid, typically water to be filtered, enters at inlet 3016 and passes via valve 3022, in its first operating position shown in FIG. 12, to volume 3032, wherein it impinges in a pressurized manner on the filter element 3038 at its upstream surface 3037. Dirt and other spurious matter filtered from the fluid are retained within filter element 3038 and on the upstream surface thereof and the filtered water exits the filter element at the downstream surface which communicates with volume 3070 and from volume 3070 around check valve 3074 to the filtered water outlet 3071.

When it is sought to provide an extremely high volume, high pressure flow of water, as for use in a spa or whirlpool bath, pressure valve 3072 opens under pressure of the water, providing bypassing of the filter and direct axial throughflow of the water from the inlet 3016 to the outlet 3071.

When it is sought to clean the filter element, valve 3022 is turned to its alternative operating position, as seen in FIG. 10, thus blocking the flow of water from inlet 3016 to volume 3032. Valve 3022 then interconnects connectors 3034 and 3036 (FIG. 15), thus providing fluid communication from backflush drain 3096 to the atmosphere.

Backflush arm 3080 may then be unseated from engagement with surface 3094, thus causing opening of valve 3092 and providing a relatively high pressure backflush flow of fluid received via connector 3020 from the inlet 3016 in engagement with the downstream surface 3039 of the filter element 3038. Reciprocal displacement of the discharge portion 3090 along axis 3100, provides flushing of the entire downstream surface of the filter element 3038. The backflushed fluid together with the accumulated dirt and other spurious material is drained through backflush drain 3096 to the atmosphere.

Figure 13:
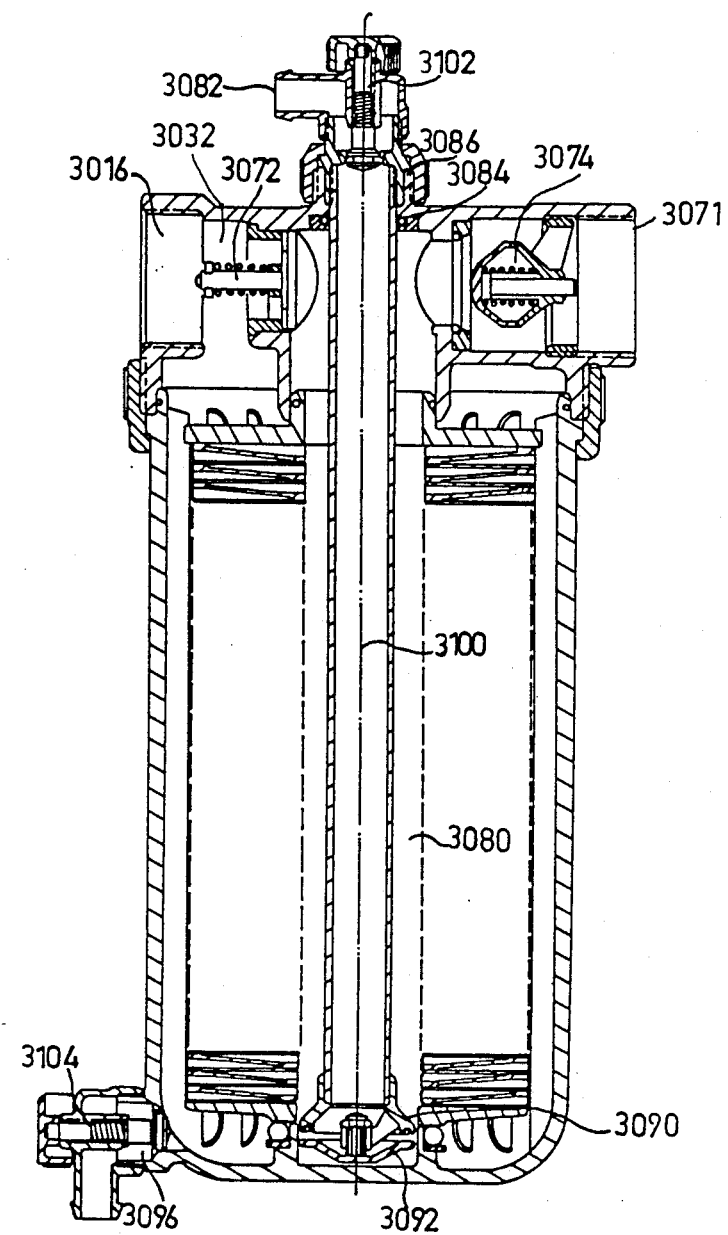
FIG. 13 is a side sectional view of an alternative embodiment of filter apparatus constructed and operative in accordance with the present invention.

Reference is now made to FIG. 13, which illustrates an alternative embodiment of filter apparatus, which represents a simplification of the apparatus of FIG. 10. For the sake of clarity, all elements of the apparatus which are similar in both embodiments are labelled with the reference numerals employed hereinabove. These elements are not described again here for the sake of conciseness.

Briefly speaking, the apparatus of FIG. 13 eliminates the use of valve 3022. Accordingly backflush arm 3080 is provided with a manually actuable inlet valve 3102 which governs the supply of backflushing fluid thereto from a pressurized source (not shown). Similarly backflush drain 3096 is provided with an outlet valve 3104, which governs the outlet of backflush fluid therefrom. It is also noted that the arm 3080 is arranged upside down in the arrangement of FIG. 13 as compared with the arrangement of FIG. 10. This is not considered to have any particular significance.

During normal filtering operation of the apparatus of FIG. 13, valves 3102 and 3104 are closed. They are both opened for backflushing operation and the main water supply to the filter inlet 3016 is closed.

Figures 16, 17:
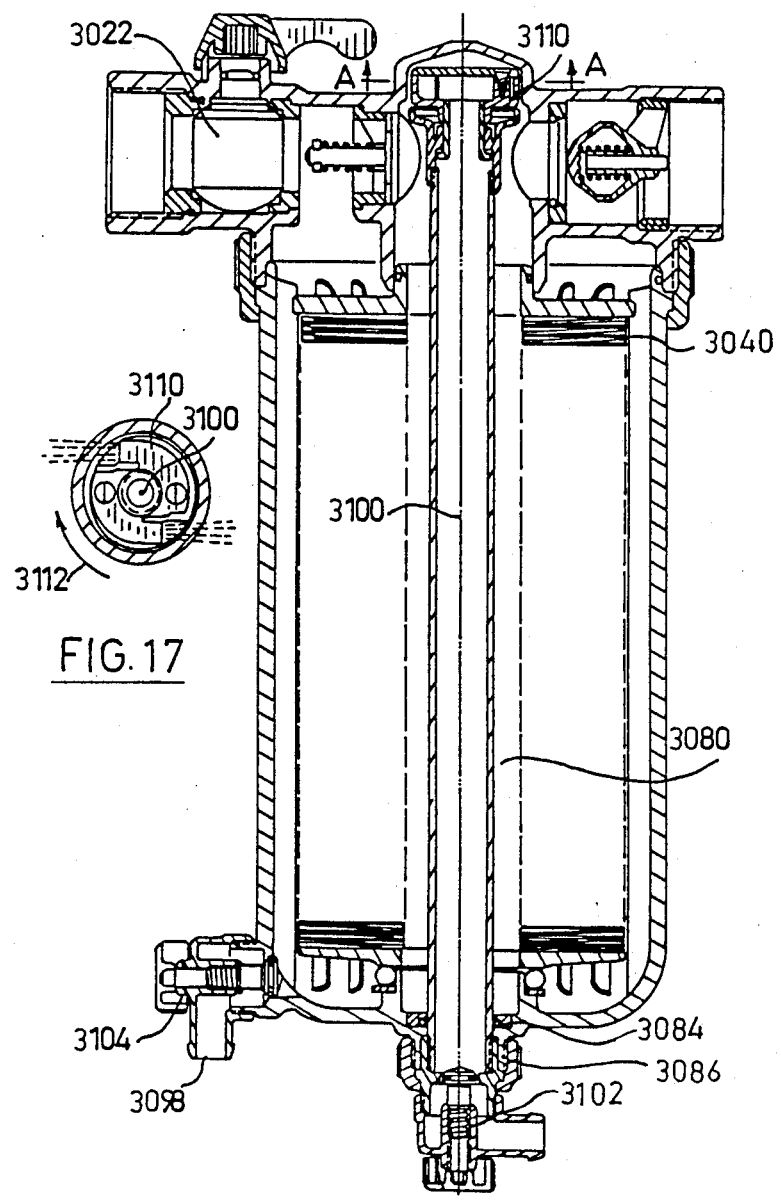
FIG. 16 is a side view sectional illustration of a further alternative embodiment of filter apparatus constructed and operative in accordance with the present invention.
FIG. 17 is a pictorial illustration of fluid discharge apparatus useful in various embodiments of the invention seen along lines A—A of FIG. 16.

Reference is now made to FIG. 16, which illustrates a further alternative embodiment of the invention. The embodiment includes both valves 3102 and 3104 as well as valve 3022. Here, however, valve 3022 does not provide connections for the backflush drain as in the embodiment of FIG. 10.

A further additional feature of the embodiment of FIG. 16 is the provision of a rotating, directional backflush discharge head 3110, which is shown in plan view in FIG. 17. Head 3110 is reciprocated along axis 3100 by the movement of arm 3080 and provides eccentric, highly directional flows of backflushing fluid, which cause rotation of the head in a direction indicated by arrow 3112 about axis 3100. This arrangement provides enhanced backflushing operation because it employs a highly concentrated flow, which "scans" each groove or cell defined in the filter element with a flow, which is at higher pressure than a broader flow, as provided by the discharge portion 3090 of the embodiment of FIG. 10.

Figure 18:
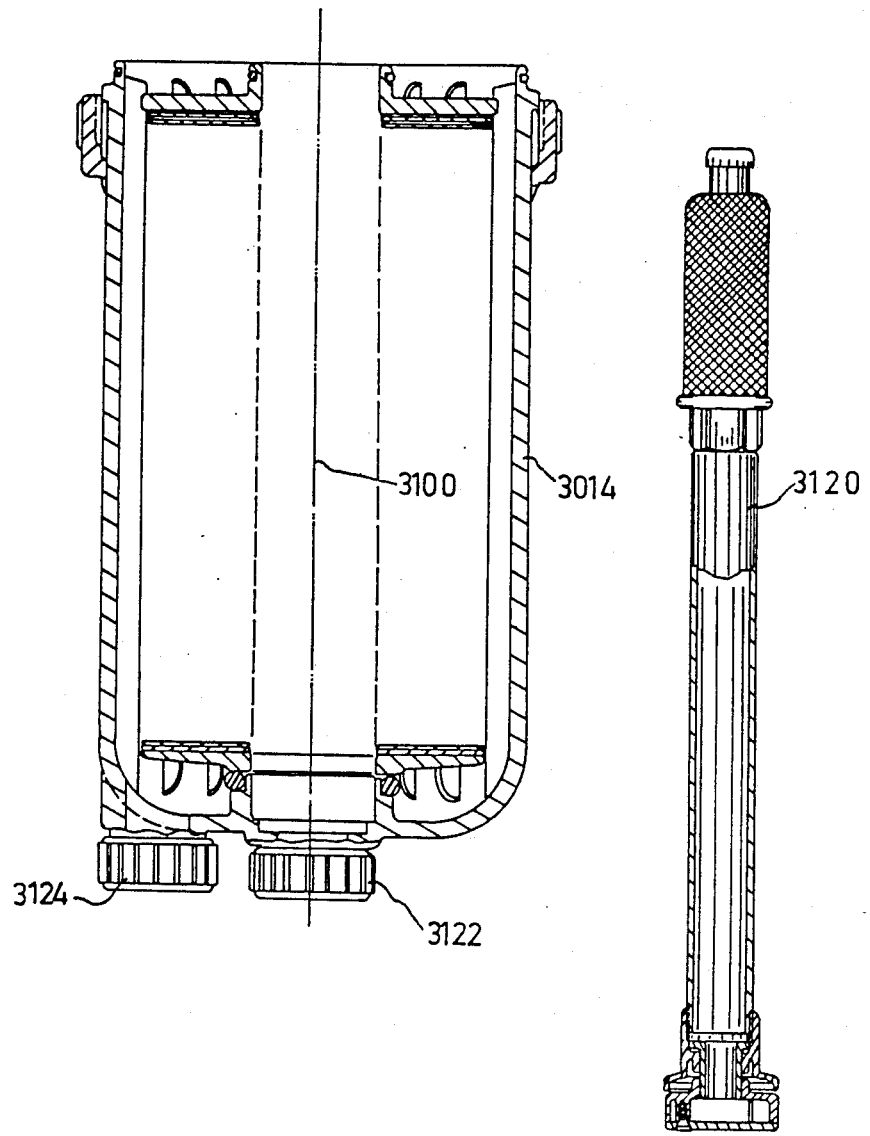
FIG. 18 is an illustration of two disconnected portions of a still further alternative embodiment of filter apparatus constructed and operative in accordance with the present invention.

FIG. 18 illustrates a further alternative embodiment of the invention, wherein the filter element housing portion 3014 is removable from the remainder of the body for backflushing. A separate backflushing arm 3120, typically of the type shown in FIGS. 16 and 17 is coupled to a source of backflushing fluid (not shown) and reciprocated along axis 3100 to backflush the filter element. In this embodiment, where there is no need for inlet 3082 or backflush drain 3096, sealing the respective upstream and downstream sides of the filter element with plugs 3122 and 3124 provides an inexpensive and double-purpose use of the same filter element.

Figure 29:
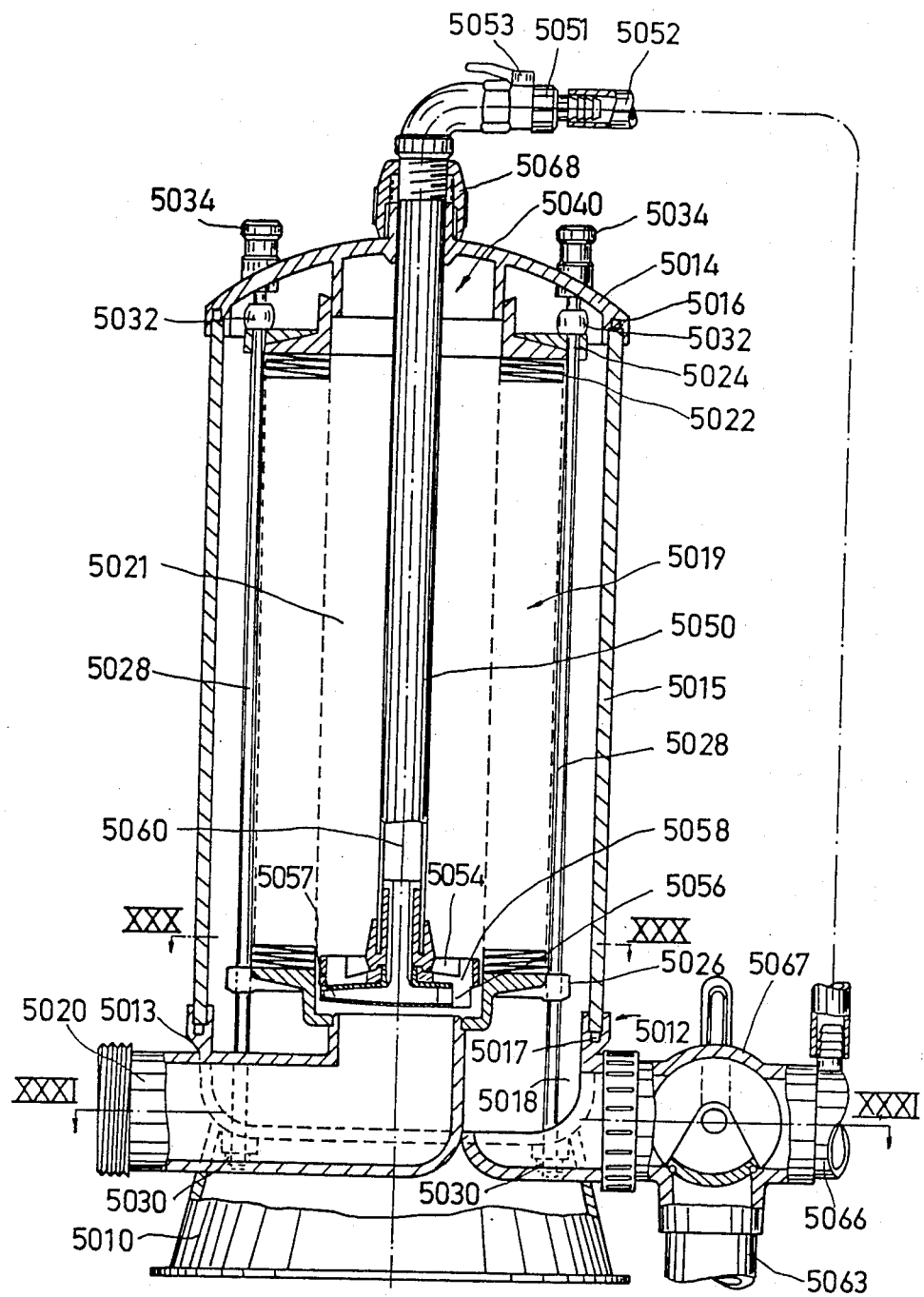
FIG. 29 is a partially cut-away side view sectional illustration of a filter constructed and operative in accordance with an embodiment of the present invention.
Figure 30:
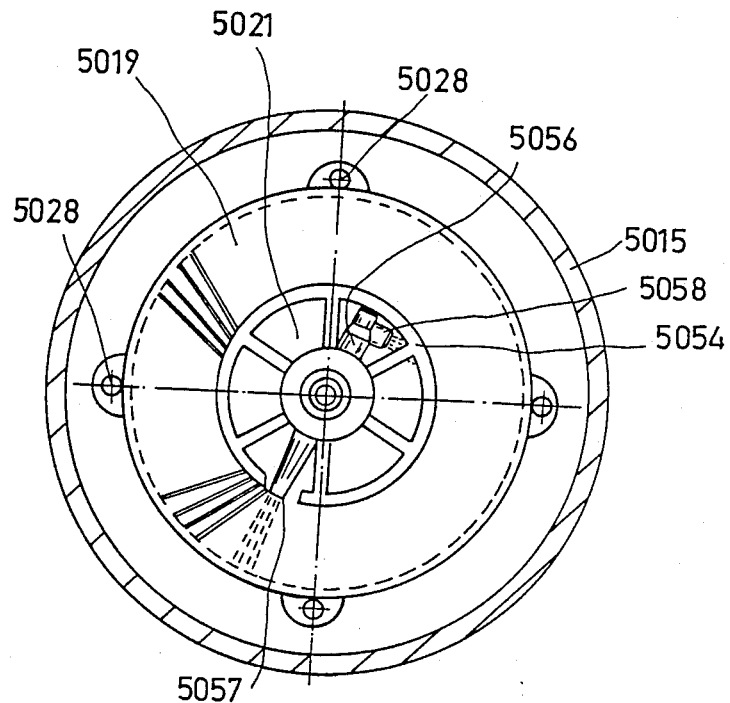
FIG. 30 is a sectional illustration taken along the lines XXX—XXX of FIG. 29.
Figure 31:
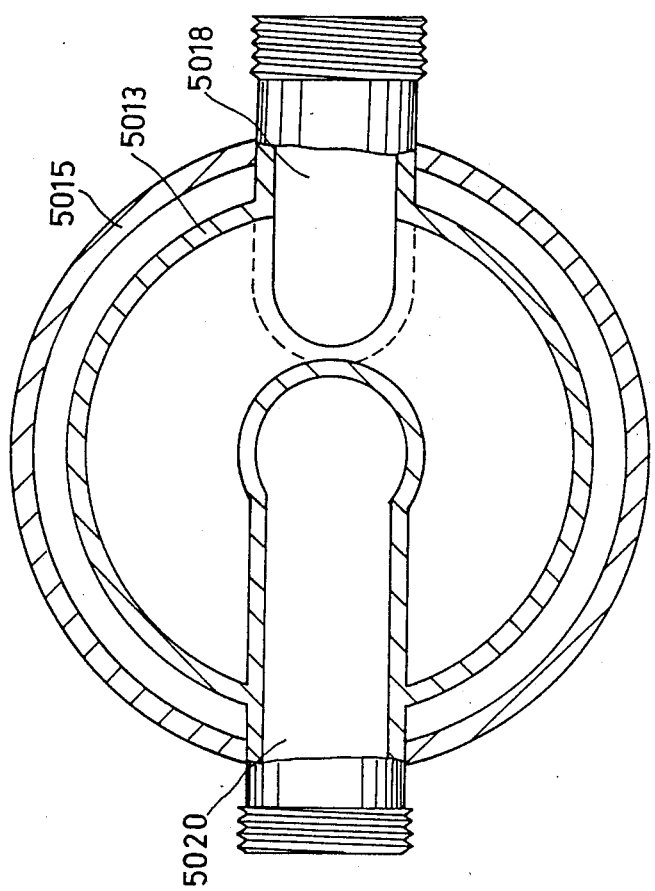
FIG. 31 is a sectional illustration taken along the lines XXXI—XXXI of FIG. 29.

Reference is now made to FIGS. 29-31, which illustrate a filter constructed and operative in accordance with a preferred embodiment of the present invention and comprising a base 5010 on which is fixedly supported a bottom housing portion 5012. Removably mounted onto the bottom housing portion 5012 is a top housing portion 5014, which is maintained in sealing engagement therewith by means of a sealing ring 5016. The bottom housing portion 5012 typically comprises an inlet and outlet defining portion 5013, which is typically molded integrally with base 5010, and a cylindrical portion 5015, which may be extruded of a plastic material, and may be sealingly joined to each other with the aid of a sealing ring 5017.

A fluid inlet 5018 is formed at one side of defining portion 5013 and communicates with the outside cylindrical surface, hereinafter termed the "upstream surface", of a stack of filter elements 5019. A fluid outlet 5020 is defined at an opposite side of defining portion 5013 and communicates with a hollow interior portion 5021 of stack of filter elements 5019 adjacent the inner cylindrical surface of the stack of filter elements, hereinafter termed the "downstream surface".

The stack of filter elements 5019 preferably comprises a stack of hollow center filter disks 5022 of any suitable type. Alternatively, the stack of filter elements may be replaced by any other suitable type of filter element such as a cartridge or cylindrical mesh filter. Suitable filter disks are described in the U.S. Patent Applications listed hereinabove in the "Background of the Invention", and are operative to remove particulate matter from liquids passing therethrough from the upstream surface to the downstream surface. A preferred filter disk arrangement is described and claimed in copending Israel Patent Application No. 78160, filed Mar. 14, 1986, the disclosure of which is incorporated herein by reference.

The stack of filter elements 5022 is preferably removably mounted in coaxial relationship so as to defined volume 5021 and is retained within the housing by means of top and bottom retaining collars 5024 and 5026. A plurality of threaded rods 5028, typically four in number, are anchored, as by suitable nuts 5030, in defining portion 5013. Retaining collars 5024 and 5026 are mounted onto rods 5028 and retained by stack retaining nuts 5032. Cover retaining nuts 5034 serve to retain top housing portion 5014 onto the bottom housing portion 5012.

A high pressure revolving spray nozzle assembly 5040 is disposed mainly within volume 5021 and comprises a water supply shaft 5050 having a water inlet 5051 and an associated inlet valve 5053. A fixed base portion 5054 is typically mounted onto shaft 5050 and serves to maintain the nozzle assembly 5040 centered with respect to volume 5021 and the downstream cylindrical surface of stack of filter element 5019. Base portion 5054 is typically formed in an apertured manner to permit liquid flow therepast through volume 5021.

A rotating outlet heat 5056 is arranged for relatively free rotation about a rotation axis 5060 defined in shaft 5050 and is preferably provided with first and second output apertures 5057 and 5058.

Outlet aperture 5057, which is the primary outlet aperture, is arranged to provide a radially directed concentrated high pressure backflushing jet, which serves to flush particulate matter from the stack of filter elements 5019. Outlet aperture 5058 is arranged to provide a tangentially directed stream, which produces rotation of head 5056 about axis 5060.

Inlet 5051 is typically coupled via a flexible hose 5052 to a backflush liquid supply which may be connected to a pressurized source of liquid to be filtered 5066. A two way valve 5067 selectably couples the water inlet 5018 of the filter either to pressurized source 5066 or to backflush liquid drain 5063.

During normal operation of the filter of the present invention, assembly 5040 is located mainly within volume 5021 and shaft 5050 is sealingly coupled to the top portion 5014 of the housing by means of a sealing collar 5068 which sealingly engages threading on shaft 5050 and on the top portion 5014. Valve 5067 is oriented as shown in FIG. 29 such that liquid to be filtered enters from source 66 and passes to inlet 5018 and through the stack of filter elements 5019 from the upstream surface to the downstream surface, being filtered in the process. The filtered liquid passes through volume 5021 and through the apertures formed in base 5054 to outlet 5020. Valve 5053 is closed.

During backflush operation, valve 5067 is manipulated to close off pressurized liquid source 5066 and to provide communication between inlet 5018 and backflush drain 5063. Valve 5053 is opened to provide a pressurized flow of water to assembly 5040, and collar 5068 is disconnected.

High pressure spray outlet head 5056 is manually reciprocated axially along the interior of the stack of filter elements at the downstream surface, causing a high pressure concentrated jet of water to impinge on the downstream surface thereof for dislodging accumulated filtered material from the stack of filter elements. This arrangement enables substantially the entire downstream surface to be thus scanned, region by region, by the high pressure concentrated jet for efficient backflush cleaning of the stack of filter elements.

Figure 32:
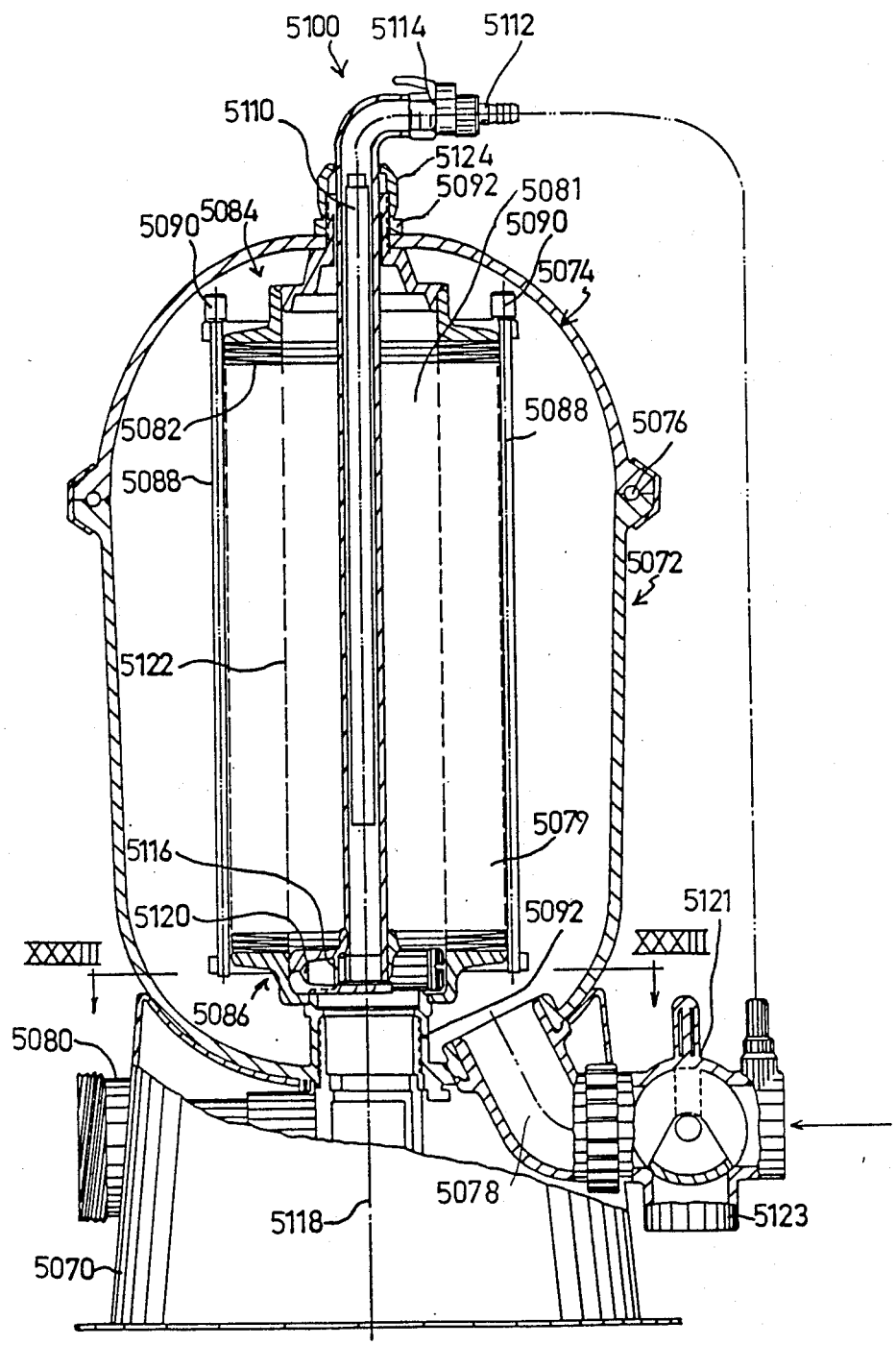
FIG. 32 is a partially cut-away side view sectional illustration of a filter constructed and operative in accordance with an alternative embodiment of the present invention.
Figure 33:
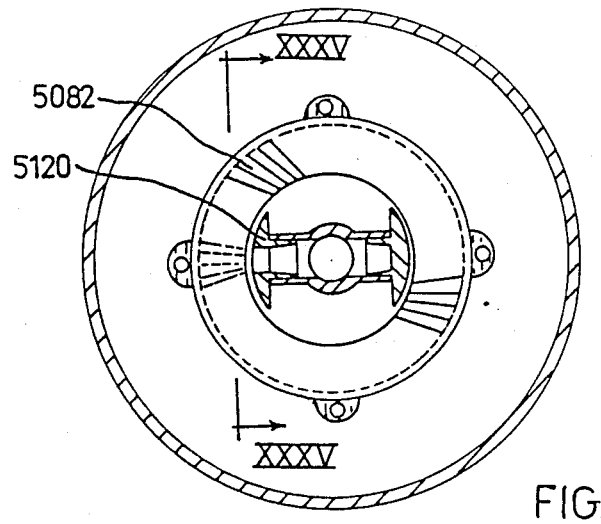
FIG. 33 is a sectional illustration taken along the lines XXXIII—XXXIII of FIG. 32.
Figure 35:
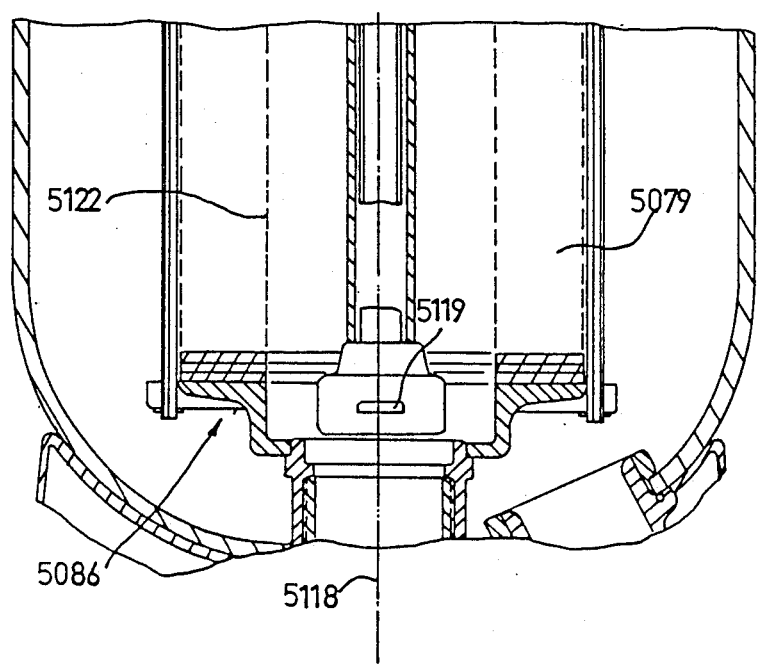
FIG. 35 is a sectional illustration taken along the lines XXXV—XXXV of FIG. 33.

Reference is now made to FIGS. 32, 33 and 35 which illustrate a filter constructed and operative in accordance with a preferred embodiment of the present invention and comprising a base 5070 on which is fixedly supported a bottom housing portion 5072. Removably mounted onto the bottom housing portion 5072 is a top housing portion 5074, which is maintained in sealing engagement therewith by means of a sealing ring 5076.

A fluid inlet 5078 is provided adjacent the bottom of housing portion 5072 and communicates with the outside cylindrical surface, hereinafter termed the "upstream surface", of a stack of filter elements 5079. A fluid outlet assembly 5080 is coupled to housing portion 5072 and communicates with a hollow interior portion 5081 of stack of filter elements 5079 adjacent the inner cylindrical surface of the stack of filter elements, hereinafter termed the "downstream surface".

The stack of filter elements 5079 preferably comprises a stack of hollow center filter disks 5082 of any suitable type. Alternatively, the stack of filter elements may be replaced by any other suitable type of filter element such as a cartridge or cylindrical mesh filter. Suitable filter disks are described in the U.S. Patent Applications listed hereinabove in the "Background of the Invention", and are operative to remove particulate matter from liquids passing therethrough from the upstream surface to the downstream surface. A preferred filter disk arrangement is described and claimed in copending Israel Patent Application No. 78160, filed Mar. 14, 1986, the disclosure of which is incorporated herein by reference.

The stack of filter elements 5082 is preferably removably mounted in coaxial relationship so as to define volume 5081 and is retained in suitably tight engagement by means of top and bottom retaining collars 5084 and 5086 joined by a plurality of threaded rods 5088, typically four in number, and associated nuts 5090. A collar member 5092 engages retaining collar 5084 for retaining cover portion 5074 onto stack of filter elements 5079 and onto the bottom housing portion 5072.

A high pressure spray nozzle assembly 5100 is disposed mainly within volume 5081 and comprises a water supply shaft 5110 having a water inlet 5112 and an associated inlet valve 5114.

A manually rotatable outlet head 5116 is arranged for relatively free rotation about a rotation axis 5118 defined in shaft 5110 and is preferably provided with a single output aperture 5119. According to a preferred embodiment of the invention, there is provided surrounding outlet aperture 5119 a flange 5120 which is curved to correspond to the curvature of the inner, downstream, surface 5122 of the stack of filter elements and to generally tightly engage same, such that the water stream exiting from outlet aperture 5119 is forced into the volume of the stack of filter elements facing the outlet aperture and is not permitted to be spread out, thus reducing its strength and its backflushing efficiency.

As noted particularly in FIG. 35, it is also a particular feature of the present invention that the outlet aperture 5119 has a limited height, which corresponds to the axial spacing, i.e. along axis 5118, between adjacent filter elements 5082, as well as a limited azimuthal extent, corresponding to the width of a filtering chamber defined between adjacent filter elements 5082 and between generally radially extending separations defined thereby. This arrangement is provided such that as the outlet aperture 5119 is displaced up and down and rotated about axis 5118, the pressurized stream produced thereby sequentially is concentrated on individual filtering chambers defined in the stack of filter elements to provide enhanced backflushing thereof.

As noted above, outlet aperture 5119 is arranged to provide a radially directed concentrated high pressure backflushing jet, which serves to flush particulate matter from the stack of filter elements 5079.

Inlet 5112 is typically coupled via a flexible hose (not shown) to a backflush liquid supply which may be connected to a pressurized source of liquid to be filtered which communicates with the inlet 5078 via a two way valve 5121. Valve 5121 selectably couples the water inlet 5078 of the filter either to the pressurized source 5066 or to a backflush liquid drain 5123.

During normal operation of the filter of the present invention, assembly 5100 is located mainly within volume 5081 and shaft 5110 is sealingly coupled to the top portion 5074 of the housing by means of a sealing collar 5124 which sealingly engages threading on shaft 5110 and on the top portion 5074. Valve 5121 is oriented as shown in FIG. 32 such that liquid to be filtered enters from the pressurized source and passes to inlet 5078 and through the stack of filter elements 5079 from the upstream surface to the downstream surface, being filtered in the process. The filtered liquid passes through volume 5081. Valve 5114 is closed.

During backflush operation, valve 5121 is manipulated to close off the pressurized liquid source and to provide communication between inlet 5078 and backflush drain 5123. Valve 5114 is opened to provide a pressurized flow of water to assembly 5100 and collar 5124 is disconnected.

High pressure stream outlet head 5116 is manually reciprocated axially along the interior of the stack of filter elements at the downstream surface and is manually rotated by at least 360 degrees, causing a high pressure concentrated jet of water to impinge on the downstream surface thereof for dislodging accumulated filtered material from the stack of filter elements. This arrangement enables substantially the entire downstream surface to be thus scanned, region by region, by the high pressure concentrated jet for efficient backflush cleaning of the stack of filter elements.

Figure 34:
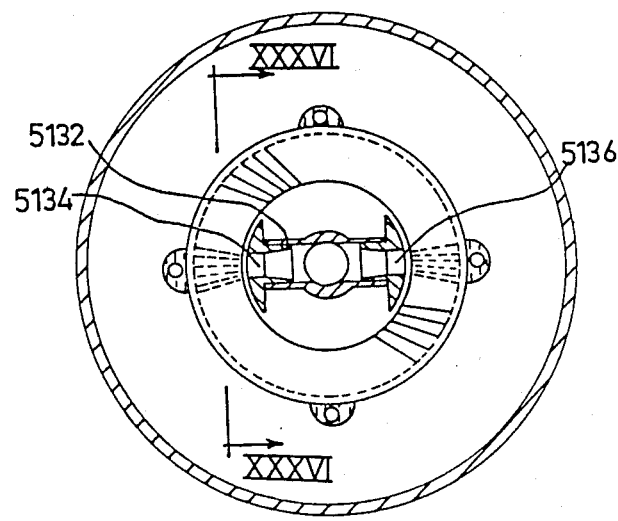
FIG. 34 is a sectional illustration corresponding to that of FIG. 33 but illustrating a dual nozzle variety of filter otherwise similar to the single-nozzle variety shown in FIGS. 32 and 33.
Figure 36:
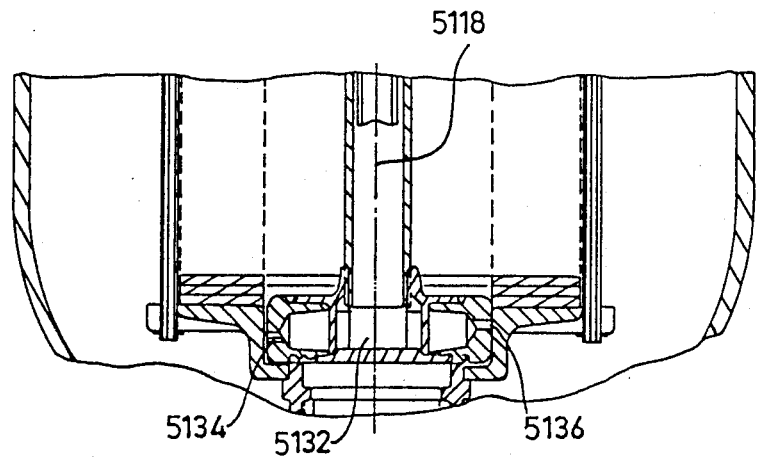
FIG. 36 is a sectional illustration taken along the lines XXXVI—XXXVI of FIG. 34.

Reference is now made to FIGS. 34 and 36, which illustrate an alternative embodiment of the apparatus of FIG. 32, wherein a high pressure stream outlet head 5132 having two oppositely directed outlet apertures 5134 and 5136 is provided. According to a preferred embodiment, the two apertures 5134 and 5136 are arranged at different axial locations, with respect to axis 5118, as shown in FIG. 36, thus providing simultaneous flushing of chambers at two different axial locations along axis 5118.

Figure 37:
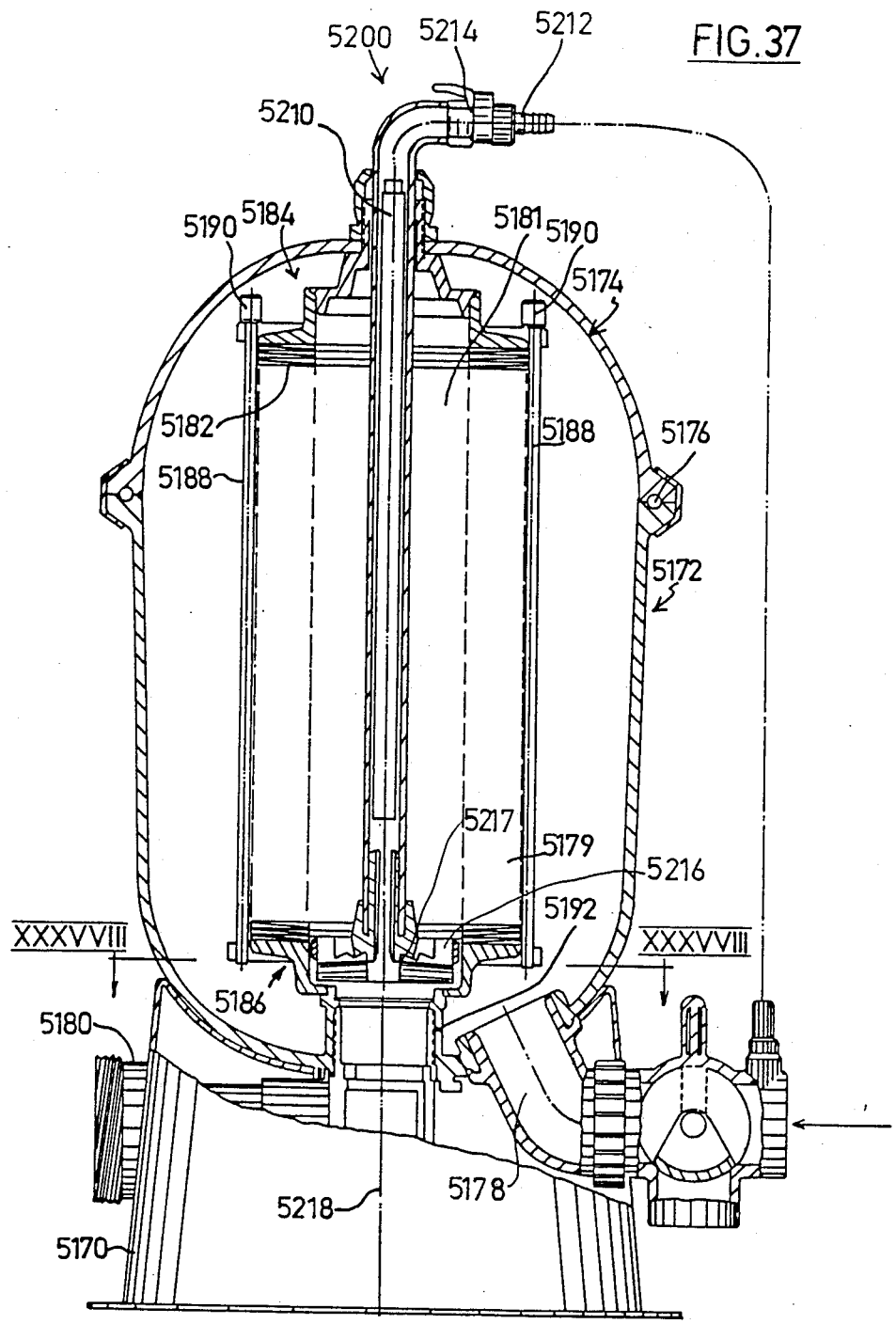
FIG. 37 is a partially cut-away side view sectional illustration of a filter constructed and operative in accordance with a further alternative embodiment of the present invention.
Figure 38:
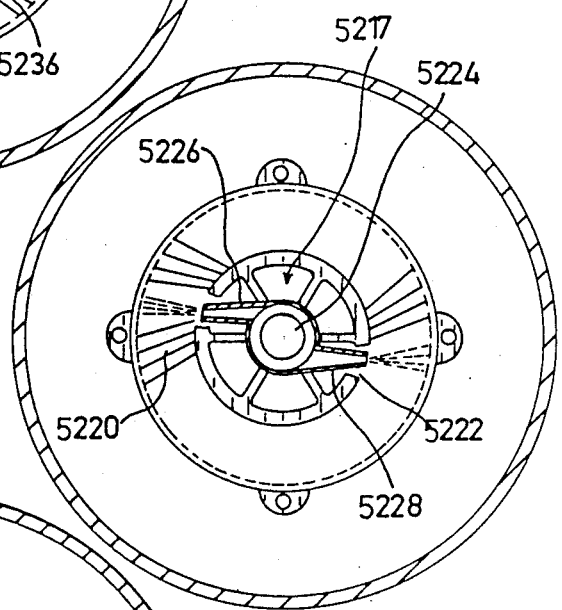
FIG. 38 is a sectional illustration taken along the lines XXXVIII—XXXVIII of FIG. 37.

Reference is now made to FIGS. 37 and 38 which illustrate a filter constructed and operative in accordance with another preferred embodiment of the present invention and comprising a base 5170 on which is fixedly supported a bottom housing portion 5172. Removably mounted onto the bottom housing portion 5172 is a top housing portion 5174, which is maintained in sealing engagement therewith by means of a sealing ring 5176.

A fluid inlet 5178 is provided adjacent the bottom of housing portion 5172 and communicates with the outside cylindrical surface, hereinafter termed the "upstream surface," of a stack of filter elements 5179. A fluid outlet assembly 5180 is coupled to housing portion 5172 and communicates with a hollow interior portion 5181 of stack of filter elements 5179 adjacent the inner cylindrical surface of the stack of filter elements, hereinafter termed the "downstream surface."

The stack of filter elements 5179 preferably comprises a stack of hollow center filter disks 5182 of any suitable type. Alternatively, the stack of filter elements may be replaced by any other suitable type of filter element such as a cartridge or cylindrical mesh filter. Suitable filter disks are described in the U.S. Patent Applications listed hereinabove in the "Background of the Invention", and are operative to remove particulate matter from liquids passing therethrough from the upstream surface to the downstream surface. A preferred filter disk arrangement is described and claimed in copending Israel Patent Application No. 78160, filed Mar. 14, 1986, the disclosure of which is incorporated herein by reference.

The stack of filter elements 5182 is preferably removably mounted in coaxial relationship so as to define volume 5181 and is retained in suitably tight engagement by means of top and bottom retaining collars 5184 and 5186 joined by a plurality of threaded rods 5188, typically four in number, and associated nuts 5190. A collar member 5192 engages retaining collar 5184 for retaining cover portion 5174 onto stack of filter elements 5179 and onto the bottom housing portion 5172.

A high pressure spray nozzle assembly 5200 is disposed mainly within volume 5181 and comprises a water supply shaft 5210 having a water inlet 5212 and an associated inlet valve 5214. A fixed base portion 5216 is typically mounted onto shaft 5210 and serves to maintain the nozzle assembly 5200 centered with respect to volume 5181 and the downstream cylindrical surface of stack of filter elements 5179. Base portion 5216 is typically formed in an apertured manner to permit liquid flow therepast through volume 5181.

A rotating outlet head 5217 is arranged for relatively free rotation about a rotation axis 5218 defined in shaft 5210 and is preferably provided with first and second output apertures 5220 and 5222.

Referring now specifically to FIG. 38, it is seen that rotating outlet head 5217 comprises a generally circular central portion 5224 and first and second truncated-conical outlet conduits 5226 and 5228 which are offset from each other azimuthally with respect to axis 5218 and which extend generally in parallel opposite directions and terminate in respective apertures 5220 and 5222.

Pressurized water exiting apertures 5220 and 5222 in the illustrated offset arrangement produces a rotational moment resulting in rotation of head 5217 with respect to the stack of filter elements.

Figure 39:
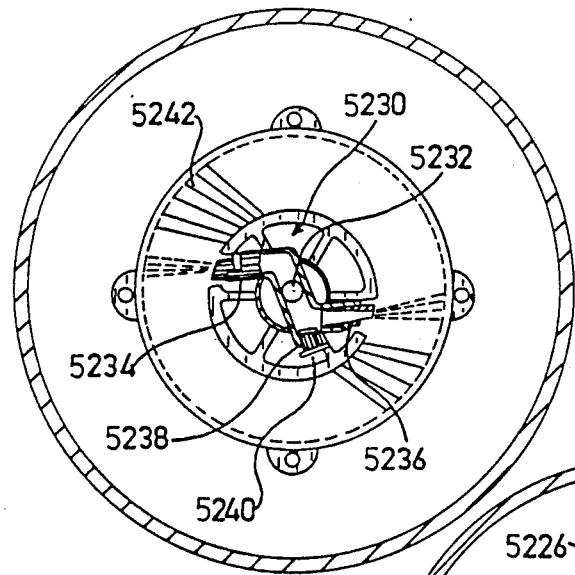
FIG. 39 is a sectional illustration corresponding to that of FIG. 38 but illustrating another variety of dual-nozzle filter otherwise similar to the variety shown in FIGS. 32 and 33.

Reference is now made to FIG. 39, which illustrates an alternative embodiment of the invention wherein a different configuration of rotating outlet head is employed. Here the outlet head 5230 comprises an elongate central portion 5232 and two angled outlet nozzles 5234 and 5236 coupled thereto. A further radially directed outlet aperture 5238 may be provided and selectably plugged as by a plug 5240.

It is noted that according to a preferred embodiment of the invention, the directions of the pressurized streams produced by the head 5230 are somewhat skewed from the radial and are preferably aligned with the configuration of filtering chambers 5242 defined by the stack of filter elements, such that the streams tend to fully penetrate to the interior of the filtering chambers 5242.

The remainder of the apparatus of FIGS. 37–39 is generally similar to that of FIG. 29 and the operation thereof is similar. Thus, for the sake of conciseness, descriptions of the similar structure and operation are not here repeated.

Figure 41:
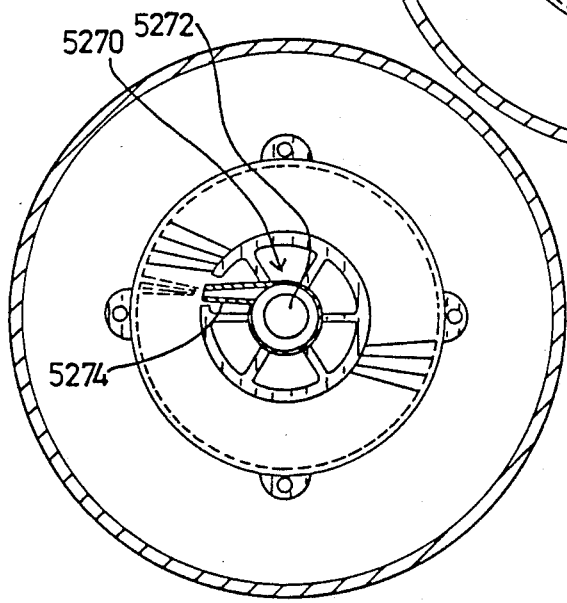
FIG. 41 is a sectional illustration taken along the lines XLI—XLI of FIG. 40.
Figure 40:
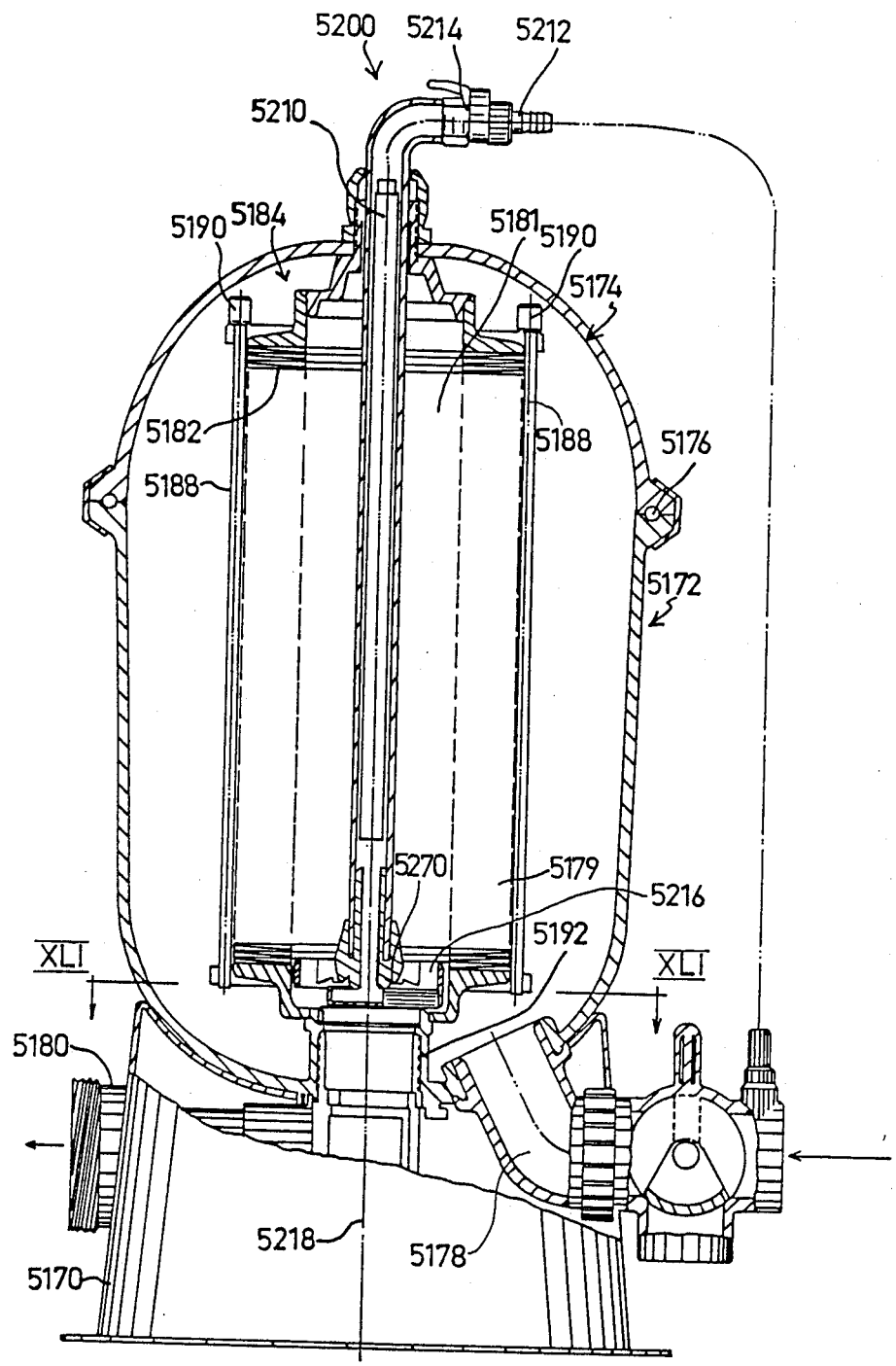
FIG. 40 is a sectional illustration corresponding to that of FIG. 37 but illustrating a single-nozzle variety of filter otherwise similar to the dual-nozzle variety of filter otherwise similar to the dual-nozzle variety shown in FIGS. 37-39.

Reference is now made to FIGS. 40 and 41 which illustrate an alternative embodiment of the apparatus of FIG. 39, which is generally similar thereto except for the fact that here an outlet head 5270 comprises an generally circular central portion 5272 and only a single radially offset outlet nozzle 5274.

The remainder of the apparatus of FIGS. 40 and 41 is generally similar to that of FIG. 37 and the operation thereof is similar. Thus, for the sake of conciseness, descriptions of the similar structure and operation are not here repeated.

Figure 42A:
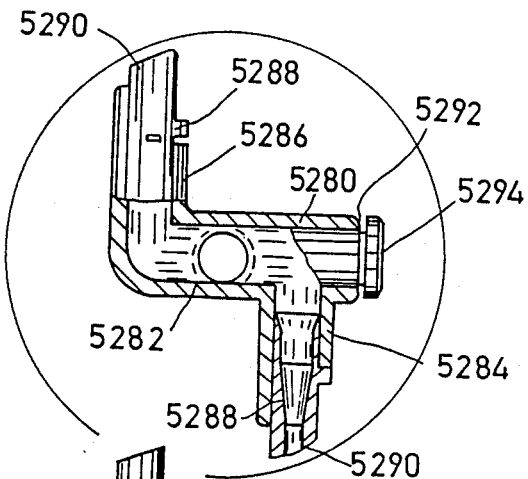
FIGS. 42A, 42B, 42C illustrate three alternative configurations of dual-nozzle outlet means.
Figure 42B:
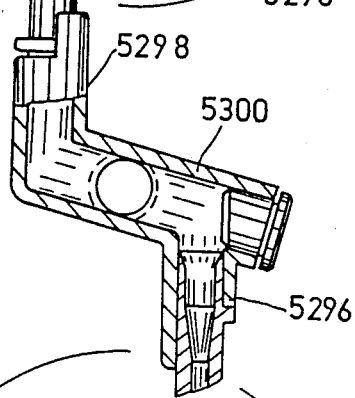
Figure 42C:
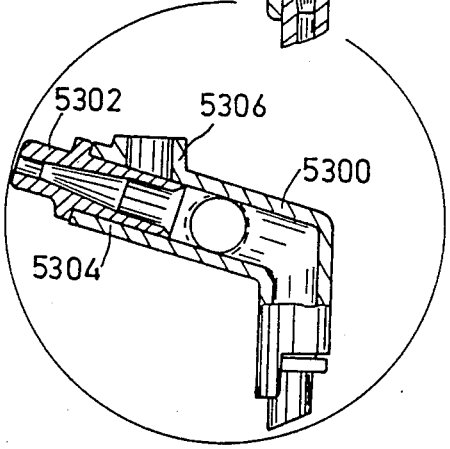

Reference is now made briefly to FIGS. 42A–42C. FIG. 42A illustrates an outlet head 5280 having an elongate central portion 5282 and two nozzle receiving arms 5284 and 5286, which are arranged at right angles thereto for receiving selectably configured nozzle elements 5288. It is noted that nozzle elements 5288 have a slanted termination end 5290, which is intended to correspond to the cylindrical configuration of the inner surface of volume 5081 (FIG. 32) and thus enable relatively tight "sealing" engagement therewith for maximum penetration of a pressurized water stream into the filter element chambers. Outlet head 5280 is also provided with a third outlet opening 5292 which defines an extension of central portion 5282 and is blocked as by a plug 5294.

FIG. 42B illustrates a variation of the structure of FIG. 42A, wherein the arms 5296 and 5298 extend from the central portion 5300 other than at 90 degrees.

FIG. 42C illustrates the outlet head of FIG. 42B, wherein a nozzle element 5302 is disposed in an outlet opening 5304 which extends axially from central portion 5300, thus sealing the adjacent outlet opening 5306.

Reference is now made to FIGS. 43–54, which illustrate two alternative embodiments of stacks of filter elements, each comprising a stack of filter disks constructed and operative in accordance with a preferred embodiment of the invention. The stack of filter disks is appropriate for use in any suitable filter apparatus, and are particularly useful in the filter apparatus described hereinabove.

Reference is made first to FIGS. 43–49C. The assembly shown in these figures comprises alternating centrally apertured filter elements 5410 formed of a plastic material, such as polypropylene. The filter elements are of two types, indicated respectively by reference numerals 5412 and 5414. Disks 5412 are typically formed with identical first planar surfaces defining circumferential grooves 5416, typically having a generally V-shaped cross section. The dimensions of the grooves are determined by the fineness of the filtering sought to be achieved thereby.

Figure 49A:
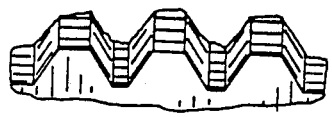
FIGS. 49A and 49B are sectional illustrations taken along the lines A—A and B—B respectively of FIG. 48.
Figure 49B:
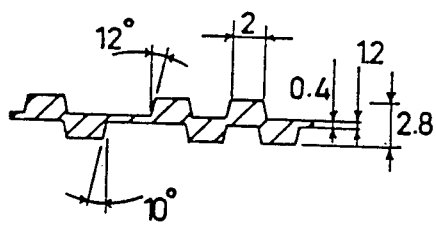
Figure 49C:
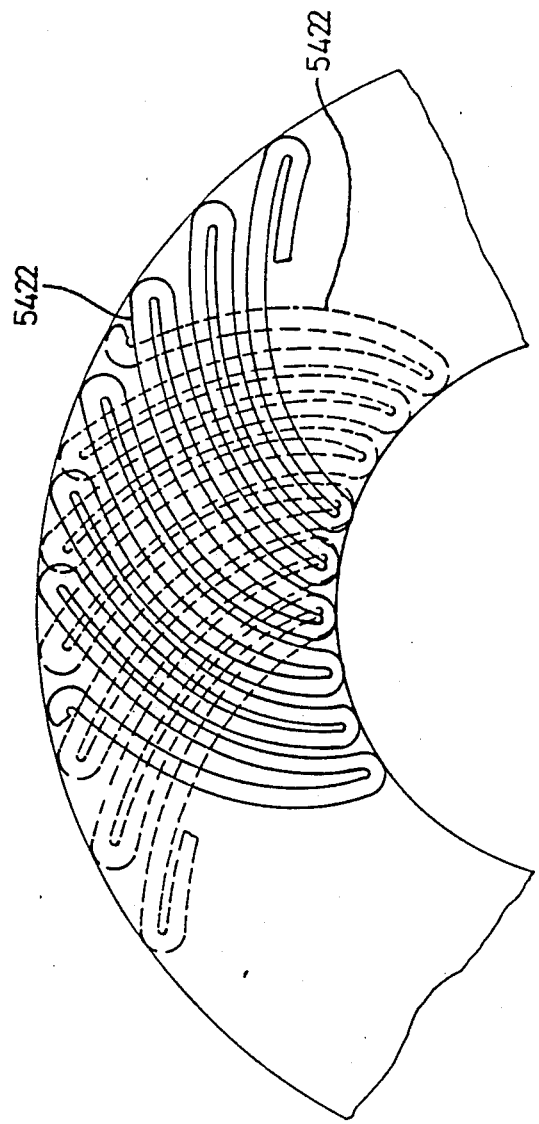
FIG. 49C is a superimposed illustration showing the relative orientations of opposite sides of a filter element of the type illustrated in FIG. 48.

Disks 5414 typically comprise identically patterned opposite second planar surfaces, the two planar surfaces of each filter element 5414 typically being mirror opposites of each other, as can be seen in FIGS. 49B and 49C. This out of phase arrangement provides enhanced structural strength to filter element 5414 and enables it to be made of relatively thin material.

Each planar surface of spacer filter element 5414 is formed with a filter barrier defined by a raised line pattern 5420, which preferably is arranged to extended continuously in generally undulating configuration defining a plurality of radially extending finger elements 5422 on the face of the planar surface. The raised line pattern 5420 typically defines the outline of each finger element 5422 and may be configured to define a smooth outline or alternatively a notched or serrated pattern along the generally radially extending portion of each finger element 5422.

Figure 48:
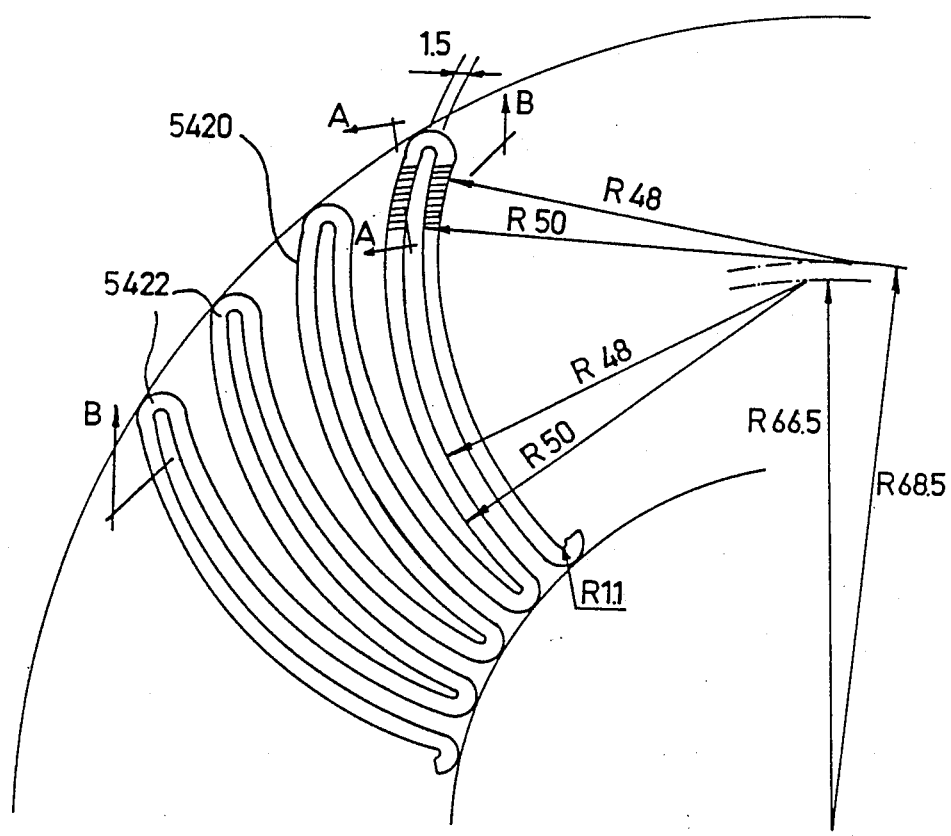
FIG. 48 is a pictorial illustration of the curved configuration of one of the stack of filter elements shown in FIG. 43.

Referring specifically to FIGS. 48 and 49B, it is seen that the configuration of the finger element 5422 is preferably not exactly radial, although for the purposes of this patent, it is included within the definition of generally radially extending. Specifically, the outline of each finger element is curved along a portion of an arc. Each raised line portion is configured as part of an arc about a different center, as illustrated in FIG. 48.

The resulting configuration provides a relatively enhanced length of the line portion, and thus of the filter barrier per unit area of the filter element. It will be appreciated that the filter barrier defined by the raised line portion 5420 defines a barrier between an upstream side of the filter, here typically the radially outward side of the line portion, and the downstream side of the filter, typically the radially inward side of the line portion. Accordingly, it may be understood that an increase in the length of the filter barrier per unit area of filter element provides a corresponding increase in the filtering capacity of the unit per unit area of filter element, and per unit volume of a filter element made up of a stack of such filter elements.

It is a particular feature of the present invention that the raised line portion 5420, defining the second planar surface of the filter element 5414, is formed with an array of grooves 5424, typically of the same general dimensions as grooves 5416. When the first and second planar surfaces are arranged in juxtaposed engagement, the raised line pattern 5420 engages the grooves 5416 of filter elements 5412, defining a filter barrier between the upstream side of the filter and the downstream side. The spaces between adjacent finger elements 5422 define filtering chambers, as do the spaces defined interiorly of each finger element 5422. These filtering chambers, it will be recalled, are particularly suitable for pressurized backflush cleaning by the high pressure directed backflush stream produced by the apparatus of FIGS. 29–42C described hereinabove.

At the locations where the first and second planar surfaces meet in touching engagement, grooves 5424 of the second surface meet grooves 5416 of the first surface. Understanding of this engagement may be assisted by a consideration of FIG. 45.

Figure 43:
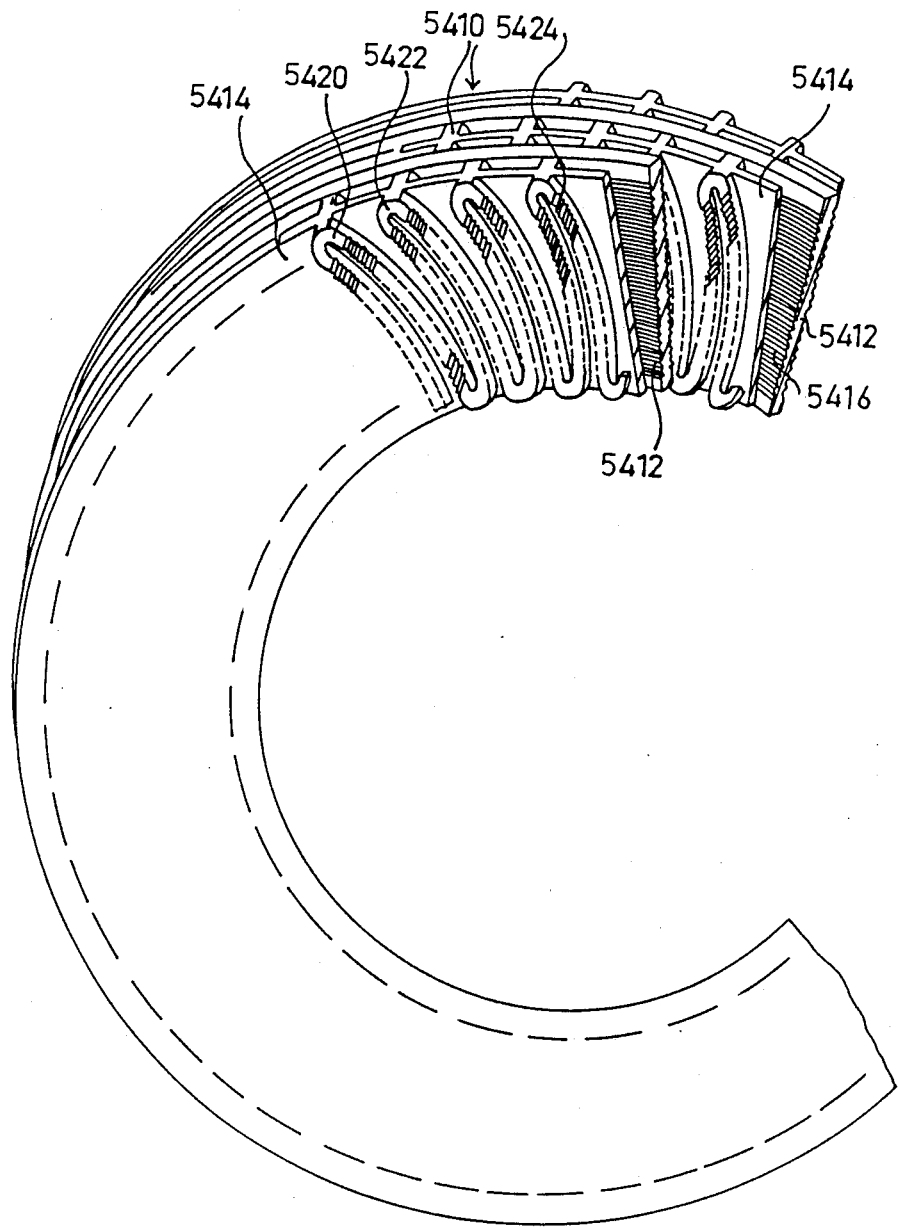
FIG. 43 is a pictorial illustration of a portion of a stack of filter elements constructed and operative in accordance with a preferred embodiment of the invention.

It is a particular feature of the present invention that grooves 5416 and 5424 are mutually skewed, as illustrated in FIGS. 41 and 43, such that they define multiply intersecting paths for fluid flow therethrough, there being defined at intervals along the pathway a particle size gauge being the cross section of the single groove.

This configuration has a number of advantages, including the fact that along much of the pathway from the upstream side to the downstream side across the engaged first and second surfaces, the pathway is larger than the particle size gauge due to the effective combination of grooves formed on the opposite facing surfaces. The multiple interconnections between grooves provides multiple alternative paths for fluid, such that fluid flow may continue notwithstanding blockage of certain passageways. The relatively long and intricate pathway of the fluid provides enhanced depth of filtering, thus increasing filtering efficiency.

FIG. 49A shows a detailed illustration of the cross-section of grooves 5424.

Figure 44:
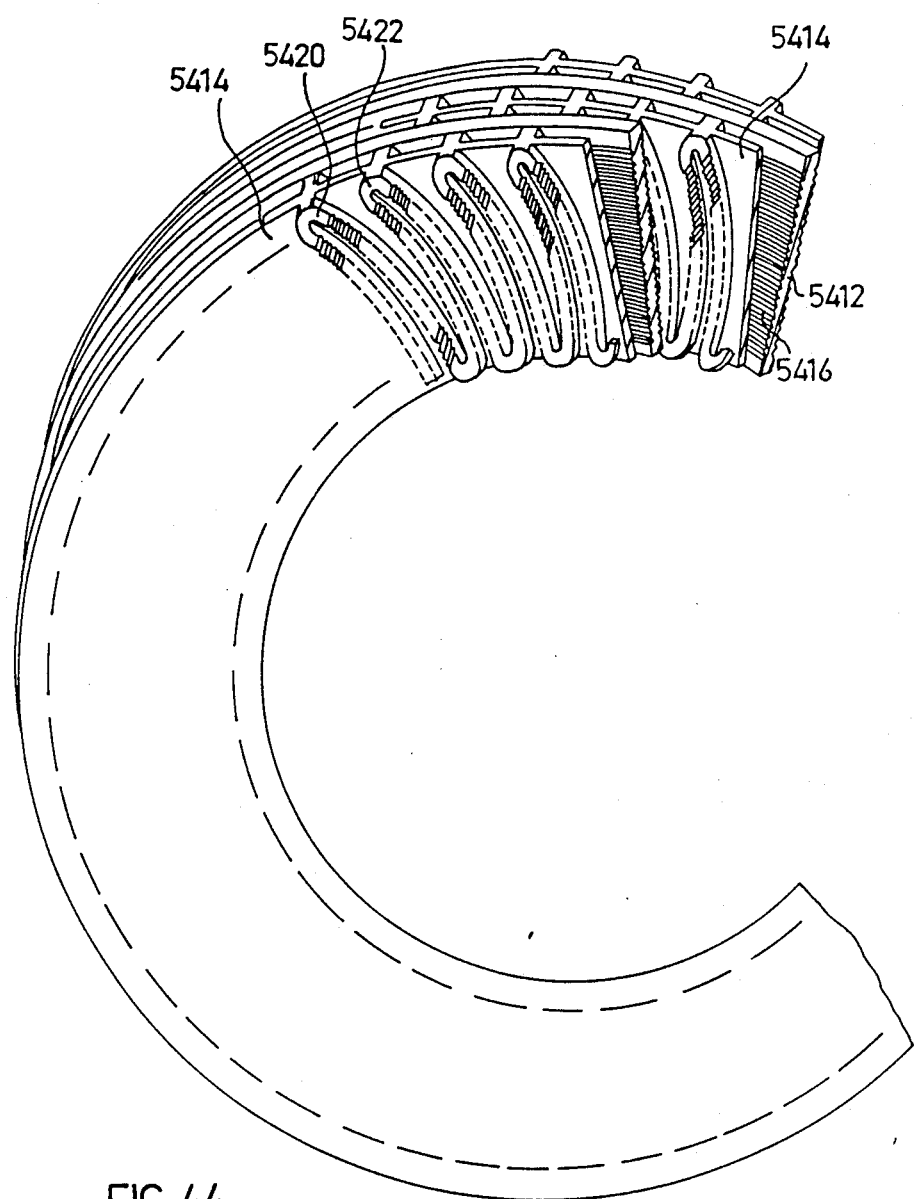
FIG. 44 is a pictorial illustration of a portion of a stack of filter elements shown in FIG. 43, also showing the accumulation of sediment thereon.
Figure 45:
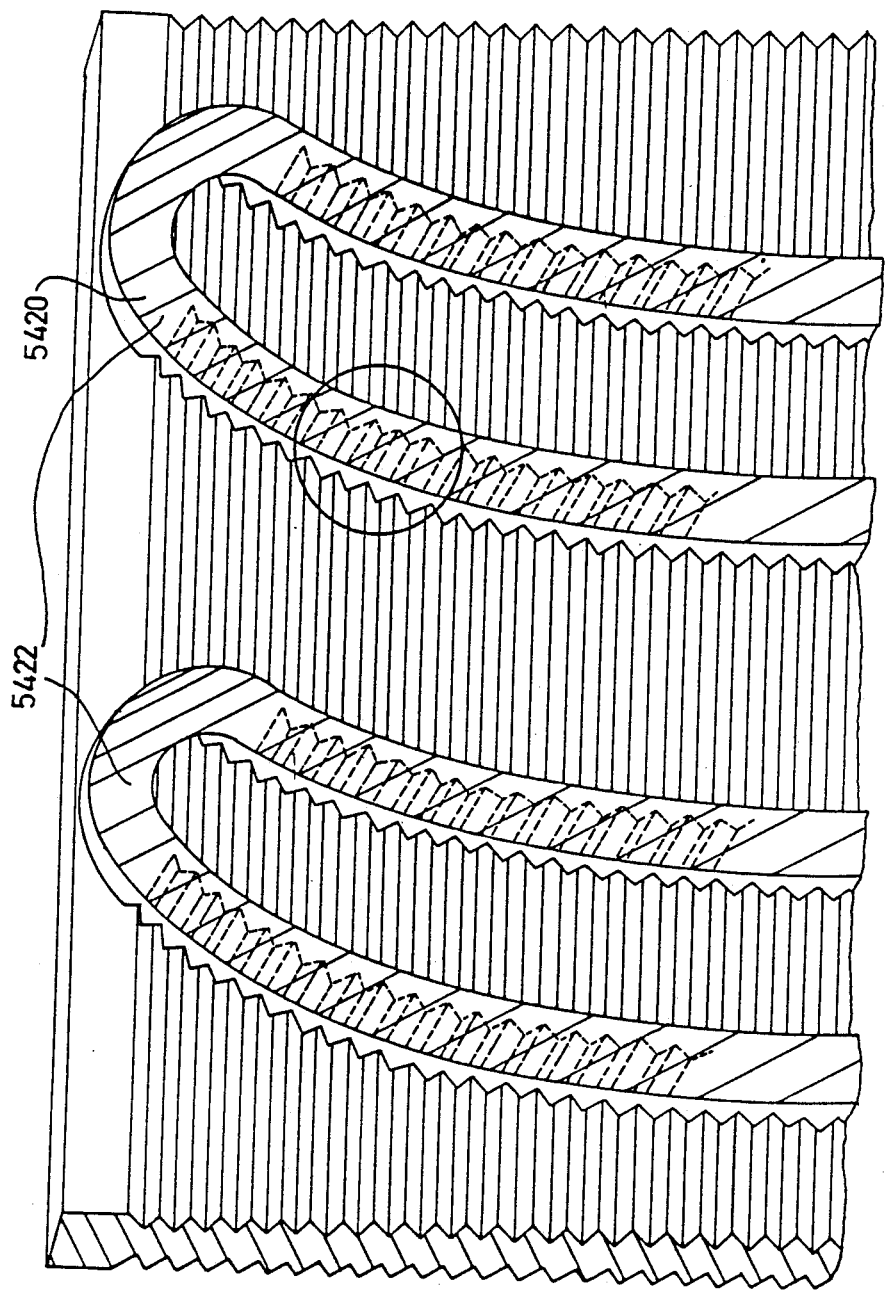
FIG. 45 is an enlarged illustration of a portion of the stack of filter elements illustrated in FIG. 43.
Figure 46:
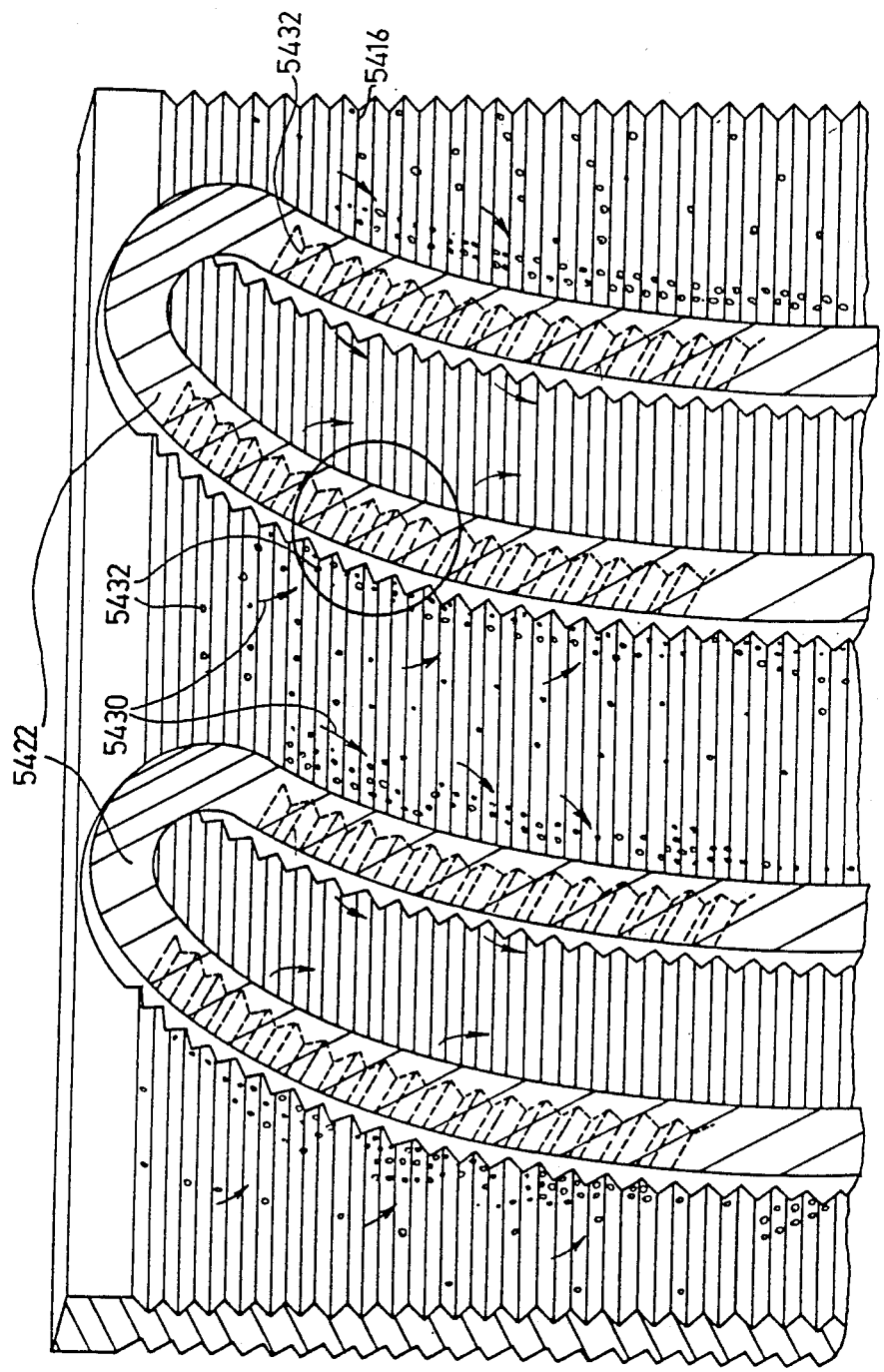
FIG. 46 is an enlarged illustration of a portion of the stack of filter elements illustrated in FIG. 44 also showing the accumulation of sediment thereof.
Figure 47:
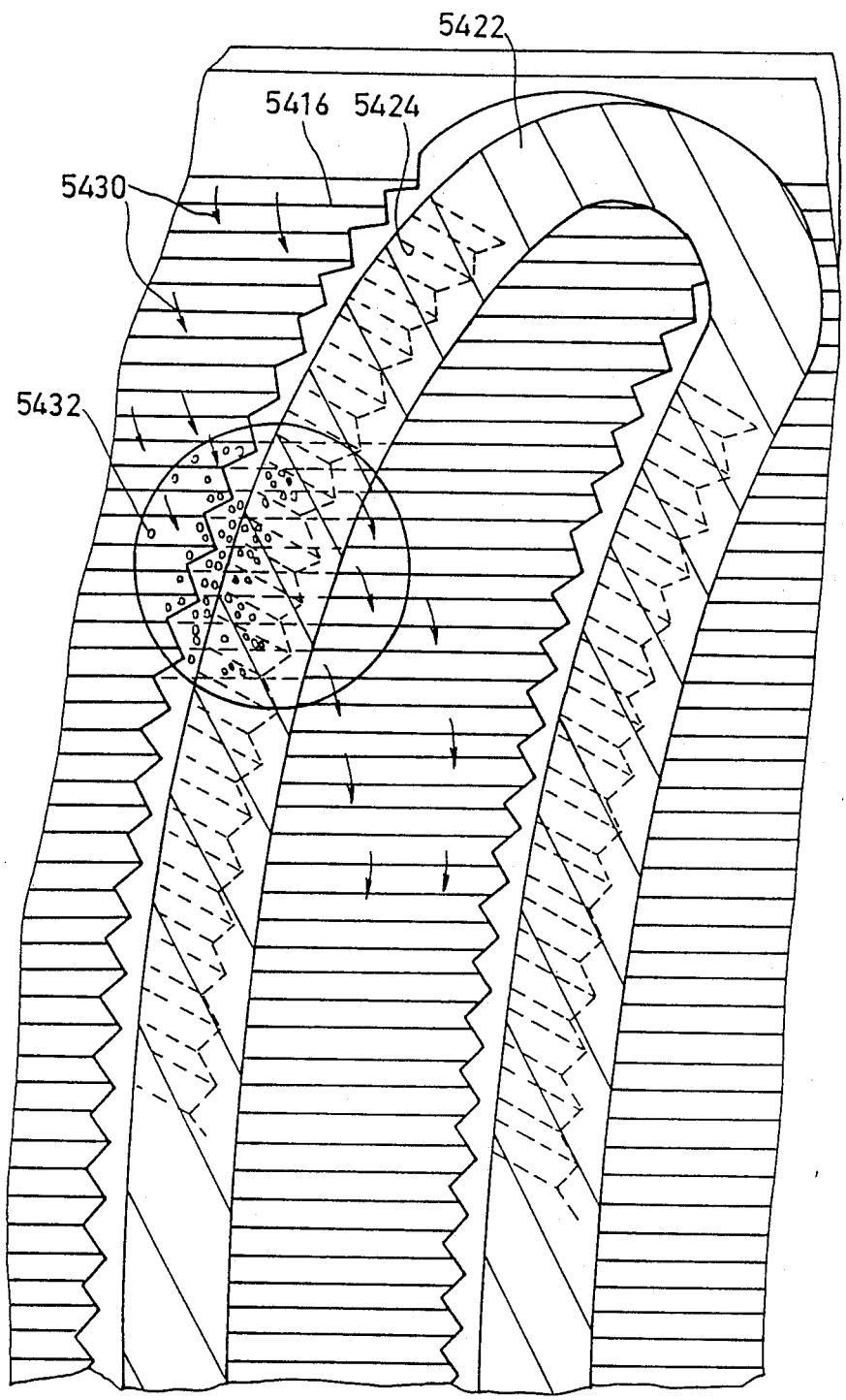
FIG. 47 is a further enlarged illustration of a portion of the stack of filter elements illustrated in FIG. 44 also showing the accumulation of sediment thereon.

Reference is now made to FIGS. 44, 46 and 47, which correspond to FIGS. 43 and 45 but show the collection of sediment particles during operation of the filter. The illustration shows an embodiment wherein the upstream side is radially outward of the raised line portion 5420 and thus intermediate finger elements 5422 while the downstream side is at the radially inward side of the raised line portion 5420 and thus communicates with the area and volume interior of each finger element 5422.

It is seen that fluid, such as water, carrying particulate matter, enters from the upstream side, as indicated by arrows 5430, and deposits particulate matter 5432 upstream of the raised line portion 5420. Consideration of FIG. 47 also indicates that further particulate matter tends to be deposited within the area of engagement of grooves 5416 and 5424 at locations where respective ridges between the grooves on opposite surfaces intersect, defining the maximum size gauge. It may thus be appreciated that particulate matter tends to be deposited generally throughout the area of engagement of grooves 5416 and 5424, thus providing enhanced depth of filtering.

Reference is made now to FIGS. 46–54. The assembly shown in these figures comprises a stack of identical filter elements 5510 formed of a plastic material, such as polypropylene. The filter elements are all of a single type and typically comprise identically patterned opposite second planar surfaces. The two planar surfaces of each filter element may be mirror opposites of each other, as can be seen in FIGS. 49B and 49C. This out of phase arrangement provides enhanced structural strength to filter element 5510 and enables it to be made of relatively thin material.

Each planar surface of filter element 5510 is formed with a filter barrier defined by a raised line pattern 5520, which preferably is arranged to extended continuously in generally undulating configuration defining a plurality of radially extending finger elements 5522 on the face of the planar surface. The raised line pattern 5520 typically defines the outline of each finger element 5522 and may be configured to define a smooth outline or alternatively a notched or serrated pattern along the generally radially extending portion of each finger element 5522.

The configuration of finger element 5522 is similar to that of finger element 5422 described hereinabove. Specifically, the outline of each finger element is curved along a portion of an arc. Each raised line portion is configured as part of an arc about a different center, as illustrated in FIG. 48.

The resulting configuration provides a relatively enhanced length of the line portion, and thus of the filter barrier per unit area of the filter element. It will be appreciated that the filter barrier defined by the raised line portion 5520 defines a barrier between an upstream side of the filter, here typically the radially outward side of the line portion, and the downstream side of the line filter, typically the radially inward side of the line portion. Accordingly, it may be understood that an increase in the length of the filter barrier per unit area of filter element provides a corresponding increase in the filtering capacity of the unit per unit area of filter element, and per unit volume of a stack of such filter elements.

Similarly to the arrangement described hereinabove in connection with FIGS. 43–49C, it is a particular feature of the present invention that the raised line portion 5520, defining the planar surface of the filter element 5510, is formed with an array of grooves 5524, typically of the same general dimensions as grooves 5424, described hereinabove, and governed by the same criteria.

In the embodiment of FIGS. 50–54, the filter elements making up the stack of filter elements are maintained in precise azimuthal alignment, as by means of one or more azimuthal aligning rings 5525 associated with each stack of filter elements and registered by a rod 5527 passing therethrough. Accordingly, when the first and second planar surfaces are arranged in juxtaposed engagement, the finger elements 5522 on the facing first and second planar surfaces are in precise registration, defining a filter barrier between the upstream side of the filter and the downstream side.

The spaces between adjacent finger elements 5522 define filtering chambers, as do the spaces defined interiorly of each finger element 5522. These filtering chambers, it will be recalled, are particularly suitable for pressurized backflush cleaning by the high pressure directed backflush stream produced by the apparatus of FIGS. 29–42C described hereinabove.

It is a particular feature of the embodiment of FIGS. 50–54 that filtering chambers provided are of larger size than those provided in the embodiment of FIGS. 43–49C. Accordingly more room is provided for collection of particulate matter, the finger elements may be located closer together in the plane of the stacks of filter elements, and the filtering chambers have smooth surfaces, providing less resistance to the pressurized fluid stream during backflushing, thus enabling more efficient backflush cleaning of the stack of filter elements.

At the locations where the first and second planar surfaces meet in touching engagement, grooves 5524 on both planar surfaces are engaged. Understanding of this engagement may be assisted by a consideration of FIG. 52.

Figure 52:
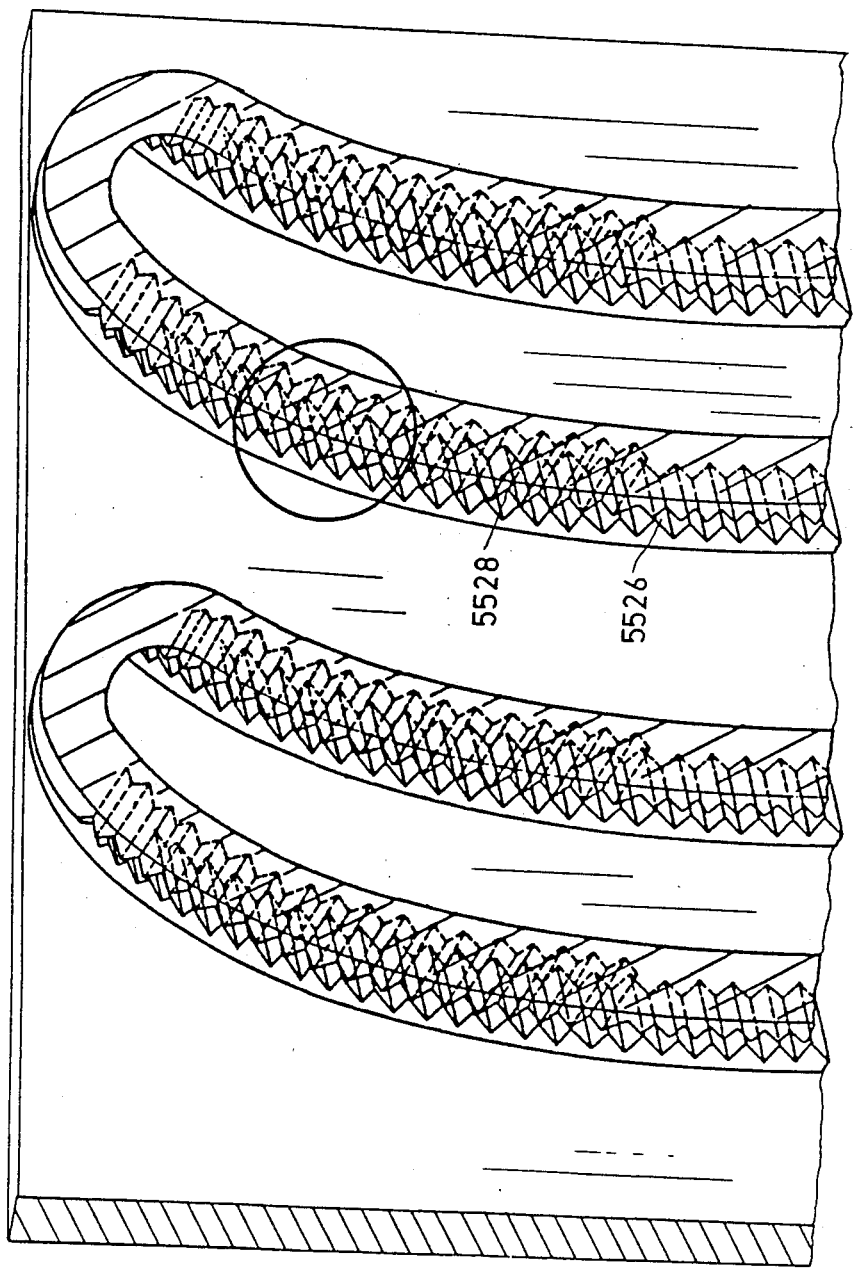
FIG. 52 is an enlarged illustration of a portion of the stack of filter elements illustrated in FIG. 50.

It is a particular feature of the present invention that grooves 5526 and 5528 on the opposite engaging surfaces are mutually skewed, as illustrated in FIG. 52, such that they define multiply intersecting paths for fluid flow therethrough, there being defined at intervals along the pathway a particle size gauge being the cross section of the single groove.

This configuration has a number of advantages, including the fact that along much of the pathway from the upstream side to the downstream side across the engaged first and second surfaces, the pathway is larger than the particle size gauge due to the effective combination of grooves formed on the opposite facing surfaces. The multiple interconnections between grooves provides multiple alternative paths for fluid, such that fluid flow may continue notwithstanding blockage of certain passageways. The relatively long and intricate pathway of the fluid provides enhanced depth of filtering, thus increasing filtering efficiency.

Figure 50:
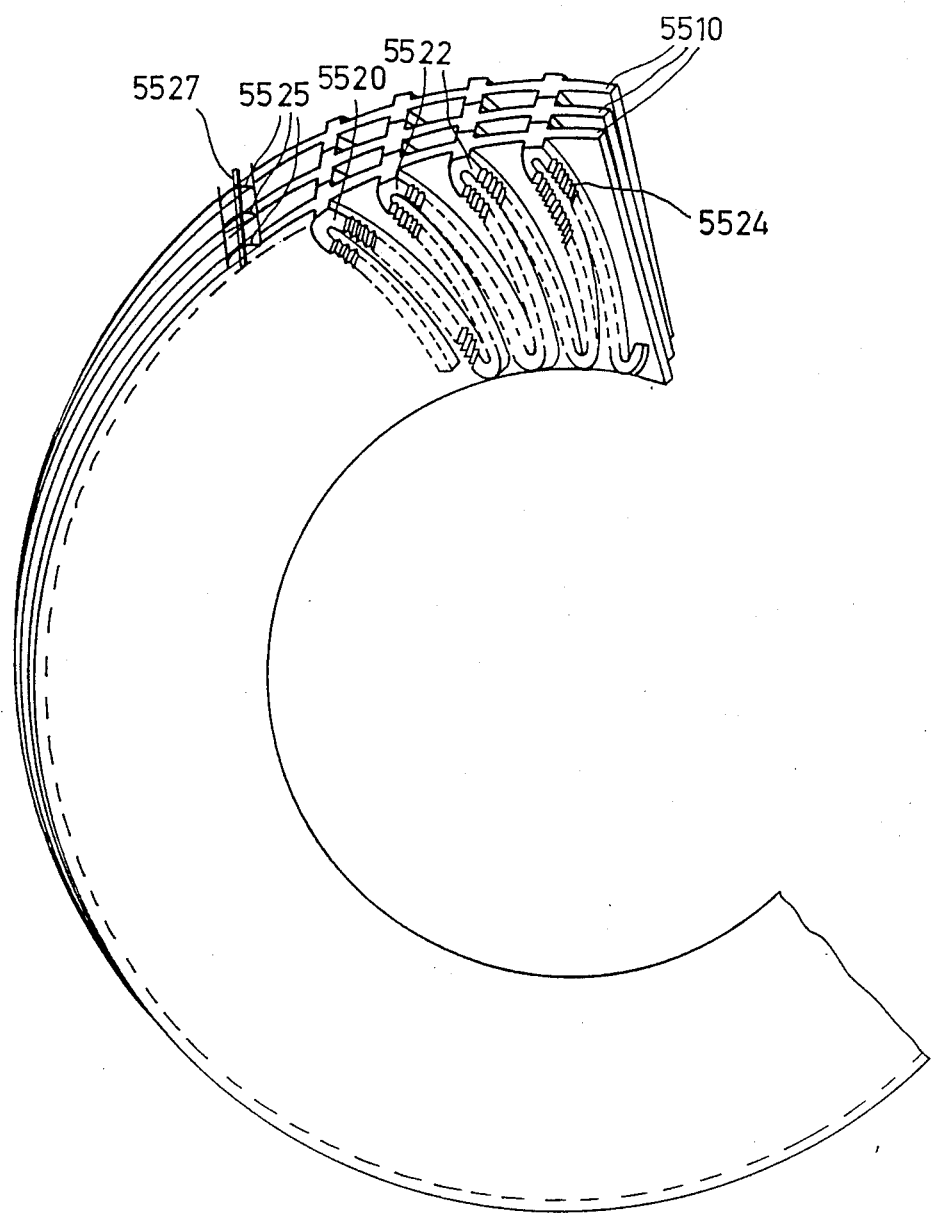
FIG. 50 is a pictorial illustration of a portion of a stack of filter elements constructed and operative in accordance with another preferred embodiment of the invention.
Figure 51:
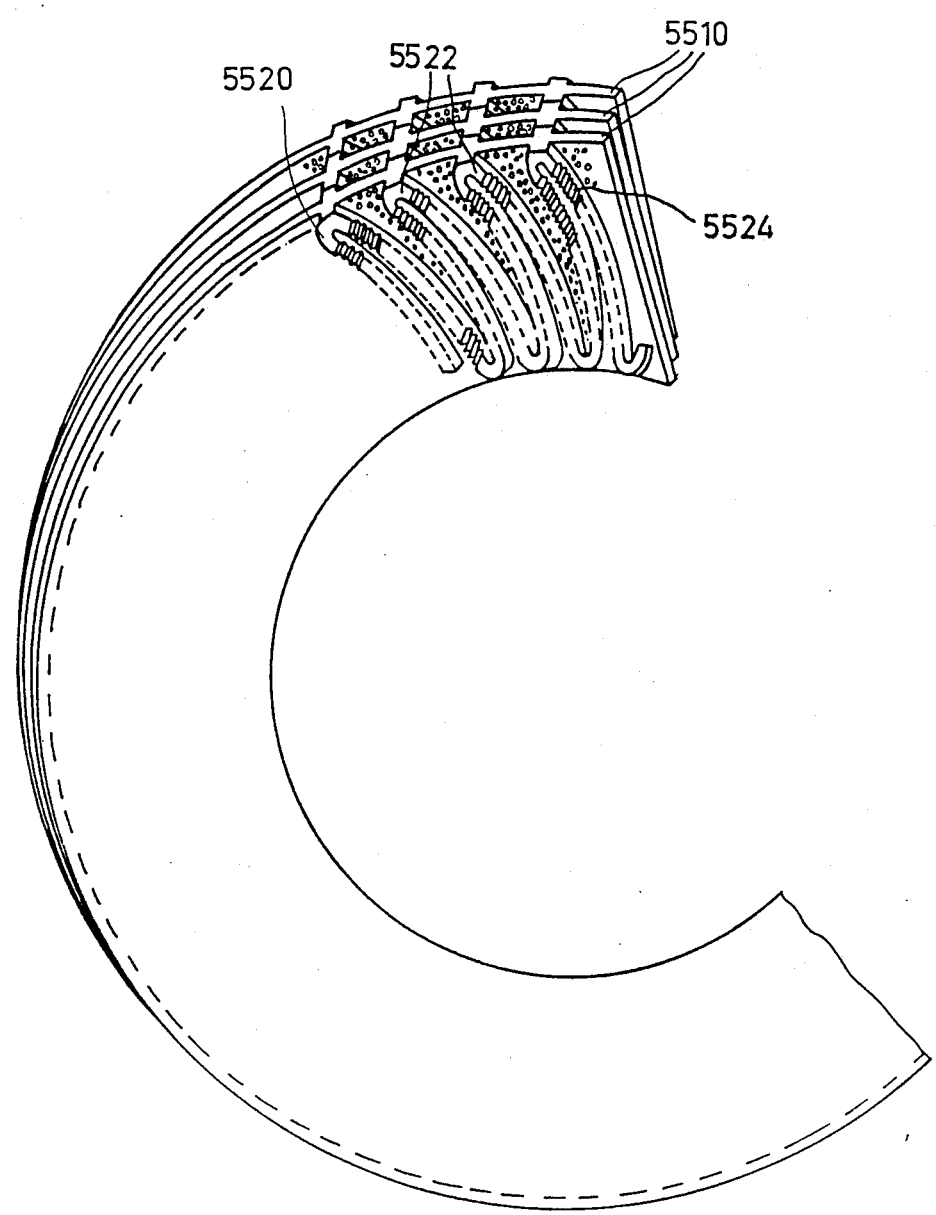
FIG. 51 is a pictorial illustration of a portion of a stack of filter elements of FIG. 50 also showing the accumulation of sediment thereon.
Figure 53:
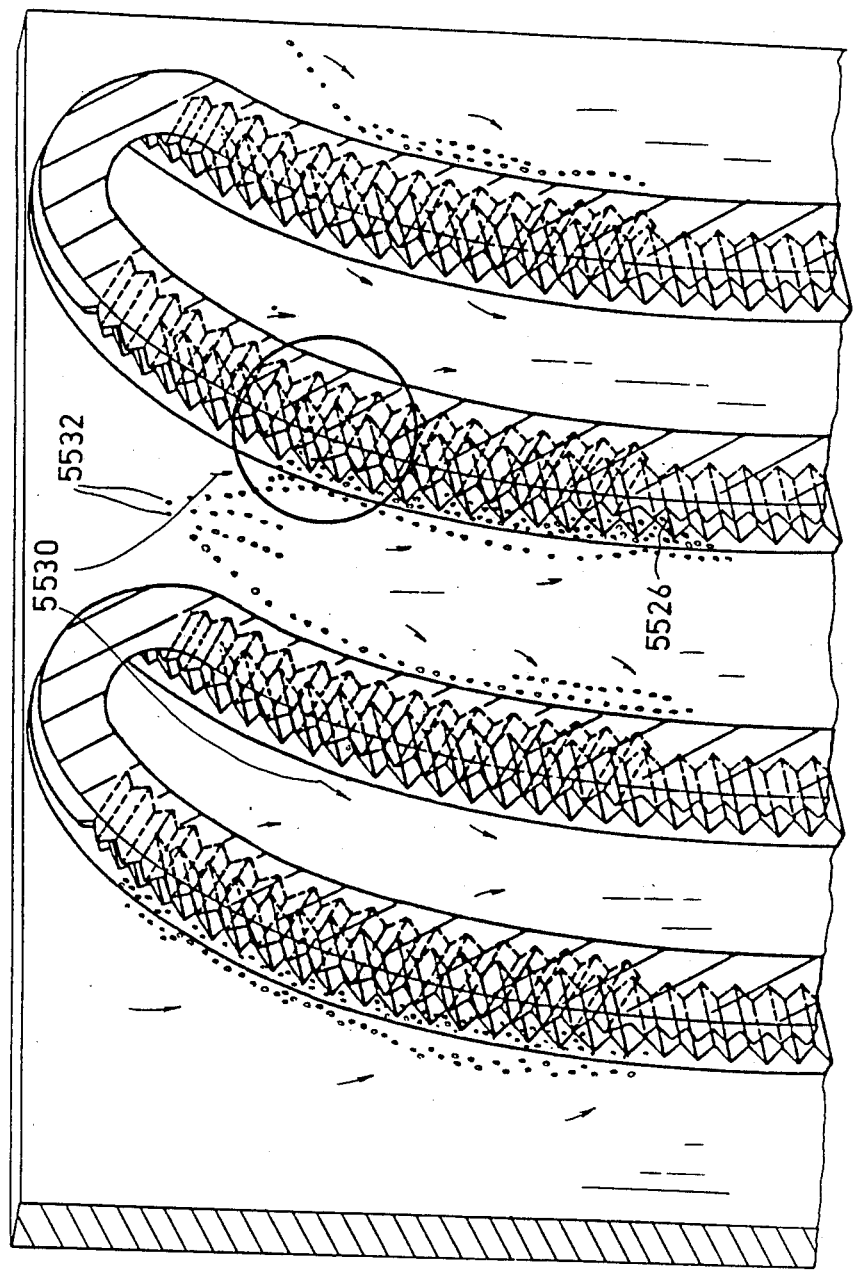
FIG. 53 is an enlarged illustration of a portion of the stack of filter elements illustrated in FIG. 51, also showing the accumulation of sediment thereon.
Figure 54:
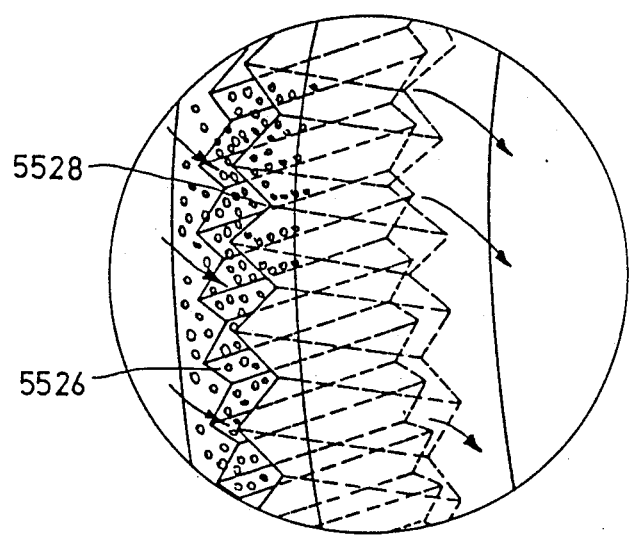
FIG. 54 is a further enlarged illustration of a portion of the stack of filter elements illustrated in FIG. 53 also showing the accumulation of sediment thereon.

Reference is now made to FIGS. 51, 53 and 54, which correspond to FIGS. 50 and 52 but show the collection of sediment particles during operation of the filter. The illustration shows an embodiment wherein the upstream side is radially outward of the raised line portion 5520 and thus intermediate finger elements 5522 while the downstream side is at the radially inward side of the raised line portion 5520 and thus communicates with the area and volume interior of each finger element 5522.

It is seen that fluid, such as water, carrying particulate matter, enters from the upstream side, as indicated by arrows 5530, and deposits particulate matter 5532 upstream of the raised line portion 5520. Consideration of FIG. 54 also indicates that further particulate matter tends to be deposited within the area of engagement of grooves 5526 and 5528 at locations where respective ridges between the grooves on opposite surfaces intersect, defining the maximum size gauge. It may thus be appreciated that particulate matter tends to be deposited generally throughout the area of engagement of grooves 5526 and 5528, thus providing enhanced depth of filtering.

It may additionally be appreciated that a filter aid such as diatomaceous earth, activated carbon or a filter cake may be employed and disposed at the upstream side of the stack of filter elements. Depending on the nature of the filter aid used, it may also be disposed at the area at which the first and second surfaces engage.

A filter aid may be associated with each and every one of the embodiments of this invention hereinabove disclosed. The filter aid may be disposed within the liquid to be filtered or the material of the filter itself may be pre-coated with filter aid to facilitate the first stage of filtering. The filter aid does not pass through the filter, but rather cakes upon its upstream surface, forming a porous, permeable, insoluble cake, the apertures within which are much smaller than those of the filter material. This cake prevents even the finer solids within the liquid to be filtered from passing through the filter; moreover it considerably increases both the flow rate and the time before it becomes necessary to clean or unclog the filter, as such matter which would otherwise be caught in the filter itself will in such an embodiment of any of the embodiments of this invention be caught in the filter aid cake.

It will be appreciated by persons skilled in the art that the present invention is not limited by what has been shown and described hereinabove. Rather the scope of the present invention is defined solely by the claims which follow.

I claim:

1. For use in a disk-type filter including a housing having an inlet connectable to an upstream pipe, and an outlet connectable to a downstream pipe, a stack of disks disposed within the housing for separating solid particles from a fluid flowing between the disks from the upstream side of the stack to the downstream side thereof, and a filter aid in operative engagement with said stack and disposed at the upstream side thereof;

wherein the stack comprises a plurality of co-operating filter elements defining a plurality of paired co-operating filter surfaces, including:

a first surface defining a plurality of spaced, generally circumferentially extending raised line portions separated by generally circumferentially extending grooves; and a second surface defining a plurality of generally radially extending fingers each outlined by a raised line portion, the exterior of the fingers communicating with either one of the upstream side or the downstream side and the interiors of the fingers communicating with the other one of the upstream side or the downstream side.

2. A filter element comprising:

a stack of filter elements for separating solid particles from a fluid flowing between the filter elements from the upstream side of the stack to the downstream side thereof, wherein the stack includes a plurality of co-operating filter elements defining a plurality of paired co-operating filter surfaces, including a first surface defining an array of grooves, extending in a first orientation, and a second surface defining an undulating strip defining an array of grooves facing the array of grooves of the first surface and extending in a second orientation, skewed with respect to the first orientation, one side of the undulating strip communicating with the upstream side and the other side of the undulating strip communicating with the downstream side.

* * * * *